United States Patent
Pearson et al.

(10) Patent No.: US 12,269,961 B2
(45) Date of Patent: *Apr. 8, 2025

(54) MULTI-COAT POLYMER PHOTONIC CRYSTAL FILMS

(71) Applicant: Colorado State University Research Foundation, Fort Collins, CO (US)

(72) Inventors: Ryan Michael Pearson, Berkeley, CA (US); Matthew David Ryan, Berkeley, CA (US); Garret Miyake, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 556 days.

This patent is subject to a terminal disclaimer.

(21) Appl. No.: 17/390,259

(22) Filed: Jul. 30, 2021

(65) Prior Publication Data

US 2021/0355261 A1 Nov. 18, 2021

Related U.S. Application Data

(63) Continuation-in-part of application No. PCT/US2020/015928, filed on Jan. 30, 2020.

(60) Provisional application No. 62/799,945, filed on Feb. 1, 2019.

(51) Int. Cl.
| | |
|---|---|
| C09D 7/61 | (2018.01) |
| B29D 11/00 | (2006.01) |
| C08F 299/04 | (2006.01) |
| C09D 4/00 | (2006.01) |
| C09D 5/00 | (2006.01) |
| C09D 7/41 | (2018.01) |
| C09D 133/10 | (2006.01) |
| C09D 153/00 | (2006.01) |
| C09D 155/00 | (2006.01) |
| C09D 175/14 | (2006.01) |
| C09D 181/02 | (2006.01) |
| G02B 1/00 | (2006.01) |

(52) U.S. Cl.
CPC .... *C09D 155/005* (2013.01); *B29D 11/00865* (2013.01); *C08F 299/0485* (2013.01); *C09D 4/00* (2013.01); *C09D 5/002* (2013.01); *C09D 7/41* (2018.01); *C09D 7/61* (2018.01); *C09D 133/10* (2013.01); *C09D 153/00* (2013.01); *C09D 175/14* (2013.01); *C09D 181/02* (2013.01); *G02B 1/005* (2013.01); *Y10T 428/2848* (2015.01)

(58) Field of Classification Search
None
See application file for complete search history.

(56) References Cited

U.S. PATENT DOCUMENTS

| | | |
|---|---|---|
| 4,052,539 A | 10/1977 | Shropshire et al. |
| 5,462,990 A | 10/1995 | Hubbell et al. |
| 6,007,845 A | 12/1999 | Domb et al. |
| 6,208,466 B1 | 3/2001 | Liu et al. |
| 6,306,540 B1 | 10/2001 | Hiroi et al. |
| 6,383,500 B1 | 5/2002 | Wooley et al. |
| 6,407,187 B1 | 6/2002 | Matyjaszewski et al. |
| 6,433,931 B1 | 8/2002 | Fink et al. |
| 6,479,592 B2 | 11/2002 | Rheinberger et al. |
| 6,489,055 B1 | 12/2002 | Ichihashi et al. |
| 6,542,682 B2 | 4/2003 | Cotteverte et al. |
| 6,627,314 B2 | 9/2003 | Matyjaszewski et al. |
| 6,671,097 B2 | 12/2003 | Fink et al. |
| 6,692,914 B1 | 2/2004 | Klaerner et al. |
| 6,696,142 B2 | 2/2004 | Baer et al. |
| 6,797,057 B1 | 9/2004 | Amos et al. |
| 7,101,937 B1 | 9/2006 | Frechet et al. |
| 7,231,122 B2 | 6/2007 | Weisberg et al. |
| 7,251,402 B2 | 7/2007 | Akiyama et al. |
| 7,795,355 B2 | 9/2010 | Matyjaszewski et al. |
| 7,960,479 B2 | 6/2011 | Cheng et al. |
| 8,415,436 B2 | 4/2013 | Han et al. |
| 8,419,792 B2 | 4/2013 | Vanderbilt et al. |
| 8,454,689 B2 | 6/2013 | Vanderbilt et al. |
| 9,045,579 B2 | 6/2015 | Xia et al. |
| 9,142,835 B2 | 9/2015 | Vicari et al. |

(Continued)

FOREIGN PATENT DOCUMENTS

| | | |
|---|---|---|
| CN | 104007489 B | 4/2016 |
| EP | 3917993 A1 | 12/2021 |

(Continued)

OTHER PUBLICATIONS

Extended Search Report and Written Opinion of the European Patent Office dated Mar. 13, 2023 in EP Application No. 20766785.8; 8pgs.

(Continued)

*Primary Examiner* — Anish P Desai

(74) *Attorney, Agent, or Firm* — KPPB LLP

(57) ABSTRACT

Polymer composite photonic crystal materials are disclosed as coatings with topcoats having high reflection (>30%) in a specific range of the electromagnetic spectrum, such as ultraviolet (<400 nm), visible (Vis, 400 nm-700 nm), or near-infrared radiation range (NIR, 700-2000 nm), and optionally a relatively low reflection (<20% reflection) in a second, different range of the electromagnetic spectrum. Surprisingly, it was found that through a multi-layer coating approach, the optical properties of polymer composite photonic crystal films can be selectively modified from a variety of different coating methods, including spray deposition.

10 Claims, 10 Drawing Sheets

(56) References Cited

U.S. PATENT DOCUMENTS

| | | | |
|---|---|---|---|
| 9,382,387 | B2 | 7/2016 | Xia et al. |
| 9,453,943 | B2 | 9/2016 | Miyake et al. |
| 9,575,212 | B2 | 2/2017 | Grubbs et al. |
| 9,957,383 | B2 | 5/2018 | Macfarlane et al. |
| 10,081,705 | B2 | 9/2018 | Xia et al. |
| 10,153,513 | B2 | 12/2018 | Grubbs et al. |
| 10,533,069 | B2 | 1/2020 | Char et al. |
| 11,053,356 | B2 | 7/2021 | Grubbs et al. |
| 11,912,886 | B2 * | 2/2024 | Pearson ............... C09D 5/002 |
| 12,091,570 | B2 | 9/2024 | Ryan et al. |
| 2002/0135880 | A1 | 9/2002 | Fink et al. |
| 2002/0183473 | A1 | 12/2002 | Matyjaszewski et al. |
| 2005/0192409 | A1 | 9/2005 | Rhodes et al. |
| 2006/0193578 | A1 | 8/2006 | Ouderkirk et al. |
| 2007/0099791 | A1 | 5/2007 | Wan et al. |
| 2007/0289119 | A1 | 12/2007 | Lee et al. |
| 2009/0323014 | A1 | 12/2009 | Cunningham et al. |
| 2010/0305368 | A1 | 12/2010 | Grubbs et al. |
| 2011/0015363 | A1 | 1/2011 | Marchand et al. |
| 2013/0296491 | A1 | 11/2013 | Xia et al. |
| 2013/0324666 | A1 | 12/2013 | Xia et al. |
| 2014/0011958 | A1 | 1/2014 | Miyake et al. |
| 2014/0218792 | A1 | 8/2014 | Krogman et al. |
| 2014/0243483 | A1 | 8/2014 | Grubbs et al. |
| 2016/0024244 | A1 | 1/2016 | Xia et al. |
| 2016/0024250 | A1 | 1/2016 | Yang et al. |
| 2016/0068669 | A1 | 3/2016 | Macfarlane et al. |
| 2016/0289392 | A1 | 10/2016 | Grubbs et al. |
| 2016/0356923 | A1 | 12/2016 | Miyake et al. |
| 2017/0018801 | A1 | 1/2017 | Grubbs et al. |
| 2017/0057908 | A1 | 3/2017 | Jones et al. |
| 2017/0062874 | A1 | 3/2017 | Jones et al. |
| 2018/0067393 | A1 | 3/2018 | Weitekamp |
| 2018/0094099 | A1 | 4/2018 | Johnson et al. |
| 2018/0223034 | A1 | 8/2018 | Char et al. |
| 2018/0258230 | A1 | 9/2018 | Grubbs et al. |
| 2019/0085118 | A1 | 3/2019 | Lee et al. |
| 2021/0230444 | A1 | 7/2021 | Pearson et al. |
| 2021/0363378 | A1 * | 11/2021 | Ryan ............... C09D 155/005 |
| 2021/0395463 | A1 | 12/2021 | Grubbs et al. |

FOREIGN PATENT DOCUMENTS

| | | |
|---|---|---|
| EP | 3917994 A2 | 12/2021 |
| JP | 2006052326 A | 2/2006 |
| JP | 2008102183 A | 5/2008 |
| JP | 2008239588 A | 10/2008 |
| JP | 2016535720 A | 11/2016 |
| JP | 2022523113 A | 4/2022 |
| JP | 2022523114 A | 4/2022 |
| JP | 7391098 B2 | 11/2023 |
| KR | 20210121160 A | 10/2021 |
| KR | 20210122811 A | 10/2021 |
| WO | 2012124693 A1 | 9/2012 |
| WO | 2013138494 A1 | 9/2013 |
| WO | 2020160299 A1 | 8/2020 |
| WO | 2020180427 A2 | 9/2020 |
| WO | 2020180427 A3 | 11/2020 |

OTHER PUBLICATIONS

Song et al., "Hierarchical Photonic Pigments via the Confined Self-Assembly of Bottlebrush Block Copolymers" ACS Nano 2019, Jan. 8, 2019, 13, pp. 1764-1771.

Xia et al., "Efficient Synthesis of Narrowly Dispersed Brush Copolymers and Study of Their Assemblies: The Importance of Side Chain Arrangement", J. Am. Chem. Soc., 131, 18525-18532, Nov. 2009.

Alfrey et al., "Physical Optics of Iridescent Multilayered Plastic Films," Polym. Sci Eng., 9(6):400-404, Nov. 1969.

Chang et al., "Design, Synthesis, and Self-Assembly of Polymers with Tailored Graft Distributions," J Am Chem Soc., 139(48):17683-17693, Nov. 2017.

Chantakit et al., "Ultra-High Green Light Transparency Coating on 1D Photonic Crystal Structure," Siam Physics Congress 2017 (SPC2017), J Phys. Conference Series, 901(1):012150, Sep. 2017.

Edrington et al., "Polymer-Based Photonic Crystals," Adv Mater., 13(6):421-425, Mar. 2001.

International Search Report and Written Opinion of the ISA/US in PCT/US2020/015927, dated Oct. 7, 2020; 9pgs.

International Search Report and Written Opinion of the ISA/US in PCT/US2020/015928, dated May 26, 2020; 10pgs.

Krogman et al., "Industrial-Scale Spray Layer-by-Layer Assembly for Production of Biomimetic Photonic Systems," Bioinspir. Biomim., 8(4):045005, Dec. 2013.

Liberman-Martin et al., "Application of Bottlebrush Block Copolymers as Photonic Crystals," Macromol Rapid Commun., 38(13):1700058, May 2017.

MacFarlane et al., "Improving Brush Polymer Infrared One-Dimensional Photonic Crystals via Linear Polymer Additives," J Am Chem Soc., 136(50):17374-17377, Dec. 2014.

MacFarlane et al., "Improving Brush Polymer Infrared One-Dimensional Photonic Crystals via Linear Polymer Additives," J Am Chem Soc., 136(50):17374-17377, Dec. 2014, Supporting Information.

Müller et al., "Dye-Containing Polymer Beads as Photonic Crystals," Chem. Mater., 12(8):2508-2512, Abstract, Aug. 2000.

Radford et al., "Reflectivity of Iridescent Coextruded Multilayered Plastic Films," Polym Sci Eng., 13(3):216-221, May 1973.

Runge et al., "Synthesis of High Molecular Weight Comb Block Copolymers and Their Assembly into Ordered Morphologies in the Solid State," J Am Chem Soc., 129(34):10551-10560, Aug. 2007.

Schrenk et al., "Some Physical Properties of Multilayered Films," Polym Eng Sci., 9(6):393-399, Nov. 1969.

Sveinbjörnsson et al., "Rapid Self-Assembly of Brush Block Copolymers to Photonic Crystals," Proc Natl Acad Sci USA, 109(36):14332-14336, Sep. 2012.

Takiguchi, "PIndustrial Application of Three-Dimensional Colloidal Photonic Crystals Made in Space," International Symposium on Advanced Nanodevices and Nanotechnology, J Physics Conference Series, 109:012004, Jan. 2008.

Extended Search Report of the EPO dated Mar. 13, 2023 in EP Application No. 20748208.4; 7pgs.

Song et al., "Thermally Tunable Metallodielectric Photonic Crystals from the Self-Assembly of Brush Block Copolymers and Gold Nanoparticles", Adv. Optical Mater. 2015, Jan. 1, 2015, vol. 3, No. 9, pp. 1169-1175.

Verduzco et al., "Structure, function, self-assembly, and applications of bottlebrush copolymers", Chem. Soc. Rev., 2015, 44, pp. 2405-2420.

International Preliminary Report on Patentability for International Application PCT/US2020/015927, Report issued Jul. 27, 2021, Mailed on Aug. 12, 2021, 5 pgs.

International Preliminary Report on Patentability for International Application PCT/US2020/015928, Report issued Jul. 27, 2021, Mailed on Aug. 12, 2021, 6 pgs.

International Search Report and Written Opinion for International Application No. PCT/US2013/030978, Search completed Jul. 17, 2013, Mailed Jul. 18, 2013, 10 pgs.

Abbasi et al., "Linear and Extensional Rheology of Model Branched Polystyrenes: From Loosely Grafted Combs to Bottlebrushes", Macromolecules, vol. 50, No. 15, Jul. 18, 2017, pp. 5964-5977, doi: 10.1021/acs.macromol.7b01034.s.

Adlhart et al., "Mechanism and Activity of Ruthenium Olefin Metathesis Catalysts: The Role of Ligands and Substrates from a Theoretical Perspective", Journal of the American Chemical Society, vol. 126, No. 11, 2004, pp. 3496-3510, doi: 10.1021/ja0305757.

Agarwal et al., "Design of a Catalytic Active Site for Electrochemical CO2 Reduction with Mn(I)-Tricarbonyl Species", Inorganic Chemistry, vol. 54, No. 11, 2015, pp. 5285-5294, doi: 10.1021/acs.inorgchem.5b00233.

Agarwal et al., "Mechanisms for CO Production from CO2 Using Reduced Rhenium Tricarbonyl Catalysts", Journal of the American Chemical Society, vol. 134, No. 11, 2012, pp. 5180-5186, doi: 10.1021/ja2105834.

(56) References Cited

OTHER PUBLICATIONS

Aguirre et al., "Tunable Colors in Opals and Inverse Opal Photonic Crystals", Advanced Functional Materials, vol. 20, No. 16, 2010, pp. 2565-2578, doi: 10.1002/adfm.201000143.
Aharoni, "Rigid Backbone Polymers. 2. Polyisocyanates and Their Liquid-Crystal Behavior", Macromolecules, vol. 12, No. 1, 1979, pp. 94-103, doi: 10.1021/ma60067a021.
Akbari et al., "Cool Surfaces and Shade Trees to Reduce Energy Use and Improve Air Quality in Urban Areas", Solar Energy, vol. 70, No. 3, 2001, pp. 295-310, doi: 10.1016/s0038-092x(00)00089-x.
Al Samak et al., "Alternating ring-opening metathesis copolymerization of bicyclo[2.2.1]hept-2-ene and cyclopentene", Chemical Communications, vol. 21, 1997, pp. 2057-2058, doi: 10.1039/a705046a.
Alberico et al., "Towards a Methanol Economy Based on Homogeneous Catalysis: Methanol to H2 and CO2 to Methanol", Chemical Communications, vol. 51, No. 31, 2015, pp. 6714-6725, doi: 10.1039/c4cc09471a.
Albert et al., "Self-Assembly of Block Copolymer Thin Films", Materials Today, vol. 13, No. 6, 2010, pp. 24-33, doi: 10.1016/S1369-7021(10)70106-1.
Alvarez-Guerra et al., "Ionic Liquids in the Electrochemical Valorisation of CO2", Energy & Environmental Science, vol. 8, No. 9, 2015, pp. 2574-2599, doi: 10.1039/C5EE01486G8.
Appel et al., "Frontiers, Opportunities, and Challenges in Biochemical and Chemical Catalysis of CO2 Fixation", Chemical Reviews, vol. 113, No. 8, 2013, pp. 6621-6658, doi: 10.1021/cr300463y.
Armand et al., "Ionic-Liquid Materials for the Electrochemical Challenges of the Future", Nature Materials, vol. 8, No. 8, 2009, pp. 621-629, doi: 10.1038/nmat2448.
Atwater et al., "Plasmonics for improved photovoltaic devices", Nature Materials, vol. 9, No. 3, 2010, pp. 205-213, doi: 10.1038/NMAT2629.
Azzaroni, "Polymer Brushes Here, There, and Everywhere: Recent Advances in Their Practical Applications and Emerging Opportunities in Multiple Research Fields", Journal of Polymer Science Part A: Polymer Chemistry, vol. 50, No. 16, 2012, pp. 3225-3258, doi: 10.1002/pola.26119.
Babarao et al., "Understanding the High Solubility of CO2 in an Ionic Liquid with the Tetracyanoborate Anion", Journal of Physical Chemistry B, vol. 115, No. 32, 2011, pp. 9789-9794, doi: 10.1021/jp205399r.
Bae et al., "Organization of Rigid Wedge-Flexible Coil Block Copolymers into Liquid Crystalline Assembly", Macromolecules, vol. 38, No. 10, 2005, pp. 4226-4230, doi: 10.1021/ma0500281.
Bajpai et al., "Responsive Polymers in Controlled Drug Delivery", Progress in Polymer Science, vol. 33, No. 11, 2008, pp. 1088-1118, doi: 10.1016/j.progpolymsci.2008.07.005.
Bang et al., "Block Copolymer Nanolithography: Translation of Molecular Level Control to Nanoscale Patterns", Advanced Materials, vol. 21, No. 47, 2009, pp. 4769-4792, doi: 10.1002/adma.200803302.
Bang et al., "Dual Templating Synthesis of Mesoporous Titanium Nitride Microspheres", Advanced Materials, vol. 21, No. 31, 2009, pp. 3186-3190, doi: 10.1002/adma.200802309.
Barrosse-Antle et al., "Voltammetry in Room Temperature Ionic Liquids: Comparisons and Contrasts with Conventional Electrochemical Solvents", Chemistry—an Asian Journal, vol. 5, No. 2, 2010, pp. 202-230, doi: 10.1002/asia.200900191.
Bates et al., "50th Anniversary Perspective: Block Polymers-Pure Potential", Macromolecules, vol. 50, No. 1, 2016, pp. 3-22, doi: 10.1021/acs.macromol.6b02355.
Bates et al., "ABA Triblock Brush Polymers: Synthesis, Self-Assembly, Conductivity, and Rheological Properties", Macromolecules, vol. 48, No. 14, 2015, pp. 4967-4973, doi: 10.1021/acs.macromol.5b00880.
Bates et al., "Block Copolymer Thermodynamics: Theory and Experiment", Annual Review of Physical Chemistry, vol. 41, No. 1, 1990, pp. 525-557, doi: 10.1146/annurev.pc.41.100190.002521.
Bates et al., "Block Copolymers-Designer Soft Materials", Physics Today, vol. 52, No. 2, 1999, pp. 32-38, doi: 10.1063/1.882522.
Bates et al., "Brush Polymer Ion Gels", Journal of Polymer Science, Part B: Polymer Physics, vol. 54, No. 2, 2016, pp. 292-300, doi: 10.1002/polb.23927.
Bates et al., "Multiblock Polymers: Panacea or Pandora's Box?", Science, vol. 336, No. 6080, 2012, pp. 434-440, doi: 10.1126/science.1215368.
Benitez et al., "Conformational Analysis of Olefin-Carbene Ruthenium Metathesis Catalysts", Organometallics, vol. 28, No. 8, 2009, pp. 2643-2645, doi: 10.1021/om900041j.
Bennett et al., "Modelling of the Urban Heat Island and of its Interaction with Pollutant Dispersal", Atmospheric Environment, vol. 16, No. 8, 1982, pp. 1797-1822, doi: 10.1016/0004-6981(82)90369-9.
Benson et al., "Electrocatalytic and homogeneous approaches to conversion of CO2 to liquid fuels", Chemical Society Reviews, vol. 38, No. 1, 2009, pp. 89-99, doi: 10.1039/b804323j.
Benson et al., "Structural investigations into the deactivation pathway of the CO2 reduction electrocatalyst Re(bpy)(CO)3Cl", Chemical Communications, vol. 48, No. 59, 2012, pp. 7374-7376, doi: 10.1039/c2cc32617e.
Bertone et al., "Thickness Dependence of the Optical Properties of Ordered Silica-Air and Air-Polymer Photonic Crystals", Physical Review Letters, vol. 83, No. 2, 1999, pp. 300-303, doi: 10.1103/PhysRevLett.83.300.
Bhattarai et al., "PEG-Grafted Chitosan as an Injectable Thermosensitive Hydrogel for Sustained Protein Release", Journal of Controlled Release, vol. 103, No. 3, 2005, pp. 609-624, doi: 10.1016/j.jconrel.2004.12.019.
Bielawski et al., "Living Ring-Opening Metathesis Polymerization", Progress in Polymer Science, vol. 32, No. 1, 2007, pp. 1-29 doi: 10.1016/j.progpolymsci.2006.08.006.
Bielawski et al., "Living Ring-Opening Metathesis Polymerization," Ch. 6 Controlled and Living Polymerizations, Methods and Materials, Edited by Axel H.E. Muller and Krzysztof Matyjaszewski, K. Wiley-VCH. Weinheim, Germany, 2009, pp. 297-342.
Black, "Self-Aligned Self Assembly of Multi-Nanowire Silicon Field Effect Transistors", Applied Physics Letters, vol. 87, No. 16, 2005, pp. 163116-1-163116-3, doi: 10.1063/1.2112191.
Black et al., "Integration of Self-Assembled Diblock Copolymers for Semiconductor Capacitor Fabrication", Applied Physics Letters, vol. 79, No. 3, 2001, pp. 409-411, doi: 10.1063/1.1383805.
Blakemore et al., "Noncovalent Immobilization of Electrocatalysts on Carbon Electrodes for Fuel Production", Journal of the American Chemical Society, vol. 135, No. 49, 2013, pp. 18288-18291, doi: 10.1021/ja4099609.
Bockstaller et al., "Block Copolymer Nanocomposites: Perspectives for Tailored Functional Materials", Advanced Materials, vol. 17, No. 11, 2005, pp. 1331-1349, doi: 10.1002/adma.200500167.
Bolton et al., "Synthesis and Melt Self-Assembly of PS-PMMA-PLA Triblock Bottlebrush Copolymers", Macromolecules, vol. 47, No. 9, 2014, pp. 2864-2874, doi: 10.1021/ma500625k.
Borner et al., "Synthesis of Molecular Brushes with Gradient in Grafting Density by Atom Transfer Polymerization", Macromolecules, vol. 35, No. 9, 2002, pp. 3387-3394, doi: 10.1021/ma012100a.
Bouchet et al., "Charge Transport in Nanostructured PS-PEO-PS Triblock Copolymer Electrolytes", Macromolecules, vol. 47, No. 2014, pp. 2659-2665, doi: 10.1021/ma500420w.
Bourrez et al., "[Mn(bipyridyl)(CO)3Br]: an Abundant Metal Carbonyl Complex as Efficient Electrocatalyst for CO2 Reduction", Angewandte Chemie International Edition, vol. 50, No. 42, 2011, pp. 9903-9906, doi: 10.1002/anie.201103616.
Braun et al., "Microporous Materials: Electrochemically Grown Photonic Crystals", Nature, vol. 402, No. 6762, 1999, pp. 603-604, doi: 10.1038/45137.
Cabral et al., "Electrochemistry of tris(2,2'-bipyridyl) cobalt(II) in Ionic Liquids and Aprotic Molecular Solvents on Glassy Carbon and Platinum Electrodes", Electrochimica Acta, vol. 180, 2015, pp. 419-426, doi: 10.1016/j.electacta.2015.08.135.

(56) References Cited

OTHER PUBLICATIONS

Campbell et al., "Fabrication of Photonic Crystals for the Visible Spectrum by Holographic Lithography", Nature, vol. 404, No. 6773, 2000, pp. 53-56, doi: 10.1038/35003523.
Cao et al., "Computer Simulations of Bottle Brushes: From Melts to Soft Networks", Macromolecules, vol. 48, No. 14, 2015, pp. 5006-5015, doi: 10.1021/acs.macromol.5b00682.
Carmesin et al., "Static and Dynamic Properties of Two-Dimensional Polymer Melts", Journal de Physique, vol. 51, No. 10, 1990, pp. 915-932, doi: 10.1051/jphys:0199000510100091500.
Carney et al., "Intramolecular Hydroamination of Aminoalkynes with Silver-Phenanthroline Catalysts", Organic Letters, vol. 10, No. 17, 2008, pp. 3903-3906, doi: 10.1021/ol801458g.
Chambon et al., "Synthesis, Temperature Gradient Interaction Chromatography, and Rheology of Entangled Styrene Comb Polymers", Macromolecules, vol. 41, No. 15, 2008, pp. 5869-5875, doi:%10.1021/ma800599m.
Chan et al., "A Robust and Efficient Cobalt Molecular Catalyst for CO2 Reduction", Chemical Communications, vol. 51, No. 37, 2015, pp. 7799-7801, doi: 10.1039/c5cc00566c.
Chang et al., "Manipulating The ABCs of Self-Assembly via Low-χ Block Polymer Design", Proceedings of the National Academy of Sciences, vol. 114, No. 25, 2017, pp. 6462-6467, doi: 10.1073/pnas.1701386114.
Chang et al., "Sequence-Controlled Polymers by Ruthenium-Mediated Ring-Opening Metathesis Polymerization", American Chemical Society, vol. 1170, 2014, pp. 161-188, doi: 10.1021/bk-2014-1170.ch011.
Chen et al., "Molecular Catalysis of the Electrochemical and Photochemical Reduction of CO2 with Earth-Abundant Metal Complexes. Selective Production of CO vs HCOOH by Switching of the Metal Center", Journal of the American Chemical Society, vol. 137, No. 34, 2015, pp. 10918-10921, doi: 10.1021/jacs.5b06535.
Chen et al., "Splitting CO2 into CO and O2 by a Single Catalyst", Proceedings of the National Academy of Sciences, vol. 109, No. 39, 2012, pp. 15606-15611, doi: 10.1073/pnas.1203122109.
Cheng et al., "Facile One-Pot Synthesis of Brush Polymers through Tandem Catalysis Using Grubbs' Catalyst for Both Ring-Opening Metathesis and Atom Transfer Radical Polymerizations", Nano Letters, vol. 6, No. 8, 2006, pp. 1741-1746, doi: 10.1021/nl0611900.
Cheng et al., "Formation of a Cobalt Magnetic Dot Array via Block Copolymer Lithography", Advanced Materials, vol. 13, No. 15, 2001, pp. 1174-1178, doi: 10.1002/1521-4095(200108)13:15<1174::aid-adma1174>3.0.co;2-q.
Cheng et al., "Synthesis of Core-Crosslinked Nanoparticles with Controlled Cylindrical Shape and Narrowly-Dispersed Size via Core-Shell Brush Block Copolymer Templates", Advanced Materials, vol. 19, No. 19, 2007, pp. 2830-2835, doi: 10.1002/adma.200602986.
Cheng et al., "Templated Self-Assembly of Block Copolymers: Top-Down Helps Bottom-Up", Advanced Materials, vol. 18, No. 19, 2006, pp. 2505-2521, doi: 10.1002/adma.200502651.
Chintapalli et al., "Effect of Grain Size on the Ionic Conductivity of a Block Copolymer Electrolyte", Macromolecules, vol. 47, No. 15, 2014, pp. 5424-5431, doi: 10.1021/ma501202c.
Cho et al., "Printable Ion-Gel Gate Dielectrics for Low-Voltage Polymer Thin-Film Transistors on Plastic", Nature Materials, vol. 7, No. 11, 2008, pp. 900-906, doi: 10.1038/nmat2291.
Connelly et al., "Chemical Redox Agents for Organometallic Chemistry", Chemical Reviews, vol. 96, No. 2, 1996, pp. 877-910, doi: 10.1021/cr940053x.
Costentin et al., "A Local Proton Source Enhances CO2 Electroreduction to CO by a Molecular Fe Catalyst", Science, vol. 338, No. 6103, 2012, pp. 90-94, doi: 10.1126/science.1224581.
Costentin et al., "Benchmarking of Homogeneous Electrocatalysts: Overpotential, Turnover Frequency, Limiting Turnover Number", Journal of the American Chemical Society, vol. 137, No. 16, 2015, pp. 5461-5467, doi: 10.1021/jacs.5b00914.
Costentin et al., "Catalysis of the Electrochemical Reduction of Carbon Dioxide", Chemical Society Reviews, vol. 42, No. 6, 2013, pp. 2423-2436, doi: 10.1039/c2cs35360a.
Cowie et al., "Effect of Side Chain Length and Crosslinking on the AC Conductivity of Oligo (Ethyleneoxide) Comb-Branch Polymer-Salt Mixtures", Solid State Ionics, vol. 42, No. 3-4, 1990, pp. 243-249, doi: 10.1016/0167-2738(90)90014-1.
Crutzen, "New Directions: The Growing Urban Heat and Pollution "Island" Effect—Impact on Chemistry and Climate", Atmospheric Environment, vol. 38, No. 21, 2004, pp. 3539-3540, doi: 10.1016/j.atmosenv.2004.03.032.
Cushen et al., "Oligosaccharide/Silicon-Containing Block Copolymers with 5 nm Features for Lithographic Applications", ACS Nano, vol. 6, No. 4, 2012, pp. 3424-3433, doi: 10.1021/nn300459r.
Daeffler, "Ring-Opening Metathesis of Bulky Norbornene Monomers and Radical-Mediated Hydrophosphonation of Olefins", Ph.D. Thesis, California Institute of Technology, Pasadena, California, 2013, 102 pgs.
Daigle et al., "Lithium Battery with Solid Polymer Electrolyte Based on Comb-Like Copolymers", Journal of Power Sources, vol. 279, 2015, pp. 372-383, doi: 10.1016/j.jpowsour.2014.12.061.
Dalsin et al., "Bottlebrush Block Polymers: Quantitative Theory and Experiments", ACS Nano, vol. 9, No. 12, 2015, pp. 12233-12245, doi: 10.1021/acsnano.5b05473.
Dalsin et al., "Linear Rheology of Polyolefin-Based Bottlebrush Polymers", Macromolecules, vol. 48, No. 13, 2015, pp. 4680-4691, doi: 10.1021/acs.macromol.5b01153.
Dalsin et al., "Molecular Weight Dependence of Zero-Shear Viscosity in Atactic Polypropylene Bottlebrush Polymers", ACS Macro Letters, vol. 3, No. 5, 2014, pp. 423-427, doi: 10.1021/mz500082h.
Daniel et al., "Solvent-Free, Supersoft and Superelastic Bottlebrush melts and Networks", Nature Materials, vol. 15, No. 2, 2015, pp. 183-189, doi: 10.1038/nmat4508.
Daniels et al., "Molecular Rheology of Comb Polymer Melts. 1. Linear Viscoelastic Response", Macromolecules, vol. 34, No. 20, 2001, pp. 7025-7033, doi: 10.1021/ma010712p.
Del Valle et al., "Empirical Parameters for Solvent Acidity, Basicity, Dipolarity, and Polarizability of the Ionic Liquids [BMIM][BF4] and [BMIM][PF6]", Journal of Physical Chemistry B, vol. 119, No. 13, 2015, pp. 4683-4692, doi: 10.1021/jp511154h.
Deshmukh et al., "Molecular Design of Liquid Crystalline Brush-Like Block Copolymers for Magnetic Field Directed Self-Assembly: a Platform for Functional Materials", ACS Macro Letters, vol. 3, No. 5, 2014, pp. 462-466, doi: 10.1021/mz500161k.
Dettmer et al., "Synthesis and Functionalization of ROMP-Based Gradient Copolymers of 5-Substituted Norbornenes", Macromolecules, vol. 37, No. 15, 2004, pp. 5504-5512, doi: 10.1021/ma036002w.
Deutsch et al., "Interdiffusion and Self-Diffusion in Polymer Mixtures: a Monte Carlo Study", Journal of Chemical Physics, vol. 94, No. 3, 1991, pp. 2294-2304, doi: 10.1063/1.459901.
Kang et al., "Broad-Wavelength-Range Chemically Tunable Block-Copolymer Photonic Gels", Nature Materials, vol. 6, No. 12, 2007, pp. 957-960, doi: 10.1038/nmat2032.
Kang et al., "Full Color Stop Bands in Hybrid Organic/Inorganic Block Copolymer Photonic Gels by Swelling-Freezing", Journal of the American Chemical Society, vol. 131, No. 22, 2009, pp. 7538-7539, doi: 10.1021/ja9021478.
Kang et al., "Ultrafast Cyclopolymerization for Polyene Synthesis: Living Polymerization to Dendronized Polymers", Journal of the American Chemical Society, vol. 133, No. 31, 2011, pp. 11904-11907, doi: 10.1021/ja204309d.
Kapnistos et al., "Linear Rheology of Architecturally Complex Macromolecules: Comb Polymers with Linear Backbones", Macromolecules, vol. 38, No. 18, 2005, pp. 7852-7862, doi: 10.1021/ma050644x.
Kapnistos et al., "Nonlinear Rheology of Model Comb Polymers", Journal of Rheology, vol. 53, No. 5, 2009, pp. 1133-1153, doi: 10.1122/1.3191781.
Karl et al., "Modern Global Climate Change", Science, vol. 302, No. 5651, 2003, pp. 1719-1723, doi: 10.1126/science.1090228.
Kawamoto et al., "Graft-through Synthesis and Assembly of Janus Bottlebrush Polymers from A-Branch-B Diblock Macromonomers",

(56) References Cited

OTHER PUBLICATIONS

Journal of the American Chemical Society, vol. 138, No. 36, 2016, pp. 11501-11504, doi: 10.1021/jacs.6b07670.

Keith et al., "Elucidation of the Selectivity of Proton-Dependent Electrocatalytic CO2 Reduction by fac-Re(bpy)(CO)$_3$Cl", Journal of the American Chemical Society, vol. 135, No. 42, 2013, pp. 15823-15829, doi: 10.1021/ja406456g.

Kelen et al., "Analysis of the Linear Methods for Determining Copolymerization Reactivity Ratios. I. A New Improved Linear Graphic Method", Journal of Macromolecular Science, Part A—Chemistry, vol. 9, No. 1, 1975, pp. 1-27, doi: 10.1080/00222337508068644.

Kikuchi et al., "Conformational Properties of Cylindrical Rod Brushes Consisting of a Polystyrene Main Chain and Poly(n-hexyl isocyanate) Side Chains", Macromolecules, vol. 41, No. 17, 2008, pp. 6564-6572, doi: 10.1021/ma800951d.

Kikuchi et al., "Graft Density Dependence of Main Chain Stiffness in Molecular Rod Brushes", Macromolecules, vol. 48, No. 16, 2015, pp. 5878-5886, doi: 10.1021/acs.macromol.5b01010.

Kim et al., "A Route to Nanoscopic SiO2 Posts via Block Copolymer Templates", Advanced Materials, vol. 13, No. 11, 2001, pp. 795-797, doi: 10.1002/1521-4095(200106)13:11%3C795::AID-ADMA795%3E3.0.CO;2-1.

Kim et al., "Artificial Photosynthesis for Sustainable Fuel and Chemical Production", Angewandte Chemie International Edition, vol. 54, No. 11, 2015, pp. 3259-3266, doi: 10.1002/anie.201409116.

Kim et al., "From Self-Assembled Monolayers to Coatings: Advances in the Synthesis and Nanobio Applications of Polymer Brushes", Polymers, vol. 7, No. 7, 2015, pp. 1346-1378, doi: 10.3390/polym7071346.

Kinning et al., "Hard-Sphere Interactions Between Spherical Domains in Diblock Copolymers", Macromolecules, vol. 17, No. 9, 1984, pp. 1712-1718, doi: 10.1021/ma00139a013.

Klahn et al., "What Determines CO$_2$ Solubility in Ionic Liquids? A Molecular Simulation Study", Journal of Physical Chemistry B, vol. 119, No. 31, 2015, pp. 10066-10078, doi: 10.1021/acs.jpcb.5b03674.

Kobayashi et al., "Ionically High Conductive Solid Electrolytes Composed of Graft Copolymer-Lithium Salt Hybrids", Journal of Physical Chemistry, vol. 89, No. 6, 1985, pp. 987-991, doi: 10.1021/j100252a020.

Kortlever et al., "Catalysts and Reaction Pathways for the Electrochemical Reduction of Carbon Dioxide", Journal of Physical Chemistry Letters, vol. 6, No. 20, 2015, pp. 4073-4082, doi: 10.1021/acs.jpclett.5b01559.

Kovach et al., "Completely Engulfed Olive/Silicone Oil Janus Emulsions with Gelatin and Chitosan", Colloid and Polymer Science, vol. 294, No. 4, 2016, pp. 705-713, doi: 10.1007/s00396-016-3828-4.

Krause et al., "Simple Synthesis of Poly(acetylene) Latex Particles in Aqueous Media", Angewandte Chemie International Edition, vol. 42, No. 48, 2003, pp. 5965-5969, doi: 10.1002/anie.200352637.

Kuan et al., "Controlled Ionic Conductivity via Tapered Block Polymer Electrolytes", RSC Advances, vol. 5, No. 17, 2015, pp. 12597-12604, doi: 10.1039/c4ra15953e.

Kumar et al., "Factors Relevant for the Regioselective Cyclopolymerization of 1,6-Heptadiynes, N,N-Dipropargylamines, N,N-Dipropargylammonium Salts, and Dipropargyl Ethers by RuIV-Alkylidene-Based Metathesis Initiators", Journal of the American Chemical Society, vol. 131, No. 1, 2009, pp. 387-395, doi: 10.1021/ja804563t.

Lam et al., "A Mn Bipyrimidine Catalyst Predicted to Reduce CO$_2$ at Lower Overpotential", ACS Catalysis, vol. 5, No. 4, 2015, pp. 2521-2528, doi: 10.1021cs501963v.

Lanson et al., "Poly(styrene)comb-b-Poly(ethylene oxide)comb Copolymers: Synthesis and AFM Investigation of Intra- and Supramolecular Organization as Thin Deposits", Macromolecules, vol. 40, No. 26, 2007, pp. 9503-9509, doi: 10.1021/ma071437v.

Lanson et al., "Synthesis of (Poly(chloroethyl vinyl ether)-g-polystyrene)comb-b- (poly(chloropyran ethoxy vinyl ether)-g-polyisoprene)comb Copolymers and Study of Hyper-Branched Micelle Formation in Dilute Solutions", Macromolecules, vol. 40, No. 15, 2007, pp. 5559-5565, doi: 10.1021/ma0704414.

Larson, "Predicting the Flow of Real Polymers", Science, vol. 333, No. 6051, 2011, pp. 1834-1835, doi: 10.1126/science.1211863.

Lascaud et al., "Phase Diagrams and Conductivity Behavior of Poly(ethylene oxide)-Molten Salt Rubbery Electrolytes", Macromolecules, vol. 27, No. 25, 1994, pp. 7469-7477, doi: 10.1021/ma00103a034.

Lecommandoux et al., "Effect of Dense Grafting on the Backbone Conformation of Bottlebrush Polymers: Determination of the Persistence Length in Solution", Macromolecules, vol. 35, No. 23, 2002, pp. 8878-8881, doi: 10.1021/ma0203344.

Lee et al., "Electrical Impedance of Spin-Coatable Ion Gel Films", Journal of Physical Chemistry B, vol. 115, No. 13, 2011, pp. 3315-3321, doi: 10.1021/jp110166u.

Lee et al., "Hetero-Grafted Block Brushes with PCL and PBA Side Chains", Macromolecules, vol. 41, No. 16, 2008, pp. 6073-6080, doi: 10.1021/ma800412s.

Lee et al., "Ion Gel Gated Polymer Thin-Film Transistors", Journal of the American Chemical Society, vol. 129, No. 15, 2007, pp. 4532-4533, doi: 10.1021/ja070875e.

Lee et al., "Molecular Brushes with Spontaneous Gradient by Atom Transfer Radical Polymerization", Macromolecules, vol. 38, No. 20, 2005, pp. 8264-8271, doi: 10.1021/ma051231z.

Lee et al., "Quasi-Amorphous Colloidal Structures for Electrically Tunable Full-Color Photonic Pixels with Angle-Independency", Advanced Materials, vol. 22, No. 44, 2010, pp. 4973-4977, doi: 10.1002/adma.201001954.

Lee et al., "Stimuli-Responsive Molecular Brushes", Progress in Polymer Science, vol. 35, No. 1-2, 2010, pp. 24-44, doi: 10.1016/j.progpolymsci.2009.11.002.

Lei et al., "Gas Solubility in Ionic Liquids", Chemical Reviews, vol. 114, No. 2, 2013, pp. 1289-1326, doi: 10.1021/cr300497a.

Leibler, "Theory of Microphase Separation in Block Copolymers", Macromolecules, vol. 13, No. 6, 1980, pp. 1602-1617, doi: 10.1021/ma60078a047.

Leitgeb et al., "The ROMP toolbox upgraded", Polymer, vol. 51, No. 14, 2010, pp. 2927-2946, doi: 10.1016/j.polymer.2010.05.002.

Li et al., "Dense Arrays of Ordered GaAs Nanostructures by Selective Area Growth on Substrates Patterned by Block Copolymer Lithography", Applied Physics Letters, vol. 76, No. 13, 2000, pp. 1689-1691, doi: 10.1063/1.126137.

Li et al., "Dynamic Cylindrical Assembly of Triblock Copolymers by a Hierarchical Process of Covalent and Supramolecular Interactions", Journal of the American Chemical Society, 2011, vol. 133, No. 5, pp. 1228-1231, doi: 10.1021/ja109191z.

Li et al., "Facile Syntheses of Cylindrical Molecular Brushes by a Sequential RAFT and ROMP "Grafting-Through" Methodology", Journal of Polymer Science Part A: Polymer Chemistry, vol. 47, No. 20, 2009, pp. 5557-5563, doi: 10.1002/pola.23626.

Li et al., "Surface Properties of Bottlebrush Polymer Thin Films", Macromolecules, vol. 45, No. 17, 2012, pp. 7118-7127, doi: 10.1021/ma301046n.

Liang et al., "Combs and Bottlebrushes in a Melt", Macromolecules, vol. 50, No. 8, 2017, pp. 3430-3437, doi: 10.1021/acs.macromol.7b00364.

Lim et al., "A Review on the Electrochemical Reduction of CO$_2$ in Fuel Cells, Metal Electrodes and Molecular Catalysts", Catalysis Today, vol. 233, 2014, pp. 169-180, doi: 10.1016/j.cattod.2013.11.037.

Lin et al., "A Three-Dimensional Photonic Crystal Operating at Infrared Wavelengths", Nature, vol. 394, No. 6690, 1998, pp. 251-253, doi: 10.1038/28343.

Lin et al., "Control of Grafting Density and Distribution in Graft Polymers by Living Ring-Opening Metathesis Copolymerization", Journal of the American Chemical Society, vol. 139, No. 10, 2017, pp. 3896-3903, doi: 10.1021/jacs.7b00791.

Lin et al., "Effects of Grafting Density on Block Polymer Self-Assembly: From Linear to Bottlebrush", ACS Nano, vol. 11, No. 11, 2017, pp. 11632-11641, doi: 10.1021/acsnano.7b06664.

Lin et al., "Ionic Liquid Co-catalyzed Artificial Photosynthesis of CO", Scientific Reports, vol. 3, No. 1056, 2013, pp. 1-5, doi: 10.1038/srep01056.

(56) References Cited

OTHER PUBLICATIONS

Lindquist et al., "Plasmonic Nanocavity Arrays for Enhanced Efficiency in Organic Photovoltaic Cells", Applied Physics Letters, vol. 93, No. 123308, 2008, pp. 1-3, doi: 10.1063/1.2988287.
Lipson, "A Monte Carlo Simulation Study on Long-Chain Combs", Macromolecules, vol. 24, No. 6, 1991, pp. 1327-1333, doi: 10.1021/ma00006a018.
Liu et al., "Computational Studies of Ruthenium-Catalyzed Olefin Metathesis", Handbook of Metathesis Wiley-VCH Verlag Gmbh & Co. KGaA, 2015, pp. 199-252, doi: 10.1002/9783527674107.ch7.
Liu et al., "Theoretical Study of Phase Behavior of Frustrated ABC Linear Triblock Copolymers", Macromolecules, vol. 45, No. 23, 2012, pp. 9522-9530, doi: 10.1021/ma302060m.
Lodge, "A Unique Platform for Materials Design", Science, vol. 321, No. 5885, 2008, pp. 50-51, doi: 10.1126/science.1159652.
Lopes et al., "Hierarchical Self-Assembly of Metal Nanostructures on Diblock Copolymer Scaffolds", Nature, vol. 414, No. 6865, 2001, pp. 735-738, doi: 10.1038/414735a.
Love et al., "A Practical and Highly Active Ruthenium-Based Catalyst that Effects the Cross Metathesis of Acrylonitrile", Angewandte Chemie International Edition, vol. 41, No. 21, 2002, pp. 4035-4037, doi: 10.1002/1521-3773(20021104)41:21<4035::aid-anie4035>3.0.co;2-i.
Lu et al., "Advanced Applications of Ionic Liquids in Polymer Science", Progress in Polymer Science, vol. 34, No. 5, 2009, pp. 431-448, doi: 10.1016/j.progpolymsci.2008.12.001.
Lu et al., "One-Pot Synthesis of Brush-Like Polymers via Integrated RingOpening Metathesis Polymerization and Polymerization of Amino Acid N-Carboxyanhydrides", Journal of the American Chemical Society, vol. 131, No. 38, 2009, pp. 13582-13583, doi: 10.1021/ja903425x.
Lu et al., "Synthesis and characterization of a novel ABA triblock copolymer via 4,4'-bis(trifluorovinyloxy)biphenyl and methyl methacrylate", Journal of Polymer Science Part A: Polymer Chemistry, vol. 44, No. 18, 2006, pp. 5438-5444, doi: 10.1002/pola.21648.
Luca et al., "The Selective Electrochemical Conversion of Preactivated CO2 to Methane", Journal of The Electrochemical Society, vol. 162, No. 7, 2015, pp. H473-H476, doi: 10.1149/2.0371507jes.
Luttge, "Massively Parallel Fabrication of Repetitive Nanostructures: Nanolithography for Nanoarrays", Journal of Physics D: Applied Physics, vol. 42, No. 123001, 2009, 18 pgs., doi: 10.1088/0022-3727/42/12/123001.
Lutz et al., "Sequence-Controlled Polymers", Science, vol. 341, No. 6146, 2013, pp. 1238149-1-1238149-8, doi: 10.1126/science.12381.
Lzgorodina et al., "Physical Absorption of $CO_2$ in Protic and Aprotic Ionic Liquids: an Interaction Perspective", Journal of Physical Chemistry B, vol. 119, No. 35, 2015, pp. 11748-11759, doi: 10.1021/acs.jpcb.5b05115.
Ma et al., "Synthesis of Bottlebrush Polystyrenes with Uniform, Alternating, and Gradient Distributions of Brushes via Living Anionic Polymerization and Hydrosilylation", Macromolecular Rapid Communications, vol. 36, No. 8, 2015, pp. 726-732, doi: 10.1002/marc.201400660.
MacFarlane et al., "Energy Applications of Ionic Liquids", Energy and Environmental Science, vol. 7, Issue 1, 2013, pp. 232-250, doi: 10.1039/C3EE42099J.
Machan et al., "Electrocatalytic Reduction of Carbon Dioxide by Mn(CN)(2,2'-bipyridine)(CO)$_3$: CN Coordination Alters Mechanism", Inorganic Chemistry, vol. 54, No. 17, 2015, pp. 8849-8856, doi: 10.1021/acs.inorgchem.5b01715.
Machan et al., "Supramolecular Assembly Promotes the Electrocatalytic Reduction of Carbon Dioxide by Re(I) Bipyridine Catalysts at a Lower Overpotential", Journal of the American Chemical Society, vol. 136, No. 41, 2014, pp. 14598-14607, doi: 10.1021/ja5085282.
Maeda et al., "Helical polymer brushes with a preferred-handed helix-sense triggered by a terminal optically active group in the pendant", Chemical Communications, vol. 48, No. 27, 2012, pp. 3342-3344, doi: 10.1039/c2cc00024e.
Mahurin et al., "High CO2 Solubility, Permeability and Selectivity in Ionic Liquids with the Tetracyanoborate Anion", RSC Advances, vol. 2, No. 31, 2012, pp. 11813-11819, doi: 10.1039/C2RA22342B.
Mai et al., "Self-assembly of block copolymers", Chemical Society Reviews, vol. 41, No. 18, 2012, pp. 5969-5985, doi: 10.1039/c2cs35115c.
Mai et al., "Topology-Controlled Relaxation Dynamics of Single Branched Polymers", ACS Macro Letters, vol. 4, No. 4, 2015, pp. 446-452, doi: 10.1021/acsmacrolett.5b00140.
Manbeck et al., "Push or Pull? Proton Responsive Ligand Effects in Rhenium Tricarbonyl CO2 Reduction Catalysts", The Journal of Physical Chemistry B, vol. 119, No. 24, 2015, pp. 7457-7466, doi: 10.1021/jp511131x.
Mapas et al., "Ultrahigh Molecular Weight Linear Block Copolymers: Rapid Access by Reversible-Deactivation Radical Polymerization and Self-Assembly into Large Domain Nanostructures", Macromolecules, vol. 49, No. 10, 2016, pp. 3733-3738, doi: 10.1021/acs.macromol.6b00863.
Marencic et al., "Controlling Order in Block Copolymer Thin Films for Nanopatterning Applications", Annual Review of Chemical and Biomolecular Engineering, vol. 1, 2010, pp. 277-297, doi: 10.1146/annurev-chembioeng-073009-101007.
Martinez et al., "Ring-opening metathesis polymerization of 8-membered cyclic olefins", Polymer Chemistry, vol. 5, No. 11, 2014, pp. 3507-3532, doi: 10.1039/C3PY01787G.
Masuda et al., "Photonic Crystal Using Anodic Porous Alumina", Japanese Journal of Applied Physics, vol. 38, No. 12A, 1999, pp. L1403-L1405, doi: 10.1143/JJAP.38.L1403.
Matsen, "Melts of semiflexible diblock copolymer", The Journal of Chemical Physics, vol. 104, No. 19, 1996, pp. 7758-7764, doi: 10.1063/1.471481.
Matsen et al., "Conformationally Asymmetric Block Copolymers", Journal of Polymer Science Part B: Polymer Physics, vol. 35, No. 6, 1997, pp. 945-952, doi: 10.1002/(SICI)1099-0488(19970430)35:6<945::AID-POLB9>3.0.CO;2-G.
Matsen et al., "Unifying Weak- and Strong-Segregation Block Copolymer Theories", Macromolecules, vol. 29, No. 4, 1996, pp. 1091-1098, doi: 10.1021/ma951138i.
Matson et al., "Synthesis of Fluorine-18 Functionalized Nanoparticles for use as in vivo Molecular Imaging Agents", Journal of the American Chemical Society, vol. 130, No. 21, 2008, pp. 6731-6733, doi: 10.1021/ja802010d.
Matsubara et al., "Reactivity of a fac-ReCl(α-diimine)(CO)3 complex with an NAD+ model ligand toward $CO_2$ reduction", Chemical Communications, vol. 56, No. 6, 2014, pp. 728-730, doi: 10.1039/c3cc47699e.
Matsubara et al., "Thermodynamic Aspects of Electrocatalytic $CO_2$ Reduction in Acetonitrile and with an Ionic Liquid as Solvent or Electrolyte", ACS Catalysis, vol. 5, No. 11, 2015, pp. 6440-6452, doi: 10.1021/acscatal.5b00656.
Matsuda et al., "Periodically Functionalized and Grafted Copolymers via 1:2-Sequence-Regulated Radical Copolymerization of Naturally Occurring Functional Limonene and Maleimide Derivatives", Macromolecules, vol. 46, No. 14, 2013, pp. 5473-5482, doi: 10.1021/ma401021d.
Matyjaszewski, "Architecturally Complex Polymers with Controlled Heterogeneity", Science, vol. 333, No. 6046, 2011, pp. 1104-1105, doi: 10.1126/science.1209660.
Matyjaszewski et al., "Gradient Copolymers by Atom Transfer Radical Copolymerization", Journal of Physical Organic Chemistry, vol. 13, No. 12, 2000, pp. 775-786, doi: 10.1002/1099-1395(200012)13:12<775::Aid-POC314>3.0.CO;2-D.
Matyjaszewski et al., "Nanostructured Functional Materials Prepared by Atom Transfer Radical Polymerization", Nature Chemistry, vol. 1, No. 4, 2009, 276-288, doi: 10.1038/nchem.257.
Maxein et al., "Opalescent Cholesteric Networks from Chiral Polyisocyanates in Polystyrene", Advanced Materials, vol. 10, No. 4, 1998, pp. 341-345, doi: 10.1002/(SICI)1521-4095(199803)10:4<341::AID-ADMA341>3.0.CO;2-1.
Maxein et al., "Structure-Property Relations in Cholesteric Networks from Chiral Polyisocyanates", Macromolecules, vol. 32, No. 18, 1999, pp. 5747-5754, doi: 10.1021/ma990326w.

(56) References Cited

OTHER PUBLICATIONS

Mayer et al., "Chiral Polyisocyanates, a Special class of Helical Polymers", Progress in Polymer Science, vol. 26, No. 10, 2001, pp. 1973-2013, doi: 10.1016/S0079-6700(01)00031-4.

Mayershofer et al., "Bi- and Trinuclear Ruthenium Alkylidene Triggered Cyclopolymerization of 1,6-Heptadiynes: Access to An—X—An Block and (An)3X Tristar Copolymers", Macromolecules, vol. 39, No. 10, 2006, pp. 3484-3493, doi: 10.1021/ma052510p.

Mayo et al., "Copolymerization", Chemical Reviews, vol. 46, No. 2, 1950, pp. 191-287, doi: 10.1021/cr60144a001.

Mayo et al., "Copolymerization. I. A Basis for Comparing the Behavior of Monomers in Copolymerization; The Copolymerization of Styrene and Methyl Methacrylate", Journal of the American Chemical Society, vol. 66, No. 9, 1944, pp. 1594-1601, doi: 10.1021/ja01237a052.

McIntosh et al., "Evolution of Morphology, Modulus, and Conductivity in Polymer Electrolytes Prepared via Polymerization-Induced Phase Separation", Macromolecules, vol. 48, No. 5, 2015, pp. 1418-1428, doi: 10.1021/ma502281k.

McLeish, "Tube Theory of Entangled Polymer Dynamics", Advances in Physics, vol. 51, No. 6, 2002, pp. 1379-1527, doi: 10.1080/00018730210153216.

Meijs et al., "Reactivity of Macromonomers in Free Radical Polymerization", Journal of Macromolecular Science, Part C, Polymer Reviews, vol. 30, No. 3-4, 1990, pp. 305-377, doi: 10.1080/07366579008050912.

Meyer, "Polymer Electrolytes for Lithium-Ion Batteries", Advanced Materials, vol. 10, No. 6, 1998, pp. 439-448, doi: 10.1002/(SICI)1521-4095(199804)10:6<439::AID-ADMA439>3.0.CO;2-1.

Milner et al., "Theory of the Grafted Polymer Brush", Macromolecules, vol. 21, No. 8, 1988, pp. 2610-2619, doi: 10.1021/ma00186a051.

Miranda et al., "Cross-Linked Block Copolymer/Ionic Liquid Self-Assembled Blends for Polymer Gel Electrolytes with High Ionic Conductivity and Mechanical Strength", Macromolecules, vol. 46, No. 23, 2013, pp. 9313-9323, doi: 10.1021/ma401302r.

Miyake et al., "Precisely Tunable Photonic Crystals From Rapidly Self-Assembling Brush Block Copolymer Blends", Angewandte Chemie International Edition, vol. 51, No. 45, 2012, pp. 11246-11248, doi: 10.1002/anie.201208084.

Miyake et al., "Stereospecific Polymerization of Chiral Oxazolidinone-Functionalized Alkenes", Macromolecules, vol. 43, No. 18, 2010, pp. 7504-7514, doi: 10.1021/ma101310n.

Eberhardt et al., "Synthesis of Active Ester Polymers and Block Copolymers via Controlled Radical Polymerization", Polymer Preprints, vol. 41, No. 1, 2005, pp. 100-101.

Eddaoudi et al., "$CO_2$ Separation, Capture and Reuse: A Web Themed Issue", Chemical Communications, vol. 51, No. 26, 2015, pp. 5554-5555, doi: 10.1039/c5cc90085a.

Elli et al., "Size and persistence length of molecular bottle-brushes by Monte Carlo simulations", Journal of Chemical Physics, vol. 120, No. 13, 2004, pp. 6257-6267, doi: 10.1063/1.1651052.

Elling et al., "Living Alternating Ring-Opening Metathesis Polymerization Based on Single Monomer Additions", Journal of the American Chemical Society, vol. 137, No. 31, 2015, pp. 9922-9926, doi: 10.1021/jacs.5b05497.

Evans et al., "A Comparative Electrochemical Study of Diffusion in Room Temperature Ionic Liquid Solvents versus Acetonitrile", ChemPhysChem, vol. 6, No. 3, 2005, pp. 526-533, doi: 10.1002/cphc.200400549.

Fabry et al., "Immobilization and Continuous Recycling of Photoredox Catalysts in Ionic Liquids for Applications in Batch Reactions and Flow Systems: Catalytic Alkene Isomerization by Using Visible Light", Chemistry—A European Journal, vol. 21, No. 14, 2015, pp. 5350-5354, doi: 10.1002/chem.201406653.

Fenyves et al., "Aqueous Self-Assembly of Giant Bottlebrush Block Copolymer Surfactants as Shape-Tunable Building Blocks", Journal of the American Chemical Society, vol. 136, No. 21, 2014, pp. 7762-7770, doi: 10.1021/ja503283r.

Ferry et al., "Design Considerations for Plasmonic Photovoltaics", Advanced Materials, vol. 22, No. 43, 2010, pp. 4794-4808, doi: 10.1002/adma.201000488.

Fetters et al., "Connection between Polymer Molecular Weight, Density, Chain Dimensions, and Melt Viscoelastic Properties", Macromolecules, vol. 27, No. 17, 1994, pp. 4639-4647, doi: 10.1021/ma00095a001.

Fineman et al., "Linear Method for Determining Monomer Reactivity Ratios in Copolymerization", Journal of Polymer Science, vol. 5, No. 2, 1950, pp. 259-262, doi: 10.1002/pol.1950.120050210.

Fink et al., "Block Copolymers as Photonic Bandgap Materials", J. of Lightwave Technology, vol. 17, No. 11, 1999, pp. 1963-1969, doi: 10.1109/50.802981.

Finn et al., "Molecular Approaches to the Electrochemical Reduction of Carbon Dioxide", Chemical Communications, vol. 48, No. 10, 2011, pp. 1392-1399, doi: 10.1039/c1cc15393e.

Fiset et al., "Synthesis, Characterization and Modification of Azide-Containing Dendronized Diblock Copolymers", Polymer, vol. 50, No. 6, 2009, pp. 1369-1377, doi: 10.1016/j.polymer.2009.01.053.

Franco et al., "A Local Proton Source in a [Mn(Bpy-R)(Co)3br]-Type Redox Catalyst Enables Co2 Reduction Even in the absence of Bronsted Acids", Chemical Communications, vol. 50, No. 93, 2014, pp. 14670-14673, doi: 10.1039/C4CC05563B.

Fredrickson, "Surfactant-Induced Lyotropic Behavior of Flexible Polymer Solutions", Macromolecules, vol. 26, No. 11, 1993, pp. 2825-2831, doi: 10.1021/ma00063a029.

Fredrickson et al., "Dynamics of Block Copolymers: Theory and Experiment", Annual Review of Materials Science, vol. 26, No. 1, 1996, pp. 501-550, doi: 10.1146/annurev.ms.26.080196.002441.

Fu et al., "Volatilisation of Ferrocene from Ionic Liquids: Kinetics and Mechanism", Chemical Communications, vol. 47, No. 25, 2011, pp. 7083-7085, doi: 10.1039/C1CC12336J.

Fuller et al., "Ionic Liquid-Polymer Gel Electrolytes", Journal of The Electrochemical Society, vol. 144, No. 4, 1997, pp. L67-L70, doi: 10.1149/1.1837555.

Fullerton-Shirey et al., "Effect of $LiClO_4$ on the Structure and Mobility of PEO-Based Solid Polymer Electrolytes", Macromolecules, vol. 42, No. 6, 2009, pp. 2142-2156, doi: 10.1021/ma802502u.

Furstner et al., "Study Concerning the Effects of Chelation on the Structure and Catalytic Activity of Ruthenium Carbene Complexes", Organometallics, vol. 21, No. 2, 2002, pp. 331-335, doi: 10.1021/om0108503.

Gai et al., "Polystyrene-block-poly(ethylene oxide) Bottlebrush Block Copolymer Morphology Transitions: Influence of Side Chain Length and Volume Fraction", Macromolecules, vol. 50, No. 4, 2017, pp. 1503-1511, doi: 10.1021/acs.macromol.6b01415.

Galinski et al., "Ionic Liquids as Electrolytes", Electrochimica Acta, vol. 51, No. 26, 2006, pp. 5567-5580, doi: 10.1016/j.electacta.2006.03.016.

Galisteo-Lopez et al., "Self-Assembled Photonic Structures", Advanced Materials, vol. 23, No. 1, 2011, pp. 30-69, doi: 10.1002/adma.201000356.

Ganesan et al., "Mechanisms Underlying Ion Transport in Lamellar Block Copolymer Membranes", ACS Macro Letters, vol. 1, No. 4, 2012, pp. 513-518, doi: 10.1021/mz300051x.

Gao et al., "Synthesis of Molecular Brushes by "Grafting onto" Method: Combination of ATRP and Click Reactions", Journal of the American Chemical Society, vol. 129, No. 20, 2007, pp. 6633-6639, doi: 10.1021/ja0711617.

Gavelin et al., "Amphiphilic Polymer Gel Electrolytes. I. Preparation of Gels Based on Poly(Ethylene Oxide) Graft Copolymers Containing Different Ionophobic Groups", Journal of Polymer Science Part A: Polymer Chemistry, vol. 39, No. 13, 2001, pp. 2223-2232, doi: 10.1002/pola.1199.

Ge et al., "Responsive photonic crystals", Angewandte Chemie International Edition, vol. 50, No. 7, 2011, pp. 1492-1522, doi: 10.1002/anie.200907091.

Gerle et al., "Main Chain Conformation and Anomalous Elution Behavior of Cylindrical Brushes as Revealed by GPC/MALLS, Light Scattering, and SFM", Macromolecules, vol. 32, No. 8, 1999, pp. 2629-2637, doi: 10.1021/ma9816463.

(56) References Cited

OTHER PUBLICATIONS

Gomez et al., "Effect of Ion Distribution on Conductivity of Block Copolymer Electrolytes", Nano Letters, vol. 9, No. 3, 2009, pp. 1212-1216, doi: 10.1021/nl900091n.

Grason, "The Packing of Soft Materials: Molecular Asymmetry, Geometric Frustration and Optimal Lattices in Block Copolymer Melts", Physics Reports, vol. 433, No. 1, 2006, pp. 1-64, doi: 10.1016/j.physrep.2006.08.001.

Grayer et al., "A Comparative Experimental and Theoretical Study between Heteroarm Star and Diblock Copolymers in the Microphase Separated State", Macromolecules, vol. 33, No. 17, 2000, pp. 6330-6339, doi: 10.1021/ma000311u.

Green et al., "Macromolecular Stereochemistry: the Out-of-Proportion Influence of Optically Active Comonomers on the Conformational Characteristics of Polyisocyanates. The Sergeants and Soldiers Experiment", Journal of the American Chemical Society, vol. 111, No. 16, 1989, pp. 6452-6454, doi: 10.1021/ja00198a084.

Green et al., "The Macromolecular Route to Chiral Amplification", Angewandte Chemie International Edition, vol. 38, No. 21, 1999, pp. 3138-3154, doi: 10.1002/(SICI)1521-3773(19991102)38:21%3C3138::AID-ANIE3138%3E3.0.CO;2-C.

Grice et al., "Recent Studies of Rhenium and Manganese Bipyridine Carbonyl Catalysts for the Electrochemical Reduction of $CO_2$", Advances in Inorganic Chemistry, Elsevier, vol. 66, 2014, pp. 163-188, doi: 10.1016/B978-0-12-420221-4.00005-6.

Grills et al., "Electrocatalytic $CO_2$ Reduction with a Homogeneous Catalyst in Ionic Liquid: High Catalytic Activity at Low Overpotential", Journal of Physical Chemistry Letters, vol. 5, No. 11, 2014, pp. 2033-2038, doi: 10.1021/jz500759x.

Grills et al., "Mechanism of the Formation of a Mn-Based CO2 Reduction Catalyst Revealed by Pulse Radiolysis with Time-Resolved Infrared Detection", Journal of the American Chemical Society, vol. 136, No. 15, 2014, pp. 5563-5566, doi: 10.1021/ja501051s.

Grills et al., "New Directions for the Photocatalytic Reduction of $CO_2$: Supramolecular, $scCO_2$ or Biphasic Ionic Liquid-$scCO_2$ Systems", Journal of Physical Chemistry Letters, vol. 1, No. 18, 2010, pp. 2709-2718, doi: 10.1021/jz1010237.

Grimm et al., "Global Change and the Ecology of Cities", Science, vol. 319, No. 5864, 2008, pp. 756-760, doi: 10.1126/science.1150195.

Grubbs et al., "A Tandem Approach to Graft and Dendritic Graft Copolymers Based on "Living" Free Radical Polymerizations", Angewandte Chemie International Edition, vol. 36, No. 3, 1997, pp. 270-272, doi: 10.1002/anie.199702701. (Presented in 4 parts).

Grubbs et al., "Handbook of Metathesis: Polymer Synthesis; Wiley-VCH", Second Edition, 2015, 1608 pgs., doi: 10.1002/9783527674107.

Gu et al., "ABA-Triblock Copolymer Ion Gels for $CO_2$ Separation Applications", Journal of Membrane Science, vol. 423-424, 2012, pp. 20-26, doi: 10.1016/j.memsci.2012.07.011.

Gu et al., "High Toughness, High Conductivity Ion Gels by Sequential Triblock Copolymer Self-Assembly and Chemical Cross-Linking", Journal of the American Chemical Society, vol. 135, No. 26, 2013, pp. 9652-9655, doi: 10.1021/ja4051394.

Gu et al., "Self-Assembly of Symmetric Brush Diblock Copolymers", ACS Nano, vol. 7, No. 3, 2013, pp. 2551-2558, doi: 10.1021/nn305867d.

Hadjichristidis et al., "Polymers with Complex Architecture by Living Anionic Polymerization", Chemical Reviews, vol. 101, No. 12, 2001, pp. 3747-3792, doi: 10.1021/cr9901337.

Hadjichristidis et al., "The Strength of the Macromonomer Strategy for Complex Macromolecular Architecture: Molecular Characterization, Properties and Applications of Polymacromonomers", Macromolecular Rapid Communications, vol. 24, No. 17, 2003, pp. 979-1013, doi: 10.1002/marc.200300050.

Hallinan et al., "Polymer Electrolytes", Annual Review of Materials Research, vol. 43, No. 1, 2013, pp. 503-525, doi: 10.1146/annurev-matsci-071312-121705.

Hamley, "Nanostructure Fabrication Using Block Copolymers", Nanotechnology, vol. 14, No. 10, 2003, pp. R39-R54, doi: 10.1088/0957-4484/14/10/201.

Hammouda, "Structure Factors for Particulate Systems", Ch. 32 In; NIST Distance Learning, Accessible on the Internet at URL:http://www.ncnr.nist.gov/staff/hammouda/distance_learning/chapter_32.pdf (Published Jun. 2016), 11 pgs.

Hapiot et al., "Electrochemical Reactivity in Room-Temperature Ionic Liquids", Chemical Reviews, vol. 108, No. 7, 2008, pp. 2238-2264, doi: 10.1021/cr0680686.

Harrison et al., "Compendium of Organic Synthetic Methods", John Wiley & Sons, New York, vol. 1, 1971, 539 pgs., doi: 10.1002/9780470125946.

Harrison et al., "Compendium of Organic Synthetic Methods", John Wiley & Sons, New York, vol. 2, 1974, 449 pgs., doi: 10.1002/9780470125953.

Hashimoto et al., "Gelation Mechanism of Tetra-armed Poly(ethylene glycol) in Aprotic Ionic Liquid Containing Nonvolatile Proton Source, Protic Ionic Liquid", The Journal of Physical Chemistry B, vol. 119, No. 13, 2015, pp. 4795-4801, doi: 10.1021/acs.jpcb.5b00274.

Hashimoto et al., "Ordered structure in blends of block copolymers. 1. Miscibility criterion for lamellar block copolymers", Macromolecules, vol. 26, No. 11, 1993, pp. 2895-2904, doi: 10.1021/ma00063a039.

Hatakeyama et al., "Coarse-Grained Simulations of ABA Amphiphilic Triblock Copolymer Solutions in thin Films", Physical Chemistry Chemical Physics, vol. 9, No. 33, 2007, pp. 4662-4672, doi: 10.1039/B702241G.

Hawecker et al., "Electrocatalytic Reduction of Carbon Dioxide Mediated by Re(bipy)(CO)&I (bipy = 2,2'-bipyridine)", Journal of the Chemical Society, Chemical Communications, vol. 6, 1984, pp. 328-330, doi: 10.1039/c39840000328.

Hawecker et al., "Photochemical and Electrochemical Reduction of Carbon Dioxide to Carbon Monoxide Mediated by (2,2'-Bipyridine)tricarbonylchlororhenium(I) and Related Complexes as Homogeneous Catalysts", Helvetica Chimica Acta, vol. 69, No. 8, 1986, pp. 1990-2012, doi: 10.1002/hlca.19860690824.

Hawker et al., "Block Copolymer Lithography: Merging 'Bottom-Up' with Top- Down Processes", MRS Bulletin, vol. 30, No. 12, 2005, pp. 952-966, doi: 10.1557/mrs2005.249.

Hayashi et al., "Involvement of a Binuclear Species with the Re—C(O)O—Re Moiety in CO2 Reduction Catalyzed by Tricarbonyl Rhenium(I) Complexes with Diimine Ligands: Strikingly Slow Formation of the Re—Re and Re—C(O)O—Re Species from Re(dmb)(CO)3S (dmb = 4,4'-Dimethyl- 2,2'-bipyridine, S = Solvent)", Journal of the American Chemical Society, vol. 125, No. 39, 2003, pp. 11976-11987, doi: 10.1021/ja035960a.

Hayes et al., "Structure and Nanostructure in Ionic Liquids", Chemical Reviews, vol. 115, No. 13, 2015, pp. 6357-6426, doi: 10.1021/cr500411q.

He et al., "Ion Gels by Self-Assembly of a Triblock Copolymer in an Ionic Liquid", Journal of Physical Chemistry B, vol. 111, No. 18, 2007, pp. 4645-4652, doi: 10.1021/jp064574n.

Hegedus et al., "Compendium of Organic Synthetic Methods", John Wiley & Sons, New York, vol. 3, 1977, 508 pgs., doi: 10.1002/9780470125960.

Hepp et al., "A Chemical Approach to Carbon Dioxide Utilization on Mars", The Proceedings of the In Situ Resource Utilization (ISRU) Technical Interchange Meeting, Feb. 4-5, 1997, pp. 799-818.

Heroguez et al., "Synthesis of α-Norbornenylpoly(ethylene oxide) Macromonomers and Their Ring-Opening Metathesis Polymerization", Macromolecules, vol. 29, No. 13, 1996, pp. 4459-4464, doi: 10.1021/ma951797v.

Hickey et al., "Synthesis and Evaluation of Cationic Norbornanes as Peptidomimetic Antibacterial Agents", Organic & Biomolecular Chemistry, vol. 13, No. 22, 2015, pp. 6225-6241, doi: 10.1039/C5OB00621J.

Hogan et al., "Facile Analysis of EC Cyclic Voltammograms", Analytical Chemistry, vol. 76, No. 8, 2004, pp. 2256-2260, doi: 10.1021/ac035108m.

(56) References Cited

OTHER PUBLICATIONS

Hong et al., "Large deformation and electrochemistry of polyelectrolyte gels", Journal of the Mechanics and Physics of Solids, vol. 58, No. 4, 2010, pp. 558-577, doi: 10.1016/j.jmps.2010.01.005.

Hong et al., "On the Self-Assembly of Brush Block Copolymers in Thin Films", ACS Nano, vol. 7, No. 11, 2013, pp. 9684-9692, doi: 10.1021/nn402639g.

Hong et al., "Photocatalytic reduction of $CO_2$: a brief review on product analysis and systematic methods", Analytical Methods, vol. 5, No. 5, 2012, pp. 1086-1097, doi: 10.1039/C2AY26270C.

Hou et al., "The Effect of Different Lithium Salts on Conductivity of Comb-Like Polymer Electrolyte with Chelating Functional Group", Electrochimica Acta, vol. 48, No. 6, 2003, pp. 679-690, doi: 10.1016/S0013-4686(02)00737-5.

Hsu et al., "Characteristic Length Scales and Radial Monomer Density Profiles of Molecular Bottle-Brushes: Simulation and Experiment", Macromolecules, vol. 43, No. 3, 2010, pp. 1592-1601, doi: 10.1021/ma902101n.

Hsu et al., "Highly Conductive, Crosslinked Ionomers Based on Poly(Styrene-co-Maleic Anhydride) for Water Electrolysis", Journal of Materials Chemistry A, vol. 1, No. 28, 2013, pp. 8093-8096, doi: 10.1039/C3TA11059A.

Hu et al., "Directed Self-Assembly of Block Copolymers: a Tutorial Review of Strategies for Enabling Nanotechnology with Soft Matter", Soft Matter, vol. 10, No. 22, 2014, pp. 3867-3889, doi: 10.1039/C3SM52607K.

Hu et al., "Linear Rheological Response of a Series of Densely Branched Brush Polymers", Macromolecules, vol. 44, No. 17, 2011, pp. 6935-6943, doi: 10.1021/ma2009673.

Hu et al., "Transformation of Atmospheric $CO_2$ Catalyzed by Protic Ionic Liquids: Efficient Synthesis of 2-Oxazolidinones", Angewandte Chemie International Edition, vol. 54, No. 18, 2015, pp. 5399-5403, doi: 10.1002/anie.201411969.

Hultgren et al., "Reference Potential Calibration and Voltammetry at Macrodisk Electrodes of Metallocene Derivatives in the Ionic Liquid [Bmim][PF6]", Analytical Chemistry, vol. 74, No. 13, 2002, pp. 3151-3156, doi: 10.1021/ac015729k.

Hustad et al., "Photonic Polyethylene from Self-Assembled Mesophases of Polydisperse Olefin Block Copolymers", Macromolecules, vol. 42, No. 11, 2009, pp. 3788-3794, doi: 10.1021/ma9002819.

Imaizumi et al., "Driving Mechanisms of Ionic Polymer Actuators Having Electric Double Layer Capacitor Structures", Journal of Physical Chemistry B, vol. 116, No. 16, 2012, pp. 5080-5089, doi: 10.1021/jp301501c.

Inglis et al., "Electrocatalytic Pathways Towards Sustainable Fuel Production from Water and $CO_2$", Coordination Chemistry Reviews, vol. 256, No. 21-22, 2012, pp. 2571-2600, doi: 10.1016/j.ccr.2012.05.002.

Izuhara et al., "Electroactive Block Copolymer Brushes on Multiwalled Carbon Nanotubes", Macromolecules, vol. 42, No. 15, 2009, pp. 5416-5418, doi: 10.1021/ma9006076.

Jaacks, "A Novel Method of Determination of Reactivity Ratios in Binary and Ternary Copolymerizations", Macromolecular Chemistry and Physics, vol. 161, No. 1, 1972, pp. 161-172, doi: 10.1002/macp.1972.021610110.

Jang et al., "Synthesis of Cis, syndiotactic A-alt-B Copolymers from Two Enantiomerically Pure Trans-2,3-Disubstituted-5,6-Norbornenes", ACS Central Science, vol. 2, No. 9, 2016, pp. 631-636, doi: 10.1021/acscentsci.6b00200.

Jeon et al., "Fabricating Complex Three-Dimensional Nanostructures with High-Resolution Conformable Phase Masks", Proceedings of the National Academy of Sciences, vol. 101, No. 34, 2004, pp. 12428-12433, doi: 10.1073/pnas.0403048101.

Jeon et al., "Patterned Polymer Growth on Silicon Surfaces Using Microcontact Printing and Surface-Initiated Polymerization", Applied Physics Letters, vol. 75, No. 26, 1999, pp. 4201-4203, doi: 10.1063/1.125582.

Jeong et al., "Formation of Alternating trans-A-alt-B Copolymers through Ring-Opening Metathesis Polymerization Initiated by Molybdenum Imido Alkylidene Complexes", Organometallics, vol. 34, No. 20, 2015, pp. 5136-5145, doi: 10.1021/acs.organomet.5b00709.

Jeong et al., "Rheological Influence of Short-Chain Branching for Polymeric Materials under Shear with Variable Branch Density and Branching Architecture", Macromolecules, vol. 50, No. 11, 2017, pp. 4491-4500, doi: 10.1021/acs.macromol.7b00544.

Jha et al., "Synthesis of Ultralarge Molecular Weight Bottlebrush Polymers Using Grubbs' Catalysts", Macromolecules, vol. 37, No. 12, 2004, pp. 4365-4374, doi: 10.1021/MA049647K.

Jiang et al., "A Novel Architecture toward Third-Generation Thermoplastic Elastomers by a Grafting Strategy", Macromolecules, vol. 46, No. 12, 2013, pp. 4772-4780, doi: 10.1021/ma4007472.

Jiang et al., "Microphase Separation of Short Wormlike Diblock Copolymers with a Finite Interaction Range", Soft Matter, vol. 12, No. 8, 2016, pp. 2481-2490, doi: 10.1039/C5SM02865E.

Johnson et al., "Core-Clickable PEG-Branch-Azide Bivalent-Bottle-Brush Polymers by ROMP: Grafting-Through and Clicking-To", Journal of the American Chemical Society, vol. 133, No. 3, 2011, pp. 559-566, doi: 10.1021/ja108441d.

Johnson et al., "Drug-Loaded, Bivalent-Bottle-Brush Polymers by Graft-through ROMP", Macromolecules, vol. 43, No. 24, 2010, pp. 10326-10335, doi: 10.1021/ma1021506.

Johnson et al., "Electrocatalytic Reduction of CO2 Using the Complexes [Re(bpy)(CO)3L]n (n = +1, L = P(OEt)3, CH3CN; n = 0, L = Cl-, Otf -; bpy = 2,2'-Bipyridine; Otf- = CF3SO3) as Catalyst Precursors: Infrared Spectroelectrochemical Investigation", Organometallics, vol. 15, No. 15, 1996, pp. 3374-3387, doi: 10.1021/om960044+.

Jordan et al., "Biodegradation of Ionic Liquids—a Critical Review", Chemical Society Reviews, vol. 44, No. 22, 2015, pp. 8200-8237, doi: 10.1039/C5CS00444F.

Juris et al., "Synthesis and Photophysical and Electrochemical Properties of New Halotricarbonyl(Polypyridine)Rhenium(I) Complexes", Inorganic Chemistry, vol. 27, No. 22, 1988, pp. 4007-4011, doi: 10.1021/ic00295a022.

Kalnay et al., "Impact of Urbanization and Land-Use Change on Climate", Nature, vol. 423, No. 6939, 2003, pp. 528-531, doi: 10.1038/nature01675.

Kane et al., "Phase Behavior and Morphological Characteristics of Compositionally Symmetric Diblock Copolymer Blends", Macromolecules, vol. 29, No. 27, 1996, pp. 8862-8870, doi: 10.1021/ma9613291.

Miyake et al., "Synthesis of Isocyanate-Based Brush Block Copolymers and Their Rapid Self-Assembly to Infrared-Reflecting Photonic Crystals", Journal of the American Chemical Society, vol. 134, No. 34, 2012, pp. 14249-14254, doi: 10.1021/ja306430k.

Moatsou et al., "Precision polymers: a kinetic approach for functional poly(norbornenes)", Chemical Science, vol. 5, No. 6, 2014, pp. 2246-2250, doi: 10.1039/c4sc00752b.

Moon et al., "Chemical Aspects of Three-Dimensional Photonic Crystals", Chemical Reviews, vol. 110, No. 1, 2010, pp. 547-574, doi: org/10.1021/cr900080v.

Moon et al., "Solution-Processable Electrochemiluminescent Ion Gels for Flexible, Low-Voltage, Emissive Displays on Plastic", Journal of the American Chemical Society, vol. 136, No. 9, 2014, pp. 3705-3712, doi: 10.1021/ja5002899.

Mortensen et al., "Structural Study on the Micelle Formation of Poly(Ethylene Oxide)-Poly(Propylene Oxide)-Poly(Ethylene Oxide) Triblock Copolymer in Aqueous Solution", Macromolecules, vol. 26, No. 4, 1993, pp. 805-812, doi: 10.1021/ma00056a035.

Muftuoglu et al., "Photoinitiated Crosslinking and Grafting of Methylmethacrylate Using N,N-Dimethyl Amino Functional Polystyrene Block Copolymers", Turkish Journal of Chemistry, vol. 28, No. 4, 2004, pp. 469-476.

Mullner et al., "Cylindrical polymer brushes—Anisotropic building blocks, unimolecular templates and particulate nanocarriers", Polymer, vol. 98, 2016, pp. 389-401, doi: 10.1016/j.polymer.2016.03.076.

Neese, "Software update: the ORCA program system, version 4.0", Wiley Interdisciplinary Reviews: Computational Molecular Science, vol. 8, No. 1, e1327, 2018, pp. 1-6, doi: 10.1002/wcms.1327.

(56) References Cited

OTHER PUBLICATIONS

Neiser et al., "Polymerization of Macromonomers to Cylindrical Brushes Initiated by Organolanthanides", Macromolecules, vol. 36, No. 15, 2003, pp. 5437-5439, doi: 10.1021/ma034196+.

Neugebauer et al., "How Dense Are Cylindrical Brushes Grafted from a Multifunctional Macroinitiator?", Polymer, vol. 45, No. 24, 2004, pp. 8173-8179, doi: 10.1016/j.polymer.2004.09.069.

Nguyen et al., "Nanocomposite Hydrogels based on Liquid Crystalline Brush-like Block Copolymer/Au nanorods and its Application in H2O2 Detection", Chemical Communications, vol. 51, No. 61, 2015, 12174-12177, doi: 10.1039/C5CC02559A.

Nguyen et al., "Nanostructured Ion Gels from Liquid Crystalline Block Copolymers and Gold Nanoparticles in Ionic Liquids: Manifestation of Mechanical and Electrochemical Properties", Journal of Materials Chemistry C, vol. 3, No. 2, 2015, 399-408, doi: 10.1039/c4tc01702a.

Nicholson et al., "Theory of Stationary Electrode Polarography: Single Scan and Cyclic Methods Applied to Reversible, Irreversible, and Kinetic Systems", Analytical Chemistry, vol. 36, No. 4, 1964, pp. 706-723, doi: 10.1021/ac60210a007.

Niitani et al.. "Characteristics of New-Type Solid Polymer Electrolyte Controlling Nano-Structure", Journal of Power Sources, vol. 146, No. 1-2, 2005, pp. 386-390, doi: 10.1016/j.jpowsour.2005.03.102.

Niitani et al., "Star-Shaped Polymer Electrolyte with Microphase Separation Structure for All-Solid-State Lithium Batteries", Journal of The Electrochemical Society, vol. 156, No. 7, 2009, pp. A577-A583, doi: 10.1149/1.3129245.

Niitani et al., "Synthesis of Li+ Ion Conductive PEO-PSt Block Copolymer Electrolyte with Microphase Separation Structure", Electrochemical and Solid-State Letters, vol. 8, No. 8, 2005, pp. A385-A388, doi: 10.1149/1.1940491.

Noel et al., "Self-Reporting Degradable Fluorescent Grafted Copolymer Micelles Derived from Biorenewable Resources", ACS Macro Letters, vol. 4, No. 6, 2015, pp. 645-650, doi: 10.1021/acsmacrolett.5b00227.

Odian, "Principles of Polymerization", 4th Edition; John Wiley & Sons, Inc.: Hoboken, NJ, 2004, 835 pgs.(Presented in 4 parts).

Oh et al., "Ionic Liquids Enhance the Electrochemical CO2 Reduction Catalyzed by Moo2", Chemical Communications, vol. 51, No. 71, 2015, pp. 13698-13701, doi: 10.1039/c5cc05263g.

Ohno et al., "Controlling Grafting Density and Side Chain Length in Poly(N-Butyl Acrylate) by ATRP Copolymerization of Macromonomers", Journal of Polymer Science Part A Polymer Chemistry, vol. 44, No. 19, 2006, pp. 5454-5467, doi: 10.1002/pola.21669.

Olvera De La Cruz et al., "Theory of Microphase Separation in Graft and Star Copolymers", Macromolecules, vol. 19, No. 10, 1986, pp. 2501-2508, doi: 10.1021/ma00164a008.

Ong et al., "Electrochemical Windows of Room-Temperature Ionic Liquids from Molecular Dynamics and Density Functional Theory Calculations", Chemistry of Materials, vol. 23, No. 11, 2011, pp. 2979-2986, doi: 10.1021/cm200679y.

Oono et al., "2/3 -Power Law for Copolymer Lamellar Thickness Implies a 1/3-Power Law for Spinodal Decomposition", Physical Review Letters, vol. 61, No. 9, 1988, pp. 1109-1111.

Orfanidis, "Electromagnetic Waves and Antennas", Rutgers University, Jun. 1, 2014, retrieved from http://www.ece.rutgers.edu/~orfanidi/ewa/, 610 pgs. (Presented in 3 parts).

O'Toole et al., "Electrocatalytic Reduction of CO2 at a Chemically Modified Electrode", Journal of Chemical Society, Chemical Communication, Issue No. 20, 1985, pp. 1416-1417, doi: 10.1039/c39850001416.

Pakula et al., "Molecular Brushes as Super-Soft Elastomers", Polymer, vol. 47, No. 20, 2006, pp. 7198-7206, doi: 10.1016/j.polymer.2006.05.064.

Panday et al., "Effect of Molecular Weight and Salt Concentration on Conductivity of Block Copolymer Electrolytes", Macromolecules, vol. 42, No. 13, 2009, pp. 4632-4637, doi: 10.1021/ma900451e.

Pangborn et al., "Safe and Convenient Procedure for Solvent Purification", Organometallics, vol. 15, No. 5, 1996, pp. 1518-1520, doi: 10.1021/om9503712.

Paquet et al., "Nanostructured Polymers for Photonics", Materials Today, vol. 11, No. 4, 2008, pp. 48-56, doi: 10.1016/S1369-7021(08)70056-7.

Park et al., "Block Copolymer Lithography: Periodic Arrays of-10[11] Holes in 1 Square Centimeter", Science, vol. 276, No. 5317, 1997, pp. 1401-1404, doi: 10.1126/science.276.5317.1401.

Park et al., "Enabling Nanotechnology with Self Assembled Block Copolymer Patterns", Polymer, vol. 44, No. 22, 2003, pp. 6725-6760, doi: 10.1016/j.polymer.2003.08.011.

Park et al., "Macroscopic 10-Terabit-per-Square-Inch Arrays from Block Copolymers with Lateral Order", Science, vol. 323, No. 5917, 2009, pp. 1030-1033, doi: 10.1126/science.1168108.

Park et al., "Synthesis of Norbornene Derivative Using Diels-Alder Reaction", Advanced Materials Research, vol. 421, 2012, pp. 136-139, doi: 10.4028/www.scientific.net/AMR.421.136.

Parnell et al., "Continuously Tuneable Optical Filters from Self-Assembled Block Copolymer Blends", Soft Matter, vol. 7, No. 8, 2011, pp. 3721-3725, doi: 10.1039/COSM01320J.

Patten et al., "Living" Titanium(IV) Catalyzed Coordination Polymerizations of Isocyanates, Journal of the American Chemical Society, vol. 133, No. 13, 1991, pp. 5065-5066, doi: 10.1021/ja00013a055.

Patten et al., "Living Organotitanium(IV)-Catalyzed Polymerizations of Isocyanates", Journal of the American Chemical Society, vol. 118, No. 8, 1996, pp. 1906-1916, doi: 10.1021/ja9534516.

Paturej et al., "Molecular Structure of Bottlebrush Polymers in Melts", Science Advances, vol. 2, No. 11, 2016, e1601478, pp. 1-12, doi: 10.1126/sciadv.1601478.

Patz et al., "Impact of Regional Climate Change on Human Health", Nature, vol. 438, No. 7066, 2005, pp. 310-317, doi: 10.1038/nature04188.

Pedersen, "Determination of size distribution from small-angle scattering data for systems with effective hard-sphere interactions", Journal of Applied Crystallography, vol. 27, No. 4, 1994, pp. 595-608, doi: 10.1107/S0021889893013810.

Pelletier et al., "Aluminum Nanowire Polarizing Grids: Fabrication and Analysis", Applied Physics Letters, vol. 88, 2006, pp. 211114-1-211114-3, doi: 10.1063/1.2206100.

Peng et al., "Smart Polymer Brushes and Their Emerging Applications", RSC Advances, vol. 2, No. 23, 2012, pp. 8557-8578, doi: 10.1039/C2RA20451G.

Peng et al., "Surface Urban Heat Island Across 419 Global Big Cities", Environmental Science & Technology, vol. 46, No. 2, 2012, pp. 696-703, doi: 10.1021/es2030438.

Pesek et al., "Small-Angle Neutron Scattering Analysis of Bottlebrush Backbone and Side Chain Flexibility", Journal of Polymer Science, Part B: Polymer Physics, vol. 55, No. 1, 2017, pp. 104-111, doi: 10.1002/polb.24251.

Pesek et al., "Small-Angle Neutron Scattering Analysis of Bottlebrush Polymers Prepared via Grafting-Through Polymerization", Macromolecules, vol. 46, No. 17, 2013, pp. 6998-7005, doi: 10.1021/ma401246b.

Ping et al., "Microphase Separation and High Ionic Conductivity at High Temperatures of Lithium Salt-Doped Amphiphilic Alternating Copolymer Brush with Rigid Side Chains", Macromolecules, vol. 48, No. 23, 2015, pp. 8557-8564, doi: 10.1021/acs.macromol.5b01678.

Piunova et al., "Highly Ordered Dielectric Mirrors via the Self-Assembly of Dendronized Block Copolymers", Journal of the American Chemical Society, vol. 135, No. 41, 2013, pp. 15609-15616, doi: 10.1021/ja4081502.

Poelma et al., "Cyclic Block Copolymers for Controlling Feature Sizes in Block Copolymer Lithography", ACS Nano, vol. 6, No. 12, 2012, pp. 10845-10854, doi: 10.1021/nn304217y.

Pollino et al., "Living ROMP of exo-Norbornene Esters Possessing Pd" SCS Pincer Complexes or Diaminopyridines, Macromolecules, vol. 36, No. 7, 2003, pp. 2230-2234, doi: 10.1021/ma025873n.

Polymeropoulos et al., "50th Anniversary Perspective: Polymers with Complex Architectures", Macromolecules, vol. 50, No. 4, 2017, pp. 1253-1290, doi: 10.1021/acs.macromol.6b02569.

(56) References Cited

OTHER PUBLICATIONS

Prudnikova et al., "Biomimetic Proteoglycans Mimic Macromolecular Architecture and Water Uptake of Natural Proteoglycans", Biomacromolecules, vol. 18, No. 6, 2017, pp. 1713-1723, doi: 10.1021/acs.biomac.7b00032.

Pusey et al., "Phase Behaviour of Concentrated Suspensions of Nearly Hard Colloidal Spheres", Nature, vol. 320, No. 6060, 1986, pp. 340-342, doi: 10.1038/320340a0.

Qiao et al., "A Review of Catalysts for the Electroreduction of Carbon Dioxide to Produce Low-Carbon Fuels", Chemical Society Reviews, vol. 43, No. 2, 2013, pp. 631-675, doi: 10.1039/c3cs60323g.

Qiu et al., "Self-Assembled Polyethylenimine-Graft-Poly(ε-Caprolactone) Micelles as Potential Dual Carriers of Genes and Anticancer Drugs", Biomaterials, vol. 28, No. 28, 2007, pp. 4132-4142, doi: 10.1016/j.biomaterials.2007.05.035.

Quartarone et al., "Electrolytes for Solid-State Lithium Rechargeable Batteries: Recent Advances and Perspectives", Chemical Society Reviews, vol. 40, No. 5, 2011, pp. 2525-2540, doi: 10.1039/c0cs00081g.

Quezada et al., "Electrocatalytic Reduction of Carbon Dioxide on a Cobalt Tetrakis(4-Aminophenyl)Porphyrin Modified Electrode in BMImBF4", New Journal of Chemistry, vol. 38, No. 8, 2014, pp. 3606-3612, doi: 10.1039/c4nj00519h.

Quinn et al., "Novel Electrochemical Studies of Ionic Liquids", Langmuir, vol. 18, No. 5, 2002, pp. 1734-1742, doi: 10.1021/la011458x.

Radzinski et al., "Bottlebrush Polymer Synthesis by Ring-Opening Metathesis Polymerization: The Significance of the Anchor Group", Journal of the American Chemical Society, vol. 138, No. 22, 2016, pp. 6998-7004, doi: 10.1021/jacs.Sb13317.

Radzinski et al., "Synthesis of Bottlebrush Polymers via Transfer-to and Grafting-through Approaches using a RAFT Chain Transfer Agent with a ROMP-Active Z-Group", Polymer Chemistry, vol. 6, 2015, pp. 5643-5652, doi: 10.1039/c4py01567c.

Radzinski et al., "Tapered Bottlebrush Polymers: Cone-Shaped Nanostructures by Sequential Addition of Macromonomers", ACS Macro Letters, vol. 6, No. 10, 2017, pp. 1175-1179, doi: 10.1021/acsmacrolett.7b00724.

Rathgeber et al., "On the Shape of Bottle-Brush Macromolecules: Systematic Variation of Architectural Parameters", The Journal of Chemical Physics, vol. 122, No. 12, 2005, pp. 124904-01-124904-13, doi: 10.1063/1.1860531.

Read et al., "Linking Models of Polymerization and Dynamics to Predict Branched Polymer Structure and Flow", Science, vol. 333, No. 6051, 2011, pp. 1871-1874.

Rey et al., "Structural Transition in an Ionic Liquid Controls $CO_2$ Electrochemical Reduction", The Journal of Physical Chemistry C., vol. 119, No. 36, 2015, pp. 20892-20899, doi: 10.1021/acs.jpcc.5b03397.

Rizwan et al., "A Review on the Generation, Determination and Mitigation of Urban Heat Island", Journal of Environmental Sciences, vol. 20, No. 1, 2008, pp. 120-128, doi: 10.1016/s1001-0742(08)60019-4.

Rogers et al., "Voltammetric Characterization of the Ferrocene|Ferrocenium and Cobaltocenium|Cobaltocene Redox Couples in RTILs", The Journal of Physical Chemistry C, vol. 112, No. 7, 2008, pp. 2729-2735, doi: 10.1021/jp710134e.

Rosso et al., "Removal of Palladium from Organic Reaction Mixtures by Trimercaptotriazine", Organic Process Research & Development, vol. 1, No. 4, 1997, pp. 311-314, doi: 10.1021/op970107f.

Rouault et al., "Comb-Branched Polymers: Monte Carlo Simulation and Scaling", Macromolecules, vol. 29, No. 7, 1996, pp. 2605-2611, doi: 10.1021/ma951126x.

Rule et al., "ROMP Reactivity of endo- and exo-Dicyclopentadiene", Macromolecules, vol. 35, No. 21, 2002, pp. 7878-7882, doi: 10.1021/ma0209489.

Runge et al., "Investigation of the Assembly of Comb Block Copolymers in the Solid State", Macromolecules, vol. 41, No. 20, 2008, pp. 7687-7694, doi: 10.1021/ma8009323.

Rutenberg et al., "Synthesis of Polymer Dielectric Layers for Organic Thin Film Transistors via Surface-Initiated Ring-Opening Metathesis Polymerization", Journal of the American Chemical Society, vol. 126, No. 13, 2004, pp. 4062-4063, doi: 10.1021/ja035773c.

Rzayev, "Molecular Bottlebrushes: New Opportunities in Nanomaterials Fabrication", ACS Macro Letters, vol. 1, No. 9, 2012, pp. 1146-1149, doi: dx.doi.org/10.1021/mz300402x.

Rzayev, "Synthesis of Polystyrene-Polylactide Bottlebrush Block Copolymers and Their Melt Self-Assembly into Large Domain Nanostructures", Macromolecules, vol. 42, No. 6, 2009, pp. 2135-2141, doi: 10.1021/ma802304y.

Saariaho et al., "Effect of Side Chain Rigidity on the Elasticity of Comb Copolymer Cylindrical Brushes: a Monte Carlo Simulation Study", Macromolecules, vol. 32, No. 13, 1999, pp. 4439-4443, doi: 10.1021/ma990307m.

Sahara et al., "Efficient Photocatalysts for $CO_2$ Reduction", Inorganic Chemistry, vol. 54, No. 11, 2015, pp. 5096-5104, doi: 10.1021/ic502675a.

Sampson et al., "Direct Observation of the Reduction of Carbon Dioxide by Rhenium Bipyridine Catalysts", Energy & Environmental Science, vol. 6, No. 12, 2013, pp. 3748-3755, doi: 10.1039/c3ee42186d.

Sampson et al., "Manganese Catalysts with Bulky Bipyridine Ligands for the Electrocatalytic Reduction of Carbon Dioxide: Eliminating Dimerization and Altering Catalysis", Journal of the American Chemical Society, vol. 136, No. 14, 2014, pp. 5460-5471, doi: 10.1021/ja501252f.

Sanford et al., "Mechanism and Activity of Ruthenium Olefin Metathesis Catalysts", Journal of the American Chemical Society, vol. 123, No. 27, 2001, pp. 6543-6554, doi: 10.1021/ja010624k.

Saveant, "Molecular Catalysis of Electrochemical Reactions. Mechanistic Aspects", Chemical Reviews, vol. 108, 2008, pp. 2348-2378, doi: 10.1021/cr068079z.

Schappacher et al., "From Combs to Comb-g-Comb Centipedes", Macromolecules, vol. 38, No. 17, 2005, pp. 7209-7213, doi: 10.1021/ma0510760.

Schulze et al., "High-Modulus, High-Conductivity Nanostructured Polymer Electrolyte Membranes via Polymerization-Induced Phase Separation", Nano Letters, vol. 14, No. 1, 2013, pp. 122-126, doi: 10.1021/nl4034818.

Seehof et al., "Selective Reaction with Exo-Isomers in Ring-Opening Olefin Metathesis Polymerization (ROMP) of Fluoroalkyl-Substituted Norbornene Derivatives", Macromolecules, vol. 26, No. 4, 1993, pp. 695-700, doi: 10.1021/ma00056a021.

Seel et al., "Electrochemical Intercalation of PF6 into Graphite", Journal of Electrochemical Society, vol. 147, No. 3, 2000, pp. 892-898, doi: 10.1149/1.1393288.

Segalman, "Patterning with Block Copolymer Thin Films", Materials Science and Engineering R Reports, vol. 48, No. 6, 2005, pp. 191-226, doi: 10.1016/j.mser.2004.12.003.

Seitz et al., "Self-Assembly and Stress Relaxation in Acrylic Triblock Copolymer Gels", Macromolecules, vol. 40, No. 4, 2007, pp. 1218-1226, doi: 10.1021/ma061993+.

Seki et al., "Distinct Difference in Ionic Transport Behavior in Polymer Electrolytes Depending on the Matrix Polymers and Incorporated Salts", The Journal of Physical Chemistry B., vol. 109, No. 9, 2005, pp. 3886-3892, doi: 10.1021/jp045328j.

Semenov, "Contribution to the Theory of Microphase Layering in Block-Copolymer Melts", Sov. Phys., Journal of Experimental and Theoretical Physics, vol. 61, Issue 4, 1985, pp. 733-742.

Seo et al., "Effect of Cation on Physical Properties and CO2 Solubility for Phosphonium-Based Ionic Liquids with 2-Cyanopyrrolide Anions", The Journal of Physical Chemistry B, vol. 119, No. 35, 2015, pp. 11807-11814, doi: 10.1021/acs.jpcb.5b05733.

Shah et al., "Chiroptical Properties of Graft Copolymers Containing Chiral Poly(n- hexyl isocyanate) as a Side Chain", Macromolecules, vol. 44, No. 20, 2011, pp. 7917-7925, doi: 10.1021/ma2019649.

Sheiko et al., "Cylindrical Molecular Brushes: Synthesis, Characterization, and Properties", Progress in Polymer Science, vol. 33, No. 7, 2008, pp. 759-785, doi: 10.1016/j.progpolymsci.2008.05.001.

(56) References Cited

OTHER PUBLICATIONS

Sheiko et al., "Visualization of Macromolecules—A First Step to Manipulation and Controlled Response", Chemical Reviews, vol. 101, No. 12, 2001, pp. 4099-4123, doi: 10.1021/cr990129v.

Shinoda et al., "Structural Control of Poly(Methyl Methacrylate)-g-poly(Lactic Acid) Graft Copolymers by Atom Transfer Radical Polymerization (ATRP)", Macromolecules, vol. 34, No. 18, 2001, pp. 6243-6248.

Sing et al., "Theory of Melt Polyelectrolyte Blends and Block Copolymers: Phase Behavior, Surface Tension, and Microphase Periodicity", The Journal of Chemical Physics, vol. 142, 2015, 034902-1-034902-18, doi: 10.1063/1.4905830.

Singh et al., "Effect of Molecular Weight on the Mechanical and Electrical Properties of Block Copolymer Electrolytes", Macromolecules, vol. 40, No. 13, 2007, pp. 4578-4585, doi: 10.1021/ma0629541.

Singh et al., "Manipulating Ordering Transitions in Interfacially Modified Block Copolymers", Soft Matter, vol. 5, 2009, pp. 4757-4762.

Slugovc, "The Ring Opening Metathesis Polymerisation Toolbox", Macromolecular Rapid Communications, vol. 25, 2004, pp. 1283-1297, doi: 10.1002/marc.200400150.

Slugovc et al., "The Resting State Makes the Difference: The Influence of the Anchor Group in the ROMP of Norbornene Derivatives", Macromolecular Rapid Communications, vol. 25, No. 3, 2004, pp. 475-480, doi: 10.1002/marc.200300196.

Smieja et al., "Manganese as a Substitute for Rhenium in $CO_2$ Reduction Catalysts: The Importance of Acids", Inorganic Chemistry, 52, 2013, pp. 2484-2491, doi: 10.1021/ic302391u.

Smieja et al., "Re(bipy-tBu)(CO)$_3$Cl-improved Catalytic Activity for Reduction of Carbon Dioxide: IR-Spectroelectrochemical and Mechanistic Studies", Inorganic Chemistry, vol. 49, No. 20, 2010, pp. 9283-9289, doi: 10.1021/ic1008363.

Song et al., "Review of Gel-Type Polymer Electrolytes for Lithium-Ion Batteries", J. Power Sources, vol. 77, No. 2, 1999, pp. 183-197, doi: 10.1016/s0378-7753(98)00193-1.

Soo et al., "Preparation of Block Copolymer Vesicles in Solution", Journal of Polymer Science Part B:Polymer Physics, vol. 42, No. 6, 2004, pp. 923-938, doi: 10.1002/polb.10739.

South et al., "Modular and Dynamic Functionalization of Polymeric Scaffolds", Accounts of Chemical Research, vol. 40, No. 1, 2007, pp. 63-74, doi: 10.1021/ar0500160.

Stephan et al., "Review on Composite Polymer Electrolytes for Lithium Batteries", Polymer, vol. 47, No. 16, 2006, pp. 5952-5964, doi: 10.1016/j.polymer.2006.05.069.

Stoykovich et al., "Block Copolymers and Conventional Lithography", Materials Today, vol. 9, No. 9, 2006, pp. 20-29, doi: 10.1016/S1369-7021(06)71619-4.

Sullivan et al., "One- and Two-Electron Pathways in the Electrocatalytic Reduction of $CO_2$ by Fac-Re(Bpy)(CO)3Cl (Bpy = 2,2'-Bipyridine)", Journal of the Chemical Society, Chemical Communications, vol. 20, 1985, 1414-1416.

Sumerlin et al., "Initiation Efficiency in the Synthesis of Molecular Brushes by Grafting from via Atom Transfer Radical Polymerization", Macromolecules, vol. 38, 2005, pp. 702-708, doi: 10.1021/ma048351b.

Sun et al., "Nanoscopic Cylindrical Dual Concentric and Lengthwise Block Brush Terpolymers as Covalent Preassembled High-Resolution and High-Sensitivity Negative-Tone Photoresist Materials", Journal of the American Chemical Society, vol. 135, No. 11, 2013, pp. 4203-4206, doi: 10.1021/ja3126382.

Sun et al., "Semibatch RAFT polymerization for producing ST/BA copolymers with controlled gradient composition profiles", AIChE Journal, vol. 54, No. 4, 2008, pp. 1073-1087, doi: 10.1002/aic.11446.

Sun et al., "Structure-Conductivity Relationship for Peptoid-Based PEO-Mimetic Polymer Electrolytes", Macromolecules, vol. 45, No. 12, 2012, pp. 5151-5156, doi: 10.1021/ma300775b.

Sun et al., "Switching the Reaction Course of Electrochemical CO2 Reduction with Ionic Liquids", Langmuir, vol. 30, No. 21, 2014, pp. 6302-6308, doi: 10.1021/la5009076.

Susan et al., "Ion Gels Prepared by in Situ Radical Polymerization of Vinyl Monomers in an Ionic Liquid and Their Characterization as Polymer Electrolytes", Journal of the American Chemical Society, vol. 127, No. 13, 2005, 4976-4983, doi: 10.1021/ja045155b.

Sutthasupa et al., "Alternating Ring-Opening Metathesis Copolymerization of Amino Acid Derived Norbornene Monomers Carrying Nonprotected Carboxy and Amino Groups Based on Acid-Base Interaction", Journal of the American Chemical Society, vol. 131, No. 30, 2009, pp. 10546-10551, doi: 10.1021/ja903248c.

Sutthasupa et al., "Recent Advances in Ring-Opening Metathesis Polymerization, and Application to Synthesis of Functional Materials", Polymer Journal, vol. 42, No. 12, 2010, pp. 905-915, doi: 10.1038/pj.2010.94.

Taheri et al., "An Iron Electrocatalyst for Selective Reduction of $CO_2$ to Formate in Water: Including Thermochemical Insights", ACS Catalysis, vol. 5, 2015, pp. 7140-7151, doi: 10.1021/acscatal.5b01708.

Tan et al., "Gels of Ionic Liquid [C4mim]PF6 Formed by Self-Assembly of Gelators and their Electrochemical Properties", Electrochemistry Communication, vol. 11, No. 5, 2009, pp. 933-936, doi: 10.1016/j.elecom.2009.02.025.

Tang et al., "Synergistic Increase in Ionic Conductivity and Modulus of Triblock Copolymer Ion Gels", Macromolecules, vol. 48, No. 14, 2015, pp. 4942-4950, doi: 10.1021/acs.macromol.5b00882.

Tang et al., "Synthesis and Morphology of Molecular Brushes with Polyacrylonitrile Block Copolymer Side Chains and Their Conversion into Nanostructured Carbons", Macromolecules, vol. 40, No. 17, 2007, pp. 6199-6205, doi: 10.1021/ma0708920.

Tang et al., "Synthesis and properties of heterografted toothbrush-like copolymers with alternating PEG and PCL grafts and Tunable RAFT-generated segments", Polymer Chemistry, vol. 5, 2014, pp. 4679-4692 and supporting information.

Teran et al., "Discontinuous Changes in Ionic Conductivity of a Block Copolymer Electrolyte through an Order-Disorder Transition", ACS Macro Letters, vol. 1, No. 2, 2012, pp. 305-309, doi: 10.1021/mz200183t.

Teran et al., "Thermodynamics of Block Copolymers with and without Salt", The Journal of Physical Chemistry B, vol. 118, No. 1, 2014, pp. 4-17, doi: 10.1021/jp408079z.

Thompson et al., "Solvent Accelerated Polymer Diffusion in Thin Films", Macromolecules, vol. 38, No. 10, 2005, pp. 4339-4344, doi: 10.1021/ma050317p.

Thurn-Albrecht et al., "Ultrahigh-Density Nanowire Arrays Grown in Self-Assembled Diblock Copolymer Templates", Science, vol. 290, 2000, pp. 2126-2129, doi: 10.1126/science.290.5499.2126.

Trapa et al., "Rubbery Graft Copolymer Electrolytes for Solid-State, Thin-Film Lithium Batteries", Journal of the Electrochemical Society, vol. 152, No. 1, 2005, pp. A1-A5, doi: 10.1149/1.1824032.

Trapa et al., "Synthesis and Characterization of Single-Ion Graft Copolymer Electrolytes", Journal of the Electrochemical Society, vol. 152, No. 12, 2005, pp. A2281-A2284, doi: 10.1149/1.2073089.

Troparevsky et al., "Transfer-Matrix Formalism for the Calculation of Optical Response in Multilayer Systems: From Coherent to Incoherent Interference", Optics Express, vol. 18, No. 24, 2010, pp. 24715-24721, doi: 0.1364/OE.18.024715.

Trzaskowski et al., "Structural and Mechanistic Basis of the Fast Metathesis Initiation by a Six-Coordinated Ruthenium Catalyst", Organometallics, vol. 32, No. 13, 2013, pp. 3625-3630, doi: 10.1021/om400233s.

Tseng et al., "Block Copolymer Nanostructures for Technology", Polymers, vol. 2, No. 4, 2010, pp. 470-489, doi: 10.3390/polym2040470.

Tsurumaki et al., "Properties of polymer electrolytes composed of poly(ethylene oxide) and ionic liquids according to hard and soft acids and bases theory", Polymers Advanced Technology, vol. 22, Issue 8, 2011, pp. 1223-1228, doi: 10.1002/pat.1931.

Ueki et al., "Macromolecules in Ionic Liquids: Progress, Challenges, and Opportunities", Macromolecules, vol. 41, No. 11, 2008, pp. 3739-3749, doi: 10.1021/ma800171k.

(56) References Cited

OTHER PUBLICATIONS

Ueki et al., "Photoreversible Gelation of a Triblock Copolymer in an Ionic Liquid", Angewandte Chemie, International Edition, vol. 54, Issue 10, 2015, pp. 3018-3022, doi: 10.1002/anie.201411526.

Underwood, "Industrial Synthesis of Hydrocarbons from Hydrogen and Carbon Monoxide", Industrial & Engineering Chemistry, vol. 32, No. 4, pp. 449-454, doi: 10.1021/ie50364a002.

Urbas et al., "One-Dimensionally Periodic Dielectric Reflectors from Self-Assembled Block Copolymers—Homopolymer Blends", Macromolecules, vol. 32, No. 14, 1999, pp. 4748-4750, doi: 10.1021/ma9903207.

Urbas et al., "Tunable Block Copolymer/Homopolymer Photonic Crystals", Advanced Materials, vol. 12, No. 11, 2000, 812-814, doi: 10.1002/(SICI)1521-4095(200006)12:11<812::AID-ADMA812>3.0.CO;2-8.

Valkama et al., "Self-Assembled Polymeric Solid Films with Temperature-Induced Large and Reversible Photonic-Bandgap Switching", Nature Materials, vol. 3, No. 12, 2004, pp. 872-876, doi: 10.1038/nmat1254.

Van Gurp et al., "Time-Temperature Superposition for Polymer Blends", Rheology Bulletin, vol. 67, 1998, pp. 5-8.

Van Ruymbeke et al., "Molecular Rheology of Branched Polymers: Decoding and Exploring the role of Architectural Dispersity Through a Synergy of Anionic Synthesis, Interaction Chromatography, Rheometry and Modeling", Soft Matter, vol. 10, No. 27, 2014, pp. 4762-4777, doi: 10.1039/c4sm00105b.

Vayer et al., "Perpendicular Orientation of Cylindrical Domains Upon Solvent Annealing Thin Films of Polystyrene-B-Polylactide", Thin Solid Films, vol. 518, No. 14, 2010, pp. 3710-3715, doi: 10.1016/j.tsf.2009.10.015.

Vougioukalakis et al., "Ruthenium-Based Heterocyclic Carbene-Coordinated Olefin Metathesis Catalysts", Chemical Reviews, , vol. 110, No. 3, 2010, pp. 1746-1787, doi: 10.1021/cr9002424.

Vyboishchikov et al., "Mechanism of Olefin Metathesis with Catalysis by Ruthenium Carbene Complexes: Density Functional Studies on Model Systems", Chemistry—A European Journal, vol. 8, No. 17, 2002, pp. 3962-3975, doi: 10.1002/1521-3765(20020902)8:17<3962::AID-CHEM3962>3.0.CO;2-X.

Vygodskii et al., "Cyclopolymerization of N,N-Dipropargylamines and N,N-Dipropargyl Ammonium Salts", Macromolecules, vol. 41, No. 6, 2008, pp. 1919-1928, doi: 10.1021/ma7022777.

Wade, Jr., "Compendium of Organic Synthetic Methods", 1980, vol. 4, 510 pgs.

Wade, Jr., "Compendium of Organic Synthetic Methods", 1984, vol. 5, 565 pgs.

Walsh et al., "Electrocatalytic CO2 Reduction with a Membrane Supported Manganese Catalyst in Aqueous Solution", Chemical Communications, vol. 50, No. 84, 2014, pp. 12698-12701, doi: 10.1039/C4CC06404F.

Walsh et al., "Kinetic Study of Living Ring-Opening Metathesis Polymerization with Third-Generation Grubbs Catalysts", Journal of the American Chemical Society, vol. 139, No. 39, 2017, pp. 13644-13647. doi: 10.1021/jacs.7b08010.

Wanakule et al., "Thermodynamic Properties of Block Copolymer Electrolytes Containing Imidazolium and Lithium Salts", Macromolecules, vol. 43, No. 19, 2010, pp. 8282-8289, doi: 10.1021/ma1013786.

Wang et al., "All Solid-State Lithium-Polymer Battery Using a Self-Cross-Linking Polymer Electrolyte", Journal of the Electrochemical Society, vol. 150, No. 9, 2003, pp. A1166-A1170, doi: 10.1149/1.1593652.

Wang et al., "Bioinspired Colloidal Photonic Crystals with Controllable Wettability", Accounts of Chemical Research, vol. 44, No. 6, 2011, pp. 405-415, doi: 10.1021/ar1001236.

Wang et al., "Control of Gradient Copolymer Composition in ATRP using Semibatch Feeding Policy", AIChE Journal, vol. 53, No. 1, 2007, pp. 174-186, doi: 10.1002/aic.11063.

Wang et al., "Synthesis of Sequence-Determined Bottlebrush Polymers Based on Sequence Determination in Living Anionic Copolymerization of Styrene and Dimethyl(4-(1-Phenylvinyl)Phenyl) Silane", Polym. Chem, vol. 7, Issue 18, 2016, pp. 3090-3099, doi: 10.1039/c6py00085a.

Watanabe et al., "High Ionic Conductivity and Electrode Interface Properties of Polymer Electrolytes Based on High Molecular Weight Branched Polyether", Journal of Power Sources, vol. 81-82, 1999, pp. 786-789, doi: 10.1016/S0378-7753(99)00250-5.

Welton, "Ionic Liquids in Catalysis", Coordination Chemistry Reviews, vol. 248, 2004, pp. 2459-2477, doi: 10.1016/j.ccr.2004.04.015.

Welton, "Room-Temperature Ionic Liquids. Solvents for Synthesis and Catalysis", Chemical Reviews, vol. 99, 1999, pp. 2071-2084.

Westphalen et al., "Metal Cluster Enhanced Organic Solar Cells", Solar Energy Materials & Solar Cells, vol. 61, No. 1, 2000, pp. 97-105, doi: 10.1016/S0927-0248(99)00100-2.

Windmon et al., "Diels-Alder Reactions in the Presence of a Minimal Amount of Water", Green Chemistry Letters and Reviews, vol. 1, No. 3, 2008, pp. 155-163, doi: 10.1080/17518250802482505.

Wolfe et al., "Investigation of Organoboronates in Metathesis Polymerization", Macromolecules, vol. 32, No. 24, 1999, pp. 7961-7967, doi: 10.1021/ma981784s.

Xia et al., "Conductivities of Solid Polymer Electrolyte Complexes of Alkali Salts with Polymers of Methoxypolyethyleneglycol Methacrylates", Solid State Ionics, vol. 14, Issue 3, 1984, pp. 221-224, doi: 10.1016/0167-2738(84)90102-4.

Xia et al., "Efficient Synthesis of Narrowly Dispersed Brush Polymers via Living Ring-Opening Metathesis Polymerization of Macromonomers", Macromolecules, vol. 42, No. 11, 2009, pp. 3761-3766, doi: 10.1021/ma900280c.

Xiong et al., "Reversible Hydrophobic-Hydrophilic Transition of Ionic Liquids Driven by Carbon Dioxide", Angewandte Chemie, , Int. Ed., vol. 54, Issue 25, 2015, pp. 7265-7269, doi: 10.1002/anie.201500695.

Xu et al., "ABC Triblock Copolymer Particles with Tunable Shape and Internal Structure through 3D Confined Assembly", Macromolecules, vol. 48, No. 8, 2015, pp. 2628-2636, doi: 10.1021/acs.macromol.5b00335.

Xu et al., "Fabrication of Silicon Oxide Nanodots with an Areal Density Beyond 1 Teradots Inch-2", Advanced Materials, vol. 22, No. 48, 2011, pp. 5755-5761, doi: 10.1002/adma.201102964.

Xu et al., "Molecular Pressure Sensors", Advanced Materials, vol. 19, Issue 19, 2007, 2930-2934, doi: 10.1002/adma.200602376.

Xu et al., "Theoretical Simulations of Nanostructures Self-Assembled from Copolymer Systems", Polymer Chemistry, vol. 7, 2016, pp. 3783-3811, doi: 10.1039/C6PY00535G.

Yamaguchi et al., "A Phase Diagram for the Binary Blends of Nearly Symmetric Diblock Copolymers. 1. Parameter Space of Molecular Weight Ratio and Blend Composition", Macromolecules, vol. 34, No. 18, 2001, pp. 6495-6505, doi: 10.1021/ma0021489.

Yang et al., "Supramolecular ABC Triblock Copolymers via One-Pot, Orthogonal Self-Assembly", Journal of the American Chemical Society, vol. 132, No. 5, 2010, pp. 1637-1645, doi: 10.1021/ja908429e.

Yashima et al., "Helical Polymers: Synthesis, Structures, and Functions", Chemical Reviews, vol. 109, No. 11, 2009, pp. 6102-6211, doi: 10.1021/cr900162q.

Yavitt et al., "High Molecular Mobility and Viscoelasticity of Microphase-Separated Bottlebrush Diblock Copolymer Melts", Macromolecules, vol. 50, No. 1, 2017, pp. 396-405, doi: 10.1021/acs.macromol.6b01471.

Ye et al., "Ionic Liquid Polymer Electrolytes", Journal of Materials Chemistry A, vol. 1, No. 8, 2012, pp. 2719-2743, doi: 10.1039/C2TA00126H.

Yoon et al., "Optically Transparent and High Molecular Weight Polyolefin Block Copolymers Toward Self-Assembled Photonic Band Gap Materials", Macromolecules, vol. 39, 2006, pp. 1913-1919, doi: 10.1021/ma0516642.

Yoon et al., "Self-Assembly of Block Copolymers for Photonic-Bandgap Materials", MRS Bulletin, 2005, vol. 30, pp. 721-726.

Yoon et al., "Thermochromic Block Copolymer Photonic Gel", Macromolecules, vol. 41, 2008, pp. 4582-4584, doi: 10.1021/ma8009504.

(56) References Cited

OTHER PUBLICATIONS

Young et al., "Block Copolymer Electrolytes for Rechargeable Lithium Batteries", Journal of Polymer Science Part B: Polymer Physics, vol. 52, No. 1, 2014, pp. 1-16, doi: 10.1002/polb.23404.

Young et al., "Investigating Polypropylene-Poly(Ethylene Oxide)-Polypropylene Triblock Copolymers as Solid Polymer Electrolytes for Lithium Batteries", Solid State Ionics, vol. 263, 2014, pp. 87-94, doi: 10.1016/j.ssi.2014.05.012.

Young et al., "Mixed-Salt Effects on the Ionic Conductivity of Lithium-Doped PEO-Containing Block Copolymers", Macromolecules, vol. 44, No. 20, 2011, 8116-8123, doi: 10.1021/MA2013157.

Yuan et al., "Ionic Conductivity of Low Molecular Weight Block Copolymer Electrolytes", Macromolecules, vol. 46, Issue 3, 2013, pp. 914-921, doi: 10.1021/MA3024552.

Zalusky et al., "Ordered Nanoporous Polymers from Polystyrene-Polylactide Block Copolymers", Journal of the American Chemical Society, vol. 124, Issue 43, 2002, pp. 12761-12773, doi: 10.1021/ja0278584.

Zhang, "Block Copolymer-Based Ion Gels as Solid Polymer Electrolytes", Dissertation (Ph.D.). University of Minnesota 2012, 199 pages.

Zhang et al., "Conformation of Cylindrical Brushes in Solution: Effect of Side Chain Length", Macromolecules, vol. 39, No. 24, 2006, pp. 8440-8450, doi: doi: 10.1021/ma0613178.

Zhang et al., "Cylindrical Polymer Brushes", Journal of Polymer Science: Part A: Polymer Chemistry, vol. 43, No. 16, 2005, pp. 3461-3481, doi: 10.1002/pola.20900.

Zhang et al., "Design of Graft Block Polymer Thermoplastics", Macromolecules, vol. 49, No. 23, 2016, pp. 9108-9118, doi: 10.1021/ACS.MACROMOL.6B02033.

Zhang et al., "Electrochemical Behaviors and Spectral Studies of Ionic Liquid (1- Butyl-3-Methylimidazolium Tetrafluoroborate) based Sol-Gel Electrode", Journal of Electroanalytical Chemistry, vol. 603, No. 2, 2007, pp. 243-248, doi: 10.1016/J.JELECHEM.2007.02.021.

Zhang et al., "Ionic Conductivity, Capacitance, and Viscoelastic Properties of Block Copolymer-Based Ion Gels", Macromolecules, vol. 44, No. 4, 2011, pp. 940-949, doi: 10.1021/ma102435a.

Zhang et al., "Physical Properties of Ionic Liquids: Database and Evaluation", J. Phys. Chem. Ref. Data, 2006, vol. 35, No. 4. pp. 1475-1517, doi: 10.1063/1.2204959.

Zhang et al., "Super Soft Elastomers as Ionic Conductors", Polymer, vol. 45, No. 18, 2004, pp. 6333-6339, doi: 10.1016/J.POLYMER.2004.06.045.

Zhang et al., "Viscoelastic Properties, Ionic Conductivity, and Materials Design Considerations for Poly(styrene-b-ethylene oxide-b-styrene)-Based Ion Gel Electrolytes", Macromolecules, vol. 44, No. 22, 2011, pp. 8981-8989, doi: 10.1021/ma201356j.

Zhang et al., "Well-Defined Polyethylene-Based Random, Block, and Bilayered Molecular Cobrushes", Macromolecules, 2015, vol. 48, No. 11, pp. 3556-3562, doi: 10.1021/acs.macromol.5b00713.

Zhao et al., "Crystallization and Thermal Properties of PLLA Comb Polymer", Journal of Polymer Science Part B: Polymer Physics, vol. 46, No. 6, 2008, pp. 589-598, doi: 10.1002/polb.2139.

Zhao et al., "Electrochemistry of Room Temperature Protic Ionic Liquids", J. Phys. Chem. B., vol. 112, 2008, pp. 6923-6936, doi: 10.1021/jp711804j.

Zhao et al., "Ionic Liquids: Applications in Catalysis", Catalysis Today, vol. 74, 2002, pp. 157-189, doi: 10.1016/S0920-5861(01)00541-7.

Zheng et al., "Morphology of ABC Triblock Copolymers", Macromolecules, vol. 28, 1995, pp. 7215-7223, doi: 10.1021/MA00125A026.

Zhulina, "Polymer brushes: Polymers in Soft and Biological Matter", Boulder CO, USA, Institute of Macromolecular Compounds, Russian Academy of Sciences, St. Petersburg, Russia (Jul. 30-Aug. 1, 2012), 28 pgs.

Zhulina, "Polymer brushes: Simple Views on Polymers at Surfaces and Interfaces: Simposium Honoring P.-G. de Gennes", APS meeting, Mar. 13, 2008, New Orleans USA, Institute of Macromolecular Compounds, Russian Academy of Sciences, St. Petersburg, Russia, 23 pgs.

* cited by examiner

MULTI-COAT POLYMER PHOTONIC CRYSTAL FILMS

RELATED APPLICATIONS

This application is a continuation-in-part under 35 U.S.C. 111(a) of International Application No. PCT/US2020/015928 filed Jan. 30, 2020 and published in English as WO 2020/160299 on Aug. 6, 2020, which claims priority from U.S. Provisional Patent Application No. 62/799,945, filed Feb. 1, 2019, which applications and publication are each incorporated herein by reference.

GOVERNMENT SUPPORT

This invention was made with government support under Grant No. DE-AR0000881 and DE-AE0001261 awarded by the Department of Energy. The government has certain rights in the invention.

BACKGROUND OF THE INVENTION

Photonic crystals (PCs) are highly ordered structures composed of materials of differing dielectric constants with a periodicity similar to the wavelengths of light reflected. PCs have found use in thin film optics, reflective coatings on lenses or mirrors, and waveguides. PCs can be made through top down approaches such as lithography, atomic layer deposition or etching. More recently bottom up approaches have been realized through self-assembly mechanisms using colloidal crystals or block copolymers. While top-down approaches provide precise control over the architecture, bottom up approaches offer the advantage of providing an inexpensive means to achieve similar structures and enable rapid prototyping and deposition on a variety of surfaces.

Towards an end use application, the challenge of having a robust and transparent photonic crystal coating accessed through a bottom-up strategy still persists. Through self-assembly, it is common that with or without specialized annealing processes, irregularities and errors in the nanoscale morphology are formed. These irregularities, of a large enough size, can result in the phenomena of light scattering as well as inhomogeneous surface features.

The current state of the art is represented by multilayer extruded thin films (U.S. Pat. Nos. 6,208,466 and 6,696,142) or layer-by-layer deposited metal oxide nanoparticles or polyelectrolytes (*Bioinspir. Biomim.* 2013, 8, 045005 and US Patent Application Publication No. 2014/0218792). Both of these approaches require significant investment in advanced manufacturing instrumentation/infrastructure and techniques, in addition to potential high material costs.

Current approaches for the preparation of reflective materials require significant investment in advanced manufacturing instrumentation and techniques and high material costs. Accordingly, there is a need for alternative compositions that allow for more cost-effective preparation of reflective materials and coatings.

SUMMARY

The disclosure relates to the discovery that the use of inorganic/organic composite materials composed of brush block copolymers (BBCPs) and either inorganic, organic, or some combination of the two, families of additives can allow for modification of the optical features of photonic crystal materials, such as but not limited to: percent reflection (% R), wavelength (nm) of maximum reflection ($\lambda_{max}$), and full width at half maximum (FWHM) of the reflection peaks, and haze (% haze) of the overall material. The reflective properties of the multilayer coatings described herein are established in a bottom-up process through the self-assembly of block copolymers (BCPs) that occur rapidly under easily accessible conditions, i.e., ambient or slightly elevated temperature, atmospheric pressure, and in the presence of oxygen. The self-assembly process avoids the need for specialized manufacturing techniques such as nano-imprint or electron-beam lithography, and layer-by-layer deposition. The polymeric building blocks, polymeric additives, and non-polymeric additives employed in the coating are inexpensive, and in preferred embodiments can be "commodity" materials, maintaining low material cost.

Accordingly, this disclosure provides a multilayer coating comprising:

a) a first layer of a photonic crystal film comprising an additive and brush block copolymer (BBCP) of Formula IA or Formula IB:

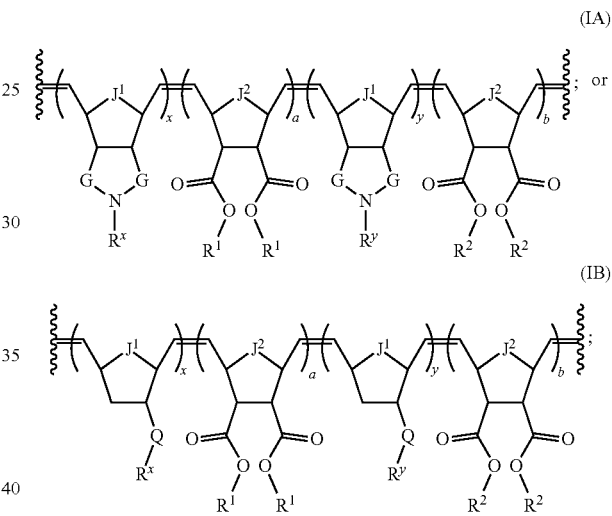

wherein
$R^x$ is —$(C_2$-$C_6)$alkyl-OC(=O)$G^1$ wherein $G^1$ comprises polyacrylate, polymethacrylate or polylactic acid; or —$(C_1$-$C_8)$alkyl-$G^2$-$G^3$ wherein $G^2$ is —C(=O)O— or a nitrogen heterocycle and $G^3$ comprises polystyrene, polyacrylate, polydimethylsiloxane, polyether, polymethacrylate, or polylactic acid;

$R^y$ is —$(C_2$-$C_6)$alkyl-OC(=O)$G^1$ wherein $G^1$ comprises polyacrylate, polymethacrylate or polylactic acid; or —$(C_1$-$C_8)$alkyl-$G^2$-$G^3$ wherein $G^2$ is —C(=O)O— or a nitrogen heterocycle and $G^3$ comprises polystyrene, polyacrylate, polydimethylsiloxane, polyether, polymethacrylate, or polylactic acid;

$R^1$ is unbranched alkyl;
$R^2$ is branched alkyl;
each G is each independently $CH_2$ or C=O;
each $J^1$ is independently $CH_2$, C=O, or O;
each $J^2$ is independently $CH_2$, C=O, or O;
each Q is independently alkyl, cycloalkyl, heterocycloalkyl, carbonyl, silyl, aryl, or heteroaryl;
a and b are each independently 0 to about 1000; and
x and y are each independently 1 to about 1000;
wherein blocks a, b, x and y are in any order, the ratio of x:a is 1:0 to about 1:3, and the ratio of y:b is 1:0 to about 1:3; and b) a second layer comprising a topcoat wherein the topcoat is an optical adhesive or ultraviolet curable resin;
wherein the first layer and second layer form a multilayer film and the multilayer coating comprises one or more multilayer films.

This disclosure also provides a method for modulating an electromagnetic radiation reflectance, absorbance and transmission profile of a substrate comprising coating a substrate with a multilayer coating according to photonic crystal film above, wherein at least 5% more electromagnetic radiation is reflected by the coated substrate than for a corresponding uncoated substrate.

Also, this disclosure provides a method for reducing haze of a substrate comprising coating a substrate with a multilayer coating wherein the multilayer coating comprises:
a) a first layer of a photonic crystal film; and
b) a second layer comprising a topcoat wherein the topcoat is an optical adhesive or ultraviolet curable resin;
wherein the first layer modulates the reflectance, absorbance and transmission profile of the substrate wherein at least 5% more electromagnetic radiation is reflected by the coated substrate than for a corresponding uncoated substrate, and the second layer reduces haze of the reflected electromagnetic radiation by at least 5% compared to the corresponding uncoated substrate.

Additionally, this disclosure provides a method for forming a multilayer coating comprising:
a) combining a solvent and a brush block copolymer (BBCP) to form a mixture, wherein BBCP is a BBCP of Formula IC:

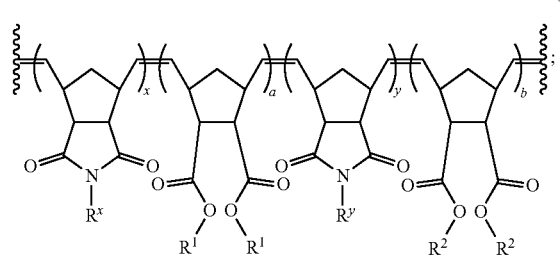

(I)

wherein
$R^x$ is —$(C_2$-$C_6)$alkyl-OC(=O)$G^1$ wherein $G^1$ comprises polyacrylate, polymethacrylate or polylactic acid; or
—$(C_1$-$C_8)$alkyl-$G^2$-$G^3$ wherein $G^2$ is —C(=O)O— or a nitrogen heterocycle and $G^3$ comprises polystyrene, polyacrylate, polydimethylsiloxane, polyether, polymethacrylate, or polylactic acid;
$R^y$ is —$(C_2$-$C_6)$alkyl-OC(=O)$G^1$ wherein $G^1$ comprises polyacrylate, polymethacrylate or polylactic acid; or
—$(C_1$-$C_8)$alkyl-$G^2$-$G^3$ wherein $G^2$ is —C(=O)O— or a nitrogen heterocycle and $G^3$ comprises polystyrene, polyacrylate, polydimethylsiloxane, polyether, polymethacrylate, or polylactic acid;
$R^1$ is unbranched alkyl;
$R^2$ is branched alkyl;
a and b are each independently 0 to about 1000; and
x and y are each independently 1 to about 1000;
wherein the ratio of x:a is 1:0 to about 1:3 and the ratio of y:b is 1:0 to about 1:3;
b) applying a first layer of the mixture to a substrate;
c) drying the first layer to form a film; and
d) applying a second layer comprising a topcoat to the film wherein the topcoat is an optical adhesive or ultraviolet curable resin;
wherein the film and second layer form the multilayer coating on the substrate.

The invention provides novel compositions comprising of Formulas I(A-F)-II disclosed herein, intermediates for the synthesis of polymers of Formulas I(A-F)-II, as well as methods of preparing compositions comprising polymers of Formulas I(A-F)-II. The invention also provides polymers of Formulas I(A-F)-II that are useful as intermediates for the synthesis of other useful polymers and compositions. The invention provides for the use of polymers of Formulas I(A-F)-II for the manufacture of reflective coatings.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
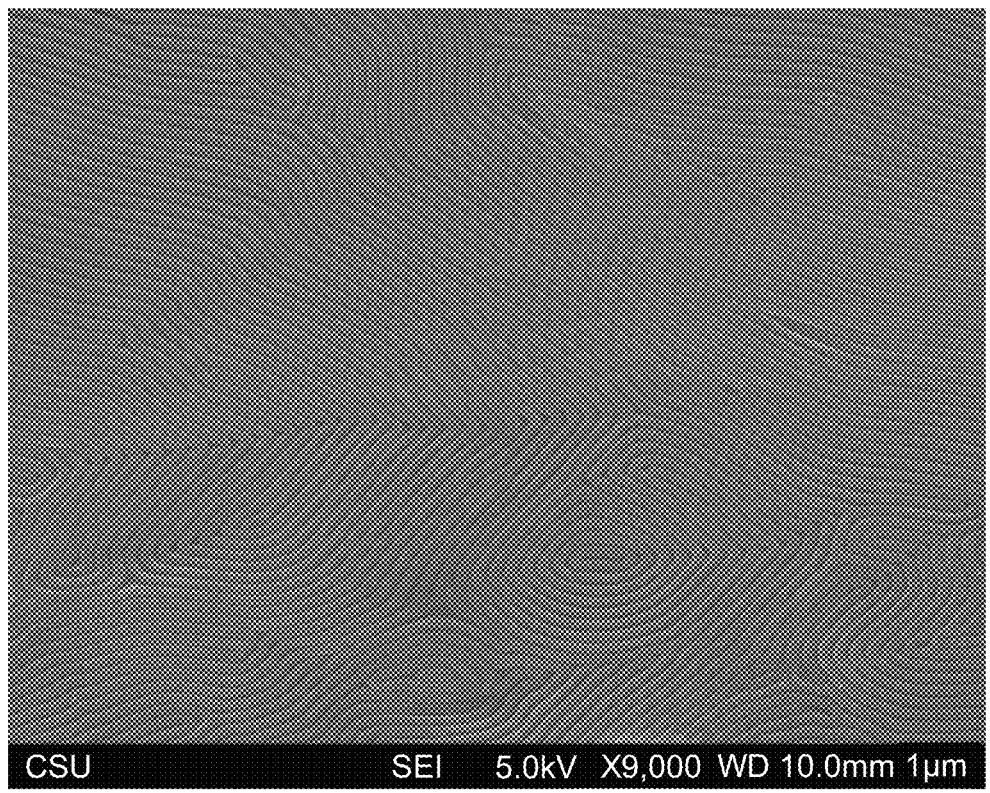
FIG. 1. SEM image showing the errors in the lamellae propagating through the photonic crystal film composed of self-assembled poly(lactic acid)-b-poly(styrene).

This application relates to the discovery that the use of inorganic/organic composite materials composed of block copolymers (BCPs) and either inorganic, organic, or some combination of the two families of additives can allow for modification of the optical features of photonic crystal materials, such as but not limited to: percent reflection (% R), wavelength (nm) of maximum reflection ($\lambda_{max}$), full width at half maximum (FWHM) of the reflection peaks, and haze (% haze) of the resulting photonic crystal material.

Specifically, BCPs composed of a variety of monomeric units are blended with either inorganic additives, small molecule organic additives, and/or polymeric additives to modulate the relative intensities of the higher-order reflection peaks; in some instances, resulting in high NIR reflection and low is reflection. The use of exogenous additives to directly modulate the relative intensities of the higher order reflection peaks for BCP derived photonic crystal materials is unique in its approach and allows for the deployment of these materials in applications necessitating selective reflection and transmission in different ranges of the electromagnetic spectrum.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit. For example, one or more substituents on a phenyl ring refers to one to five, or one to four, for example if the phenyl ring is disubstituted.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the endpoints of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

This disclosure provides ranges, limits, and deviations to variables such as volume, mass, percentages, ratios, etc. It is understood by an ordinary person skilled in the art that a range, such as "number1" to "number2", implies a continuous range of numbers that includes the whole numbers and fractional numbers. For example, 1 to 10 means 1, 2, 3, 4, 5, . . . 9, 10. It also means 1.0, 1.1, 1.2. 1.3, . . . , 9.8, 9.9, 10.0, and also means 1.01, 1.02, 1.03, and so on. If the variable disclosed is a number less than "number10", it implies a continuous range that includes whole numbers and fractional numbers less than number10, as discussed above. Similarly, if the variable disclosed is a number greater than "number10", it implies a continuous range that includes whole numbers and fractional numbers greater than number10. These ranges can be modified by the term "about", whose meaning has been described above.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture.

An "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

The term "substantially" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%.

Wherever the term "comprising" is used herein, options are contemplated wherein the terms "consisting of" or "consisting essentially of" are used instead. As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the aspect element. As used herein, "consisting essentially of" does not exclude materials or steps that do not materially affect the basic and novel characteristics of the aspect. In each instance herein any of the terms "comprising", "consisting essentially of" and "consisting of" may be replaced with either of the other two terms. The disclosure illustratively described herein may be suitably practiced in the absence of any element or elements, limitation or limitations which is not specifically disclosed herein.

This disclosure provides methods of making the compounds and compositions of the invention. The compounds and compositions can be prepared by any of the applicable techniques described herein, optionally in combination with standard techniques of organic synthesis. Many techniques such as etherification and esterification are well known in the art. However, many of these techniques are elaborated in Compendium of Organic Synthetic Methods (John Wiley & Sons, New York), Vol. 1, Ian T. Harrison and Shuyen Harrison, 1971; Vol. 2, Ian T. Harrison and Shuyen Harrison, 1974; Vol. 3, Louis S. Hegedus and Leroy Wade, 1977; Vol. 4, Leroy G. Wade, Jr., 1980; Vol. 5, Leroy G. Wade, Jr., 1984; and Vol. 6; as well as standard organic reference texts such as March's Advanced Organic Chemistry: Reactions, Mechanisms, and Structure, 5th Ed., by M. B. Smith and J. March (John Wiley & Sons, New York, 2001); Comprehensive Organic Synthesis. Selectivity, Strategy & Efficiency in Modern Organic Chemistry. In 9 Volumes, Barry M. Trost, Editor-in-Chief (Pergamon Press, New York, 1993 printing); Advanced Organic Chemistry, Part B: Reactions and Synthesis, Second Edition, Cary and Sundberg (1983);

The formulas and compounds described herein can be modified using protecting groups. Suitable amino and carboxy protecting groups are known to those skilled in the art (see for example, Protecting Groups in Organic Synthesis, Second Edition, Greene, T. W., and Wutz, P. G. M., John Wiley & Sons, New York, and references cited therein; Philip J. Kocienski; Protecting Groups (Georg Thieme Verlag Stuttgart, New York, 1994), and references cited therein); and Comprehensive Organic Transformations, Larock, R. C., Second Edition, John Wiley & Sons, New York (1999), and referenced cited therein.

As used herein, the term "substituted" or "substituent" is intended to indicate that one or more (for example, 1-20 in various embodiments, 1-10 in other embodiments, 1, 2, 3, 4, or 5; in some embodiments 1, 2, or 3; and in other embodiments 1 or 2) hydrogens on the group indicated in the expression using "substituted" (or "substituent") is replaced with a selection from the indicated group(s), or with a suitable group known to those of skill in the art, provided that the indicated atom's normal valency is not exceeded, and that the substitution results in a stable compound. Suitable indicated groups include, e.g., alkyl, alkenyl, alkynyl, alkoxy, halo, haloalkyl, hydroxy, hydroxyalkyl, aryl, heteroaryl, heterocycle, cycloalkyl, alkanoyl, alkoxycarbonyl, amino, alkylamino, dialkylamino, trifluoromethylthio, difluoromethyl, acylamino, nitro, trifluoromethyl, trifluoromethoxy, carboxy, carboxyalkyl, keto, thioxo, alkylthio, alkylsulfinyl, alkylsulfonyl, and cyano. Additionally, non-limiting examples of substituents that can be bonded to a substituted carbon (or other) atom include F, Cl, Br, I, OR', OC(O)N(R')$_2$, CN, CF$_3$, OCF$_3$, R', O, S, C(O), S(O), methylenedioxy, ethylenedioxy, N(R')$_2$, SR', SOR', SO$_2$R', SO$_2$N(R')$_2$, SO$_3$R', C(O)R', C(O)C(O)R', C(O)CH$_2$C(O)R', C(S)R', C(O)OR', OC(O)R', C(O)N(R')$_2$, OC(O)N(R')$_2$, C(S)N(R')$_2$, (CH$_2$)$_{0-2}$NHC(O)R', N(R')N(R')C(O)R', N(R')N(R')C(O)OR', N(R')N(R')CON(R')$_2$, N(R')SO$_2$R', N(R')SO$_2$N(R')$_2$, N(R')C(O)OR', N(R')C(O)R', N(R')C(S)R', N(R')C(O)N(R')$_2$, N(R')C(S)N(R')$_2$, N(COR')COR', N(OR')R', C(=NH)N(R')$_2$, C(O)N(OR')R', or C(=NOR')R' wherein R' can be hydrogen or a carbon-based moiety, and wherein the carbon-based moiety can itself be further substituted.

The term "halo" or "halide" refers to fluoro, chloro, bromo, or iodo. Similarly, the term "halogen" refers to fluorine, chlorine, bromine, and iodine.

The term "alkyl" refers to a branched or unbranched hydrocarbon having, for example, from 1-20 carbon atoms, and often 1-12, 1-10, 1-8, 1-6, or 1-4 carbon atoms; or for example, a range between 1-20 carbon atoms, such as 2-6, 3-6, 2-8, or 3-8 carbon atoms. As used herein, the term "alkyl" also encompasses a "cycloalkyl", defined below. Examples include, but are not limited to, methyl, ethyl, 1-propyl, 2-propyl (iso-propyl), 1-butyl, 2-methyl-1-propyl (isobutyl), 2-butyl (sec-butyl), 2-methyl-2-propyl (t-butyl), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl, 3,3-dimethyl-2-butyl, hexyl, octyl, decyl, dodecyl, and the like. The alkyl can be unsubstituted or substituted, for example, with a substituent described below. The alkyl can also be optionally partially or fully unsaturated. As such, the recitation of an alkyl group can include both alkenyl and alkynyl groups. The alkyl can be a monovalent hydrocarbon radical, as described and exemplified above, or it can be a divalent hydrocarbon radical (i.e., an alkylene).

The term "cycloalkyl" refers to cyclic alkyl groups of, for example, from 3 to 10 carbon atoms having a single cyclic ring or multiple condensed rings. Cycloalkyl groups include, by way of example, single ring structures such as cyclopropyl, cyclobutyl, cyclopentyl, cyclooctyl, and the like, or multiple ring structures such as adamantyl, and the like. The cycloalkyl can be unsubstituted or substituted. The cycloalkyl group can be monovalent or divalent and can be optionally substituted as described for alkyl groups. The cycloalkyl group can optionally include one or more cites of unsaturation, for example, the cycloalkyl group can include one or more carbon-carbon double bonds, such as, for example, 1-cyclopent-1-enyl, 1-cyclopent-2-enyl, 1-cyclopent-3-enyl, cyclohexyl, 1-cyclohex-1-enyl, 1-cyclohex-2-enyl, 1-cyclohex-3-enyl, and the like.

The term "heterocycloalkyl" refers to a saturated or partially saturated monocyclic, bicyclic, or polycyclic ring containing at least one heteroatom selected from nitrogen, sulfur, oxygen, preferably from 1 to 3 heteroatoms in at least one ring. Each ring is preferably from 3 to 10 membered, more preferably 4 to 7 membered. Examples of suitable heterocycloalkyl substituents include pyrrolidyl, tetrahydrofuryl, tetrahydrothiofuranyl, piperidyl, piperazyl, tetrahydropyranyl, morpholino, 1,3-diazapane, 1,4-diazapane, 1,4-oxazepane, and 1,4-oxathiapane. The group may be a terminal group or a bridging group.

The term "aryl" refers to an aromatic hydrocarbon group derived from the removal of at least one hydrogen atom from a single carbon atom of a parent aromatic ring system. The radical attachment site can be at a saturated or unsaturated carbon atom of the parent ring system. The aryl group can have from 6 to 30 carbon atoms, for example, about 6-10 carbon atoms. In other embodiments, the aryl group can have 6 to 60 carbons atoms, 6 to 120 carbon atoms, or 6 to 240 carbon atoms. The aryl group can have a single ring (e.g., phenyl) or multiple condensed (fused) rings, wherein at least one ring is aromatic (e.g., naphthyl, dihydrophenanthrenyl, fluorenyl, or anthryl). Typical aryl groups include, but are not limited to, radicals derived from benzene, naphthalene, anthracene, biphenyl, and the like. The aryl can be unsubstituted or optionally substituted.

The term "heteroaryl" refers to a monocyclic, bicyclic, or tricyclic ring system containing one, two, or three aromatic rings and containing at least one nitrogen, oxygen, or sulfur atom in an aromatic ring. The heteroaryl can be unsubstituted or substituted, for example, with one or more, and in particular one to three, substituents, as described in the definition of "substituted". Typical heteroaryl groups contain 2-20 carbon atoms in the ring skeleton in addition to the one or more heteroatoms. Examples of heteroaryl groups include, but are not limited to, 2H-pyrrolyl, 3H-indolyl, 4H-quinolizinyl, acridinyl, benzo[b]thienyl, benzothiazolyl, β-carbolinyl, carbazolyl, chromenyl, cinnolinyl, dibenzo[b,d]furanyl, furazanyl, furyl, imidazolyl, imidizolyl, indazolyl, indolisinyl, indolyl, isobenzofuranyl, isoindolyl, isoquinolyl, isothiazolyl, isoxazolyl, naphthyridinyl, oxazolyl, perimidinyl, phenanthridinyl, phenanthrolinyl, phenarsazinyl, phenazinyl, phenothiazinyl, phenoxathiinyl, phenoxazinyl, phthalazinyl, pteridinyl, purinyl, pyranyl, pyrazinyl, pyrazolyl, pyridazinyl, pyridyl, pyrimidinyl, pyrrolyl, quinazolinyl, quinolyl, quinoxalinyl, thiadiazolyl, thianthrenyl, thiazolyl, thienyl, triazolyl, tetrazolyl, and xanthenyl. In one embodiment the term "heteroaryl" denotes a monocyclic aromatic ring containing five or six ring atoms containing carbon and 1, 2, 3, or 4 heteroatoms independently selected from non-peroxide oxygen, sulfur, and N(Z) wherein Z is absent or is H, O, alkyl, aryl, or $(C_1$-$C_6)$alkylaryl. In some embodiments, heteroaryl denotes an ortho-fused bicyclic heterocycle of about eight to ten ring atoms derived therefrom, particularly a benz-derivative or one derived by fusing a propylene, trimethylene, or tetramethylene diradical thereto.

A "solvent" as described herein can include water or an organic solvent. Examples of organic solvents include hydrocarbons such as toluene, xylene, hexane, and heptane; chlorinated solvents such as methylene chloride, chloroform, and dichloroethane; ethers such as diethyl ether, tetrahydrofuran, and dibutyl ether; ketones such as acetone and 2-butanone; esters such as ethyl acetate and butyl acetate; nitriles such as acetonitrile; alcohols such as methanol, ethanol, and tert-butanol; and aprotic polar solvents such as N,N-dimethylformamide (DMF), N,N-dimethylacetamide (DMA), and dimethyl sulfoxide (DMSO). Other examples of a solvent include a halogenated aromatic compound or halogenated phenyl compound such as a fluorinated or polyfluorinated phenyl compound, for example 4-chlorobenzotrifluoride. Solvents may be used alone or two or more of them may be mixed for use to provide a "solvent system".

The phrase "one or more" is readily understood by one of skill in the art, particularly when read in context of its usage. For example, one or more substituents on a phenyl ring refers to one to five, or one to up to four, for example if the phenyl ring is disubstituted. One or more subunits (i.e., repeat units or blocks) of a polymer can refer to about 5 to about 100,000, or any number of subunits.

Substituents of the compounds and polymers described herein may be present to a recursive degree. In this context, "recursive substituent" means that a substituent may recite another instance of itself. Because of the recursive nature of such substituents, theoretically, a large number may be present in any given claim. One of ordinary skill in the art of organic chemistry understands that the total number of such substituents is reasonably limited by the desired properties of the compound intended. Such properties include, by of example and not limitation, physical properties such as molecular weight, solubility or log P, application properties such as activity against the intended target, and practical properties such as ease of synthesis. Recursive substituents are an intended aspect of the invention. One of ordinary skill in the art of organic chemistry understands the versatility of such substituents. To the degree that recursive substituents are present in a claim of the invention, the total number in the repeating unit of a polymer example can be, for example, about 1-50, about 1-40, about 1-30, about 1-20, about 1-10, or about 1-5.

The term, "repeat unit", "repeating unit", or "block" as used herein refers to the moiety of a polymer that is repetitive. The repeat unit may comprise one or more repeat units, labeled as, for example, repeat unit x, repeat unit y, repeat unit a, repeat unit b, etc. Repeat units x, y, a, and b, for example, may be linked in any order and covalently bound together to form a combined repeat unit. Monomers or a combination of one or more different monomers can be combined to form a (combined) repeat unit of a polymer or copolymer.

The term "molecular weight" for the copolymers disclosed herein refers to the average number molecular weight (Mn). The corresponding weight average molecular weight (Mw) can be determined from other disclosed parameters by methods (e.g., by calculation) known to the skilled artisan.

The copolymers disclosed herein can comprise random or block copolymers. However, the copolymers of Formula I (and/or other formulas described herein) described herein is random copolymer, as shown by the "r" over the bond between the x and x-a units of the copolymer (as would be readily recognized by the method of preparation of the copolymers as described, for example, in Example 4). Thus, the arrangement of the x units and x-a units is random throughout the length of the copolymer of the Formula I, and the total number of x units and x-a units is defined by x and a of the relevant formula, randomly arranged along the length of the copolymer.

In various embodiments, the ends of the copolymer (i.e., the initiator end or terminal end), is a low molecular weight moiety (e.g. under 500 Da), such as, H, OH, OOH, $CH_2OH$, CN, $NH_2$, or a hydrocarbon such as an alkyl (for example, a butyl or 2-cyanoprop-2-yl moiety at the initiator and terminal end), alkene or alkyne, or a moiety as a result of an elimination reaction at the first and/or last repeat unit in the copolymer.

Self-assembly is a process in which a disordered system of pre-existing components forms an organized structure or pattern because of specific, local interactions among the components themselves, without external direction. For molecular self-assembly, initially, at small molecular density on the surface, adsorbate molecules form either a disordered mass of molecules or form an ordered two-dimensional "lying down phase", and at higher molecular coverage, over a period of minutes to hours, begin to form three-dimensional crystalline or semi-crystalline structures on the substrate surface. The "head groups" assemble on the substrate, while the tail groups assemble far from the substrate. Areas of close-packed molecules nucleate and grow until the surface of the substrate is covered in a single monolayer.

A brush block copolymer molecule is a special form of a branched polymer that comprises a main chain with linear, unbranched side chains. The brushes are often characterized by the high density of grafted chains. The limited space then leads to a strong extension of the chains. Branching occurs by the replacement of a substituent, e.g., a hydrogen atom, on a monomer subunit, by another covalently bonded chain of that polymer; or, in the case of a graft copolymer, by a chain of another type. Branching may result from the formation of carbon-carbon or various other types of covalent bonds. Branching by ester and amide bonds is typically by a condensation reaction.

The term "pigment" is used interchangeably with dye. A pigment is a material such as a solid, solution or liquid that changes the color of reflected or transmitted light as the result of wavelength-selective absorption. The pigment or dye is an organic compound, organometallic compound, or inorganic compound, each of which can be an additive in the polymer coatings described herein.

Linear and non-linear polymer additives, as described herein, can be polymeric in nature. These polymers can have a variety of microstructural features, also known as polymer architectures, classified by the terms "linear" and "non-linear". Linear polymers contain no branching from the polymer main chain. Linear polymers encompass linear block copolymers of the Nth degree, where N different monomeric units form the linear block copolymer. Non-linear polymers contain branching from the main chain and include the following common architectures: star polymer, star block copolymer, comb polymer, comb block copolymer, brush polymer, brush block copolymer, tadpole polymer, tadpole block copolymer, dendritic polymer, dendritic block copolymer. Non-linear polymers also encompass crosslinked polymers, such as crosslinked polymer microparticles or crosslinked polymer nanoparticles.

Examples of polymer additives, both linear and non-linear, may include: optionally substituted aliphatic polyesters, poly(amino acids), copoly(ether-esters), polyalkylenes oxalates, poly-amides, poly(iminocarbonates), polyorthoesters, polyoxaesters, polyamidoesters, polyoxaesters containing amine groups, poly(anhydrides), polyphosphazenes, polysiloxanes, polyethylene, polyethylene terephthalate, poly(tetrafluoro-ethylene), polycarbonate, polypropylene, poly lactic acid (PLA), polyglycolic acid (PGA), polycaprolactone (PCL), poly(Lactide-co-Glycolide) (PLGA), polydioxanone (PDO), trimethylene carbonate (TMC), polyethyleneglycol (PEG), polyurethanes, polyacrylonitriles, polyanilines, polyvinyl carbazoles, polyvinyl chlorides, polyvinyl fluorides, polyvinyl imidazoles, polyvinyl alcohols, polystyrenes and poly (vinyl phenols), aliphatic polyesters, polyacrylates, polymethacrylates, polystyrenes, chlorosulphonated poly-olefins, and copolymers thereof. Additionally, or alternatively, block polymer architectures of the above may be used.

Applicable molecular weights of the above polymeric additives can range from 300 Da to 100 kDa, preferably in the range 500 Da to 10 kDa, more preferably in the range 1000 Da to 5 kDa. Applicable loadings by mass in a final coating system can range from 1%-80%, preferably in the range 5%-50%, more preferably in the range 10%-40%.

An optical adhesive disclosed herein is used to bond or cement optical components together or to an optical system for several different applications. In this disclosure, the transparent topcoats are bonded to the photonic crystal coating, which is an optical component.

An ultraviolet curable resin disclosed herein is a material that is polymerized and cured by the energy radiated from an ultraviolet irradiation device.

A substrate disclosed herein can be any material which is coated with the composition disclosed herein. For example, a substrate can be a glass, metal, alloy, polymer, composite, wood, dried paint, or a surface of any kind.

The following abbreviations have their usual meaning to the skilled artisan: D=dispersity, kDa=kilodalton, $M_n$=number-average molecular weight, Mw=weight average molecular weight.

Embodiments of the Invention

This disclosure provides a multilayer coating comprising:
a) a first layer of a photonic crystal film comprising an additive and brush block copolymer (BBCP) of Formula IA or Formula IB:
wherein

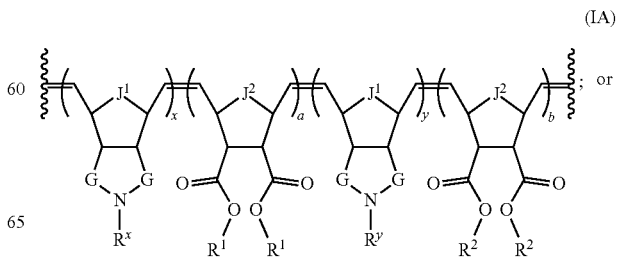

(IB)

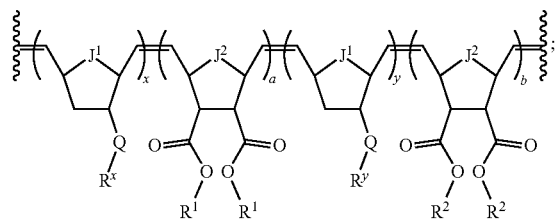

$R^x$ is —$(C_2-C_6)$alkyl-OC(=O)$G^1$ wherein $G^1$ comprises polyacrylate, polymethacrylate or polylactic acid; or
—$(C_1-C_8)$alkyl-$G^2$-$G^3$ wherein $G^2$ is —C(=O)O— or a nitrogen heterocycle and $G^3$ comprises polystyrene, polyacrylate, polydimethylsiloxane, polyether, polymethacrylate, or polylactic acid;

$R^y$ is —$(C_2-C_6)$alkyl-OC(=O)$G^1$ wherein $G^1$ comprises polyacrylate, polymethacrylate or polylactic acid; or
—$(C_1-C_8)$alkyl-$G^2$-$G^3$ wherein $G^2$ is —C(=O)O— or a nitrogen heterocycle and $G^3$ comprises polystyrene, polyacrylate, polydimethylsiloxane, polyether, polymethacrylate, or polylactic acid;

$R^1$ is unbranched alkyl;
$R^2$ is branched alkyl;
each G is each independently $CH_2$ or C=O;
each $J^1$ is independently $CH_2$, C=O, or O;
each $J^2$ is independently $CH_2$, C=O, or O;
each Q is independently alkyl, cycloalkyl, heterocycloalkyl, carbonyl, silyl, aryl, or heteroaryl;
a and b are each independently 0 to about 1000; and
x and y are each independently 1 to about 1000;
wherein blocks a, b, x and y are in any order, the ratio of x:a is 1:0 to about 1:3, and the ratio of y:b is 1:0 to about 1:3; and
b) a second layer comprising a topcoat wherein the topcoat is an optical adhesive or ultraviolet curable resin;
wherein the first layer and second layer form a multilayer film and the multilayer coating comprises one or more multilayer films.

In some embodiments, the additive is optional. In some embodiments, the topcoat comprises a Sigma-Aldrich UV curable resin (topcoat A), Forms lab Clear resin (RS-F2-GPCL-04, e.g., topcoat B), or Norland Optical Adhesives 68TH (topcoat C) or 13825 (topcoat D). See topcoats in Example 3. In various other embodiments, the nitrogen heterocycle is a triazole or a heterocycle disclosed above.

In some embodiments, the optional additive is a pigment. In some other embodiments, the pigment is an acid dye, basic dye, azo dye, acridine dye, rylene dye, sulfur dye, pH indicator, food dye, fluorescent brightener, anthraquinone dye, arylmethane dye, triarylmethane dye, phthalocyanine dye, quinone-imine dye, Azin dye, indophenol dye, oxazin dye, oxazone dye, thiazine dye, thiazole dye, safranin dye, xanthene dye, perylene diimide dye, rhodamine dye, or combination thereof. In some additional embodiments, the pigment or dye is, but is not limited to, acridine, bromothymol, carmine, Eosin Y, Guaiazulene, perylene, or a combination thereof.

In other embodiments, a and b are each independently 1-300, 5-50, 50-100, 100-150, 150-200, 200-250, 250-300, 300-400, 400-500, 500-600, 600-700, 700-800, 800-900, 900-1000, or 1000-2000. In other embodiments, x and y are each independently 1-300, 5-50, 50-100, 100-150, 150-200, 200-250, 250-300, 300-400, 400-500, 500-600, 600-700, 700-800, 800-900, 900-1000, or 1000-2000. In additional embodiments, the ratio of x:a is about 1:0.5 to about 1:1, 1:1.5, 1:2, or 1:2.5. In yet other embodiments, the ratio of y:b is about 1:0.5 to about 1:1, 1:1.5, 1:2, or 1:2.5.

In further embodiments, the composition reflects a blue color, green, orange color, red color, or reflects wavelengths at near infrared. In various embodiments, BBCP has a number average molecular weight of about 500 kDa to about 4000 kDa.

In some embodiments, the compositions are characterized by the blue color in compositions comprising Formulas I or II when $M_n$=1110.3 kDa, Mw=1196.1 kDa, Đ=1.08, and a=x=y=b=about 164. Preferably a=x=y=b=140-180 in some embodiments. More preferably a=x=y=b=150-170 in other embodiments.

In some embodiments, the compositions are characterized by the green color in compositions comprising Formulas I or II when $M_n$=1275.7 kDa, Mw=1403.2 kDa, Đ=1.10, and a=x=y=b=about 179. Preferably a=x=y=b=160-190 in some embodiments. More preferably a=x=y=b=165-185 in other embodiments.

In some embodiments, the compositions are characterized by the orange color in compositions comprising Formulas I or II when $M_n$=1795.3 kDa, Mw=2010.4 kDa, Đ=1.12, and a=x=y=b=about 252. Preferably a=x=y=b=230-270 in some embodiments. More preferably a=x=y=b=240-260 in other embodiments.

In some embodiments, the compositions are characterized by the wavelengths reflected at near infrared in compositions comprising Formulas I or II when $M_n$=2063.1 kDa, Mw=2384.8 kDa, Đ=1.16, and a=x=y=b=about 289. Preferably a=x=y=b=270–300 in some embodiments. More preferably a=x=y=b=275-295 in other embodiments.

In various other embodiments, the weight percent of BBCP is about 90% to about 99.9%. In some other embodiments, the weight percent of the pigment or dye is about 0.1% to about 10%. In some embodiments, the weight percent of BBCP is about 85%. 91%, 92%, 93%, 94%, 95%, 96%, 97%, 98% or 99%%, or any range in-between. In yet some other embodiments, the weight percent of the pigment or dye is about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10% or 15%%, or any range in-between.

In additional embodiments, the composition further comprises a metal oxide, a linear polymer additive, or a combination thereof. In some embodiments, the linear polymer additive is linear poly(methacrylate), linear polylactic acid, linear polystyrene, or a combination thereof. In yet some other embodiments, the composition further comprises zirconium dioxide nanocrystals, titanium oxide, or hafnium oxide.

In further embodiments, the BBCP of Formula I is a BBCP of Formula IC or Formula II:

(IC)

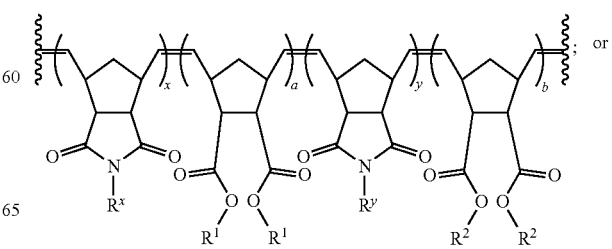

-continued (II)

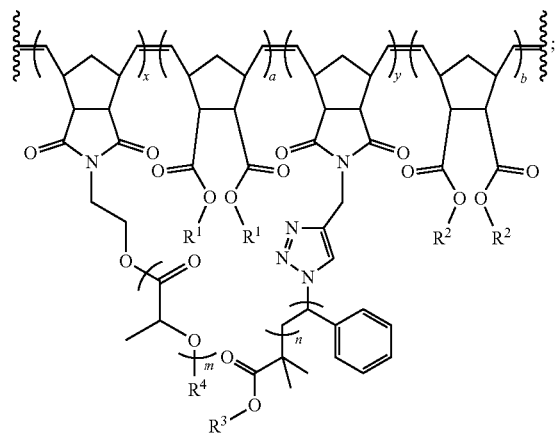

wherein
R³ and R⁴ are each independently H or unbranched or branched —(C₁-C₆)alkyl; and
m and n are each independently 1 to about 100.

In other embodiments, m and n are each independently 1-10, 10-50, 10-20, 20-30, 30-40, 40-50, or 50-100.

In other embodiments, the brush block copolymer (BBCP) is represented by Formula ID, IE, or IF:

(ID)

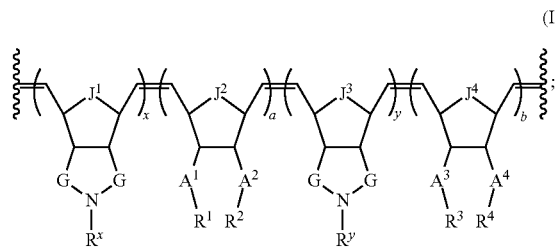

(IE)

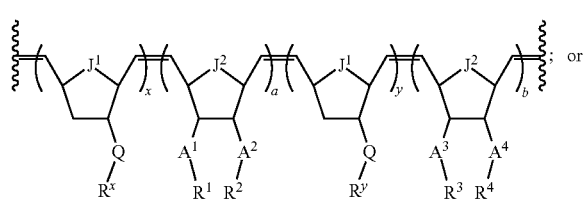

(IF)

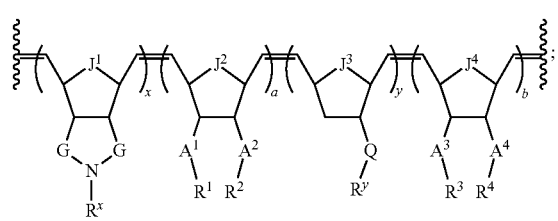

wherein
$R^x$ is —(C₂-C₆)alkyl-OC(=O)G¹ wherein G¹ comprises polyacrylate, polymethacrylate or polylactic acid; or
—(C₁-C₈)alkyl-G²-G³ wherein G² is —C(=O)O— or a nitrogen heterocycle and G³ comprises polystyrene, polyacrylate, polydimethylsiloxane, polyether, polymethacrylate, or polylactic acid;
$R^y$ is —(C₂-C₆)alkyl-OC(=O)G¹ wherein G¹ comprises polyacrylate, polymethacrylate or polylactic acid; or
—(C₁-C₈)alkyl-G²-G³ wherein G² is —C(=O)O— or a nitrogen heterocycle and G³ comprises polystyrene, polyacrylate, polydimethylsiloxane, polyether, polymethacrylate, or polylactic acid;
R¹ is unbranched or unbranched alkyl;
R² is branched or unbranched alkyl;
R³ is branched or unbranched alkyl;
R⁴ is branched or unbranched alkyl;
each G is each independently CH₂ or C=O;
J¹ is CH₂, C=O, or O;
J² is CH₂, C=O, or O;
J³ is CH₂, C=O, or O;
J⁴ is CH₂, C=O, or O;
A¹, A², A³, and A⁴ are each independently

each Q is independently alkyl, cycloalkyl, heterocycloalkyl, carbonyl, silyl, aryl, or heteroaryl;
a and b are each independently 0 to about 1000; and
x and y are each independently 1 to about 1000;
wherein blocks a, b, x and y are in any order, the ratio of x:a is 1:0 to about 1:3, and the ratio of y:b is 1:0 to about 1:3.

This disclosure additionally provides a method for reducing haze of a substrate comprising coating a substrate with a multilayer coating wherein the multilayer coating comprises:

a) a first layer of a photonic crystal film; and
b) a second layer comprising a topcoat wherein the topcoat is an optical adhesive or ultraviolet curable resin;

wherein the first layer modulates the reflectance, absorbance and transmission profile of the substrate wherein at least 5% more electromagnetic radiation is reflected by the coated substrate than for a corresponding uncoated substrate, and the second layer reduces haze of the reflected electromagnetic radiation by at least 5% compared to the corresponding uncoated substrate. In some embodiments, the first layer comprises a BBCP of Formula IA, Formula IB, Formula II, or Formula IC.

In some embodiments, about 5% to about 25%, about 25% to about 50%, about 50% to about 75%, or about 75% to about 95%, more electromagnetic radiation is reflected by the coated substrate than for a corresponding uncoated substrate. In other embodiments, haze of the reflected electromagnetic radiation is reduced by about 5% to about 10%, about 10% to about 20%, about 20% to about 30%, about 30% to about 40%, about 40% to about 50%, about 50% to about 75%, or about 75% to about 95% compared to the corresponding uncoated substrate.

Also, this disclosure provides a method for modulating an electromagnetic radiation reflectance, absorbance and transmission profile of a substrate comprising coating a substrate with a multilayer coating according to the compositions disclosed herein, and at least 5% more electromagnetic radiation is reflected by the coated substrate than for a corresponding uncoated substrate.

In various embodiments, the photonic crystal film has an optical thickness f-ratio of about 0.25 to about 0.55, or an f-ratio of about 0.1, 0.2, 0.3, 0.4, 0.5, 0.6, 0.7, 0.8, or 0.9%, or any range in-between.

In some embodiments, the reflectance, absorbance and transmission profile of the substrate comprises reflected electromagnetic radiation at wavelengths of about 280 nanometers to about 400 nanometers. In other embodiments, the reflectance, absorbance and transmission profile of the substrate comprises reflected electromagnetic radiation at wavelengths of about 400 nanometers to about 700 nanometers. In yet other embodiments, the reflectance, absorbance and transmission profile of the substrate comprises reflected electromagnetic radiation at wavelengths of about 700 nanometers to about 1400 nanometers.

In further embodiments, the reflectance, absorbance and transmission profile of the substrate comprises reflected electromagnetic radiation at wavelengths of about 200 nm to about 300 nm, about 300 nm to about 400 nm, about 400 nm to about 500 nm, about 500 nm to about 600 nm, about 600 nm to about 700 nm, about 700 nm to about 800 nm, about 800 nm to about 900 nm, about 900 nm to about 1000 nm, about 1000 nm to about 1100 nm, about 1100 nm to about 1200 nm, about 1200 nm to about 1300 nm, about 1300 nm to about 1400 nm, or about 1400 nm to about 1550 nm, or to about 1600 nm.

Additionally, this disclosure provides a method for forming a multilayer coating comprising:

a) combining a solvent and a brush block copolymer (BBCP) to form a mixture, wherein BBCP is a BBCP of Formula IA, Formula IB, or Formula II above, or Formula IC:

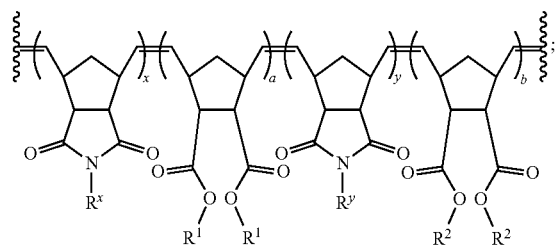

(IC)

wherein $R^x$ is —$(C_2-C_6)$alkyl-OC(=O)$G^1$ wherein $G^1$ comprises polyacrylate, polymethacrylate or polylactic acid; or —$(C_1-C_8)$alkyl-$G^2$-$G^3$ wherein $G^2$ is —C(=O)O— or a nitrogen heterocycle and $G^3$ comprises polystyrene, polyacrylate, polydimethylsiloxane, polyether, polymethacrylate, or polylactic acid;

$R^y$ is —$(C_2-C_6)$alkyl-OC(=O)$G^1$ wherein $G^1$ comprises polyacrylate, polymethacrylate or polylactic acid; or —$(C_1-C_8)$alkyl-$G^2$-$G^3$ wherein $G^2$ is —C(=O)O— or a nitrogen heterocycle and $G^3$ comprises polystyrene, polyacrylate, polydimethylsiloxane, polyether, polymethacrylate, or polylactic acid;

$R^1$ is unbranched alkyl;
$R^2$ is branched alkyl;
a and b are each independently 0 to about 1000; and
x and y are each independently 1 to about 1000;
wherein the ratio of x:a is 1:0 to about 1:3 and the ratio of y:b is 1:0 to about 1:3;

b) applying a first layer of the mixture to a substrate;
c) drying the first layer to form a film; and
d) applying a second layer comprising a topcoat to the film wherein the topcoat is an optical adhesive or ultraviolet curable resin;
wherein the film and second layer form the multilayer coating on the substrate.

In some embodiments, the solvent is 4-chlorobenzotrifluoride. In various embodiments, the method comprises a BBCP of Formula II or Formula III as described above. In other embodiments, the pigment is an acid dye, basic dye, azo dye, acridine dye, rylene dye, sulfur dye, pH indicator, food dye, fluorescent brightener, anthraquinone dye, arylmethane dye, triarylmethane dye, phthalocyanine dye, quinone-imine dye, azin dye, indophenol dye, oxazin dye, oxazone dye, thiazine dye, thiazole dye, safranin dye, xanthene dye, perylene diimide dye, rhodamine dye, or a combination thereof. In some additional embodiments, the pigment or dye is, but is not limited to, acridine, bromothymol, carmine, Eosin Y, Guaiazulene, perylene, or a combination thereof.

In some further embodiments, the pigment or dye has a weight percent of about 0.1% to about 3% in the mixture, or about 0.1%, 0.2%, 0.3%, 0.4%, 0.5%, 0.6%, 0.7&, 0.8%, 0.9%, 1%, 1.5%, 2.0%, 2.5%, 3.0%, 4%, 5% or 10%%, or any range in-between, in the mixture. In other embodiments, BBCP has a weight percent of about 10% to about 30% in the mixture, or about 1%, 5%, 10%, 15%, 20%, 25%, 30% or 40%%, or any range in-between, in the mixture.

In various other embodiments of the composition and method, BBCP has a number average molecular weight of about 500 kDa to about 4000 kDa, or about 900 kDa to about 1100 kDa. In other embodiments, BBCP has a number average molecular weight of about 100 kDa, 200 kDa, 300 kDa, 400 kDa, 500 kDa, 600 kDa, 700 kDa, 800 kDa, 900 kDa, 1000 kDa, 1100 kDa, 1200 kDa, 1300 kDa, 1400 kDa, 1500 kDa, 1600 kDa, 1700 kDa, 1800 kDa, 1900 kDa, 2000 kDa, 2100 kDa, 2200 kDa, 2300 kDa, 2400 kDa, 2500 kDa, 2600 kDa, 2700 kDa, 2800 kDa, 2900 kDa, 3000 kDa, 3500 kDa, 4000 kDa, or 4500 kDa %, or any range in-between.

In yet other embodiments of the above method, step a) further comprises addition to the mixture of a metal oxide, a linear polymer additive, or a combination thereof. In various embodiments, the linear polymer additive is linear poly(methacrylate), linear polylactic acid, linear polystyrene, or a combination thereof. In additional embodiments of the above method, applying the first layer and applying the second layer comprises, but is not limited to, spray deposition of the first layer and the second layer, or other methods of deposition disclosed herein, for example, draw-down coating, slot die coating, screen printing, spray deposition, or paintbrush/roller of the mixture to the substrate.

Various aspects of this disclosure include embodiments wherein:

Photonic crystal materials optionally containing either an inorganic or organic additive(s), involving the addition of at least one inorganic or organic component to a polymer-based photonic crystal or an organic additive composed of a different monomeric unit compared to the composition of the polymeric components.

The photonic crystal is formed from a linear block polymer, brush block polymer, star polymer, polymeric colloidal crystalline array, or any repeating dielectric structure.

The polymer is assembled or manufactured into spheres, cylinders, gyroids, lamellae or any periodic structure accessible by polymer self-assembly.

The polymer composite photonic crystal material, or solely the brush block copolymer is deposited via draw down, wire bar, doctor blade, or bird bar.

The polymer composite photonic crystal material, or solely the brush block copolymer is deposited via by paint brush or roller application.

The polymer composite photonic crystal material, or solely the brush block copolymer is deposited via screen printing.

The polymer composite photonic crystal material, or solely the brush block copolymer is deposited via dip coating.

The polymer composite photonic crystal material, or solely the brush block copolymer is deposited via hydrographic printing.

The polymer composite photonic crystal material, or solely the brush block copolymer is deposited via spray brush, spray gun, or other spray application methods including but not limited to air-atomized, airless, electrostatic, high-volume, low-pressure.

The photonic crystal coating has high near-infrared reflection and low visible reflection.

The photonic crystal coating has high visible reflection and low ultraviolet reflection.

The inorganic component is a nano-scale form (including molecular complexes and particulates in general) of alkali (earth) metals.

The inorganic component is a nano-scale form (including molecular complexes and particulates in general) of Group IV metals such as titanium, zirconium, hafnium, and/or their oxides, or combinations of any elements with Group IV metals and/or oxides.

The inorganic component is a nano-scale form (including molecular complexes and particulates in general) of Group V metals such as vanadium, niobium, and tantalum and/or their oxides, or combinations of any elements with Group V metals and/or oxides.

The inorganic component is a nano-scale form (including molecular complexes and particulates in general) of Group VI metals such as chromium, molybdenum, and tungsten and/or their oxides, or combinations of any elements with Group VI metals and/or oxides.

The inorganic component is a nano-scale form (including molecular complexes and particulates in general) of Group VII metals such as manganese, technetium, and rhenium and/or their oxides, or combinations of any elements with Group VII metals and/or oxides.

The inorganic component is a nano-scale form (including molecular complexes and particulates in general) of Group VIII metals such as iron, ruthenium, and osmium and/or their oxides, or combinations of any elements with Group VIII metals and/or oxides.

The inorganic component is a nano-scale form (including molecular complexes and particulates in general) of Group IX metals such as cobalt, rhodium, and iridium and/or their oxides, or combinations of any elements with Group IX metals and/or oxides.

The inorganic component is a nano-scale form (including molecular complexes and particulates in general) of Group X metals such as nickel, palladium, and platinum and/or their oxides, or combinations of any elements with Group X metals and/or oxides.

The inorganic component is a nano-scale form (including molecular complexes and particulates in general) of Group XI metals such as copper, silver, and gold and/or their oxides, or combinations of any elements with Group XI metals and/or oxides.

The inorganic component is a nano-scale form (including molecular complexes and particulates in general) of Group XII metals such as zinc, cadmium, and mercury and/or their oxides, or combinations of any elements with Group XII metals and/or oxides.

The inorganic component is functionalized with a surface ligand. If the inorganic component is functionalized with a surface ligand, the inorganic component can be functionalized with a surface polymer-based ligand.

The organic or inorganic additive component has a refractive index greater or less than 0.05 from the homopolymer that would be derived from the monomeric unit(s) that compose the BCP.

The organic or inorganic additive component is used to change the f value of the composition to $0.50\pm0.03$.

The organic or inorganic additive component is used to change the f value of the composition to $0.33\pm0.03$.

The inorganic or organic additive is a dye.

The inorganic or organic additive is a pigment.

The inorganic or organic additive absorbs ultra-violet A or B light (280-400 nm).

The inorganic or organic additive changes the absorption or transmission profile of the photonic crystal in the ultra-violet A or B light range (280-400 nm).

The inorganic or organic additive absorbs visible light (400-700 nm).

The inorganic or organic additive changes the absorption or transmission profile of the photonic crystal in the visible light range (400-700 nm).

The inorganic or organic additive absorbs near infrared, IR-A, light range (700-1400 nm).

The inorganic or organic additive changes the absorption or transmission profile of the photonic crystal in the near infrared, IR-A, light range (700-1400 nm).

The disclosed composition of a photonic crystal film with a laminate or resin topcoat.

The disclosed composition wherein the resin is photocurable.

The disclosed composition wherein the resin is thermally curable.

The disclosed composition wherein the resin is curable at ambient conditions.

The disclosed composition wherein the crosslinking mechanism of the resin uses any of the following chemical functionality but not limited to acrylates, cyano-acrylates, methacrylates, acrylamides, thiols, compounds containing a terminal sp2 hybridized carbon, isocyanates, epoxides, urethanes, siloxanes and/or silanes.

The disclosed method wherein the photonic crystal is formed through a bottom-up fashion.

The disclosed method wherein the photonic crystal is formed through self-assembly.

The disclosed method wherein the photonic crystal is composed of polymeric materials.

The disclosed method wherein the photonic crystal is composed of a block copolymer.

The disclosed method wherein the photonic crystal is composed of a brush block copolymer.

The disclosed method wherein a two-component system is deposited followed by separation into two photonic crystal film and topcoat.

Results and Discussion

Figure 2:
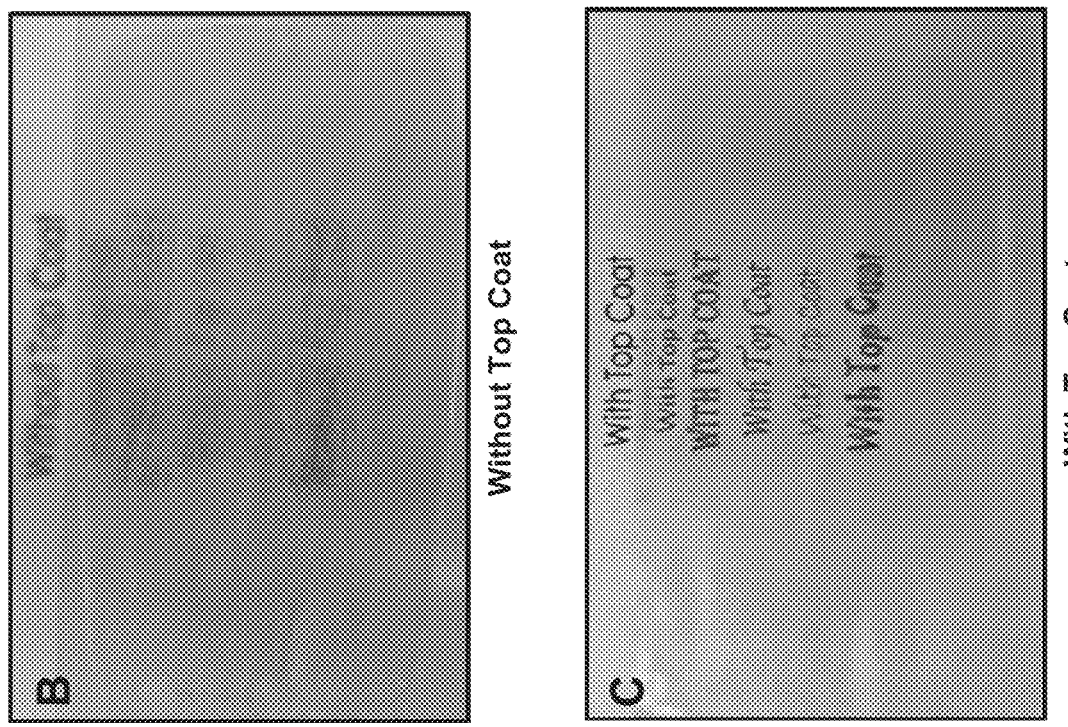
FIG. 2. Left: A, D, G, J) Graphs of the diffuse and total transmissions for photonic crystal coatings of various $\lambda_{max}$ reflections without a topcoat (dashed line) and using Sigma-Aldrich's UV curable resin as a topcoat (solid black line). On the right: B, E, H, K) pictures of photonic crystals without a topcoat next to their respective graph. C, F, I, L) pictures of photonic crystals with Sigma-Aldrich's UV curable resin as a topcoat next to their respective graph. Pictures were taken two inches above text "Without Top Coat" or "With Top Coat" to demonstrate clarity before and after.
Figure 2:
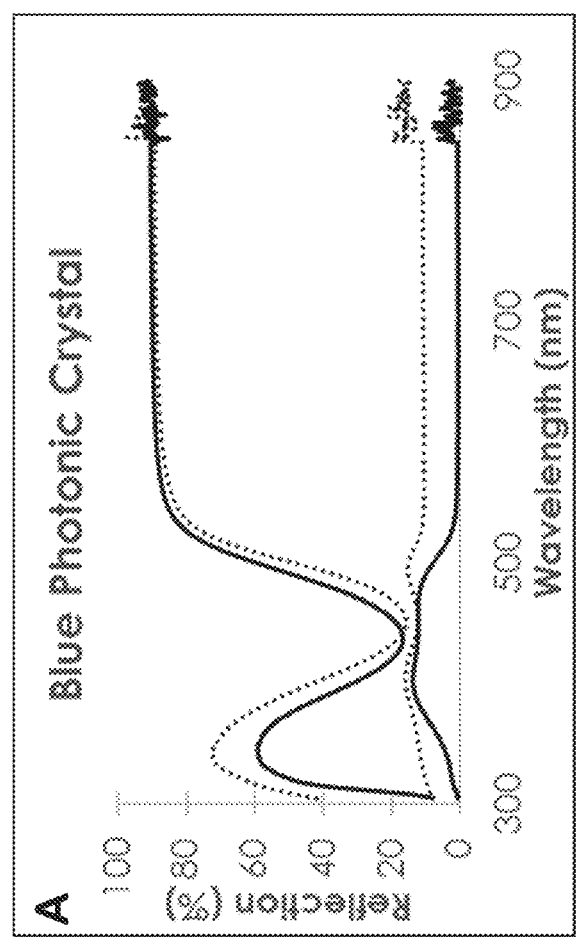
Figure 2:
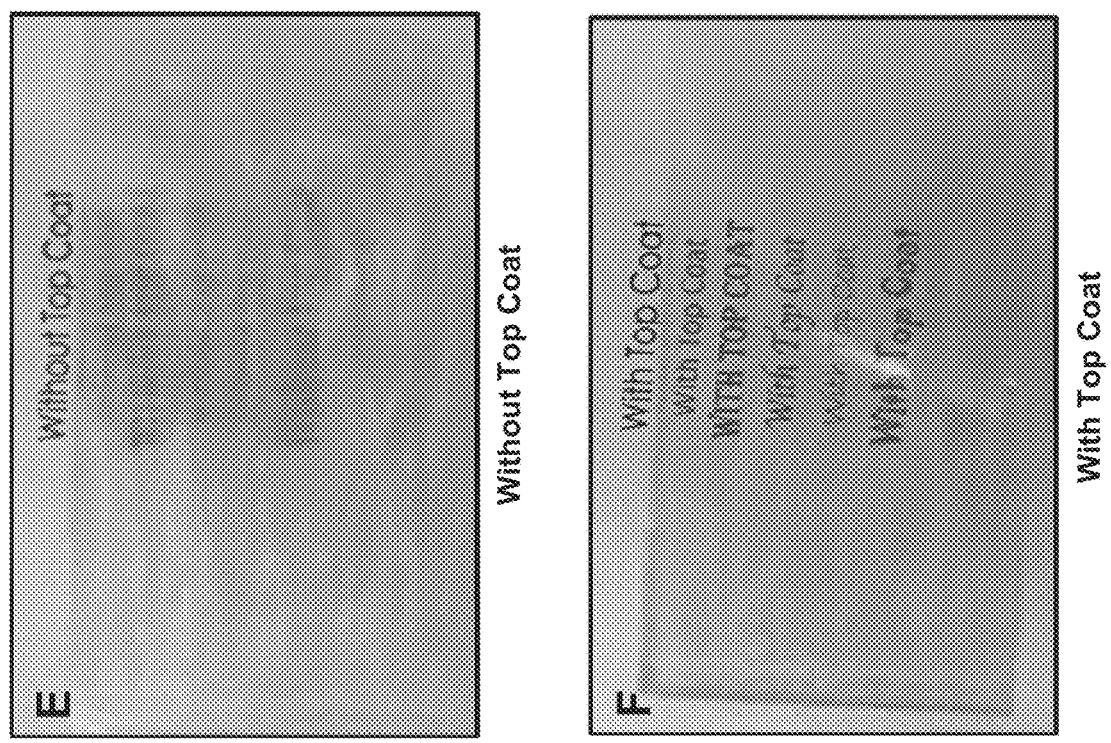
Figure 2:
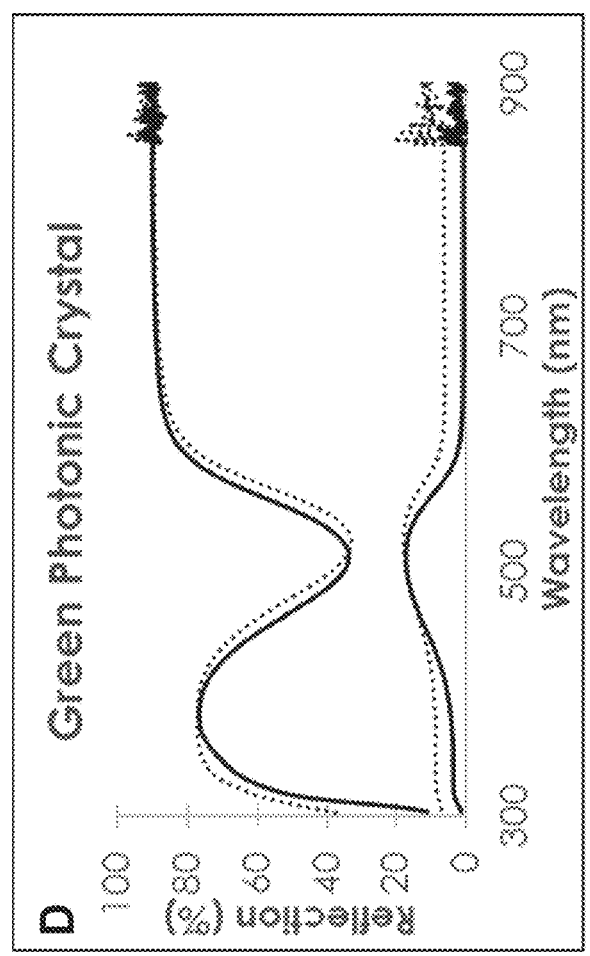
Figure 2:
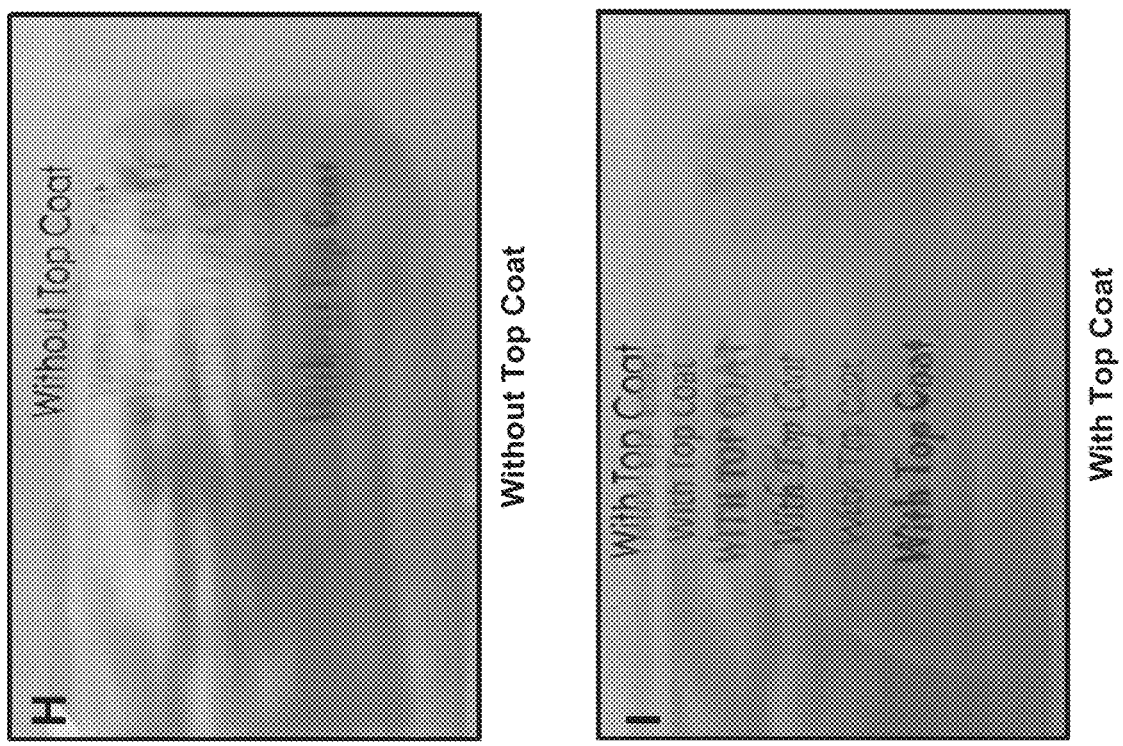
Figure 2:
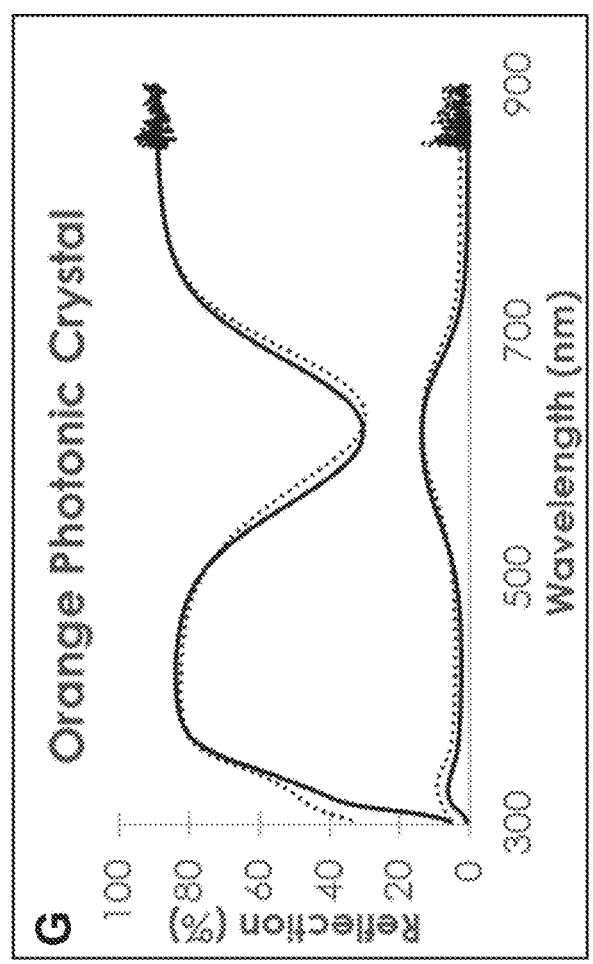
Figure 2:
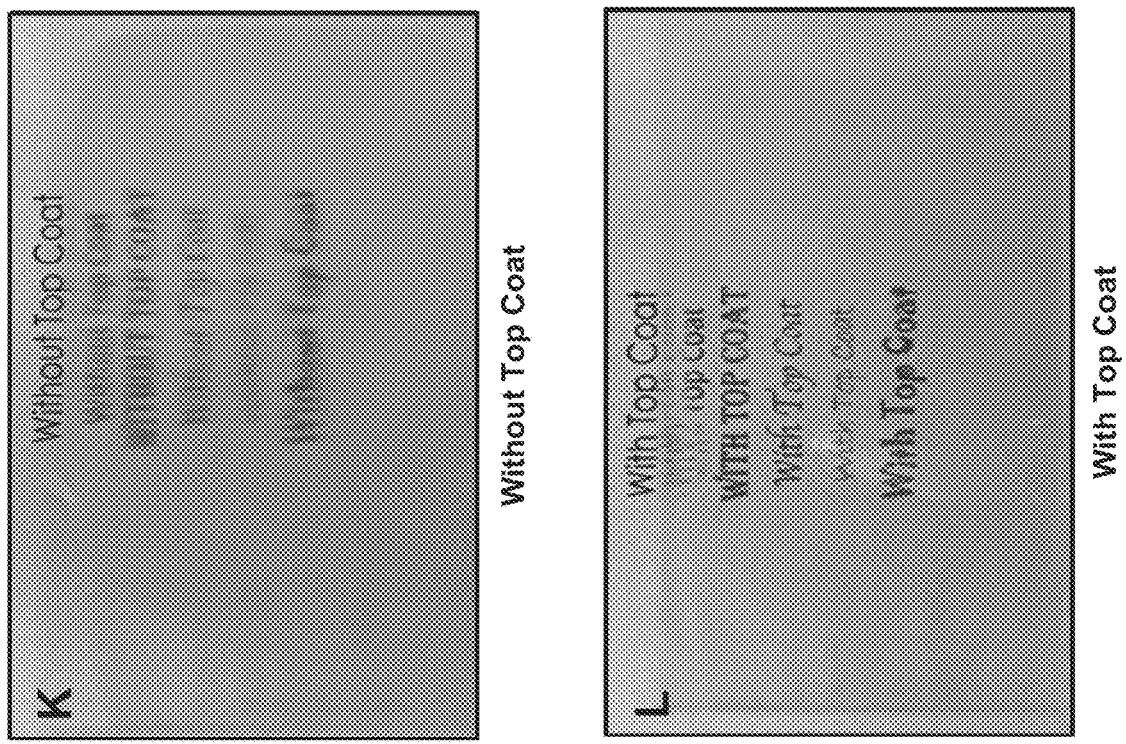
Figure 2:
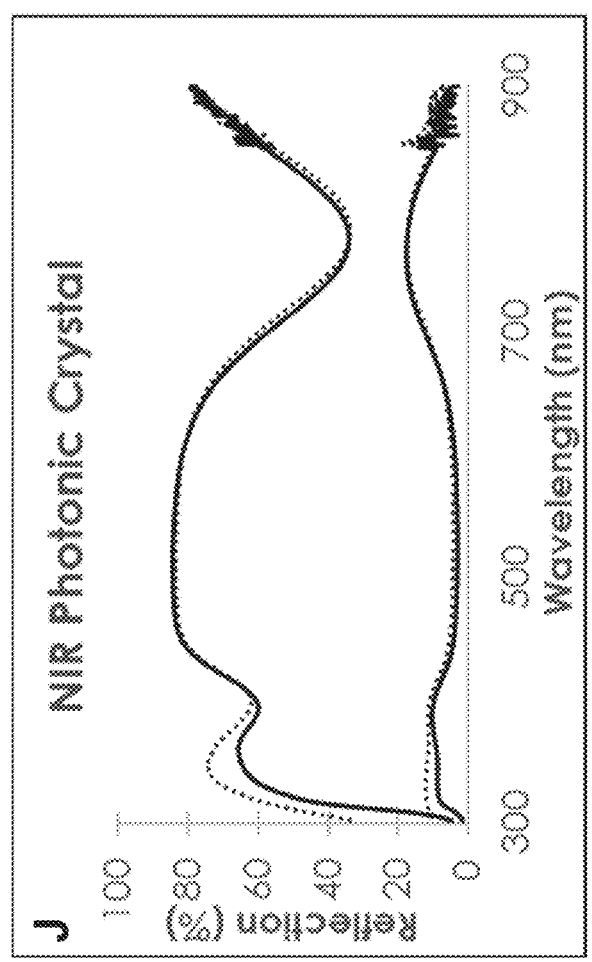
Figure 3:
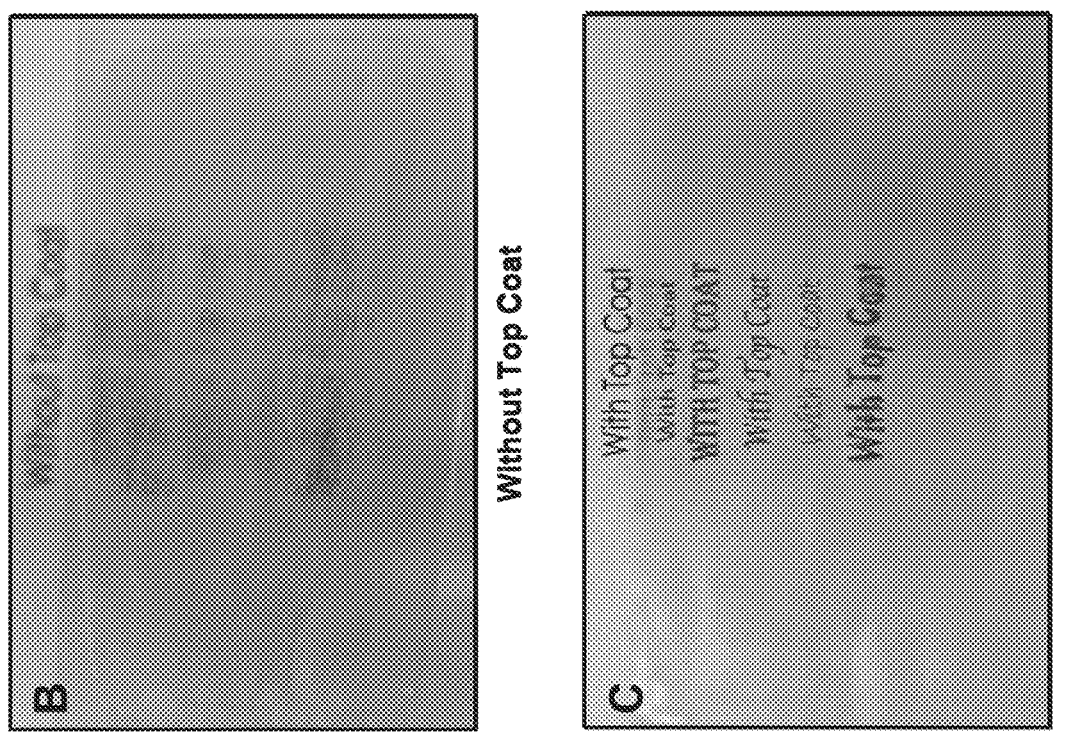
FIG. 3. On the left: A, D, G, J) Graphs of the diffuse and total transmissions for photonic crystal coatings without a topcoat (dashed line) and with various topcoats (solid black line). On the right: B, E, H, K) pictures of photonic crystals without a topcoat next to their respective graph. C, F, I, L) pictures of photonic crystals with a topcoat next to their respective graph. Pictures were taken two inches above text "Without Top Coat" or "With Top Coat" to demonstrate clarity before and after topcoat addition, respectively.
Figure 3:
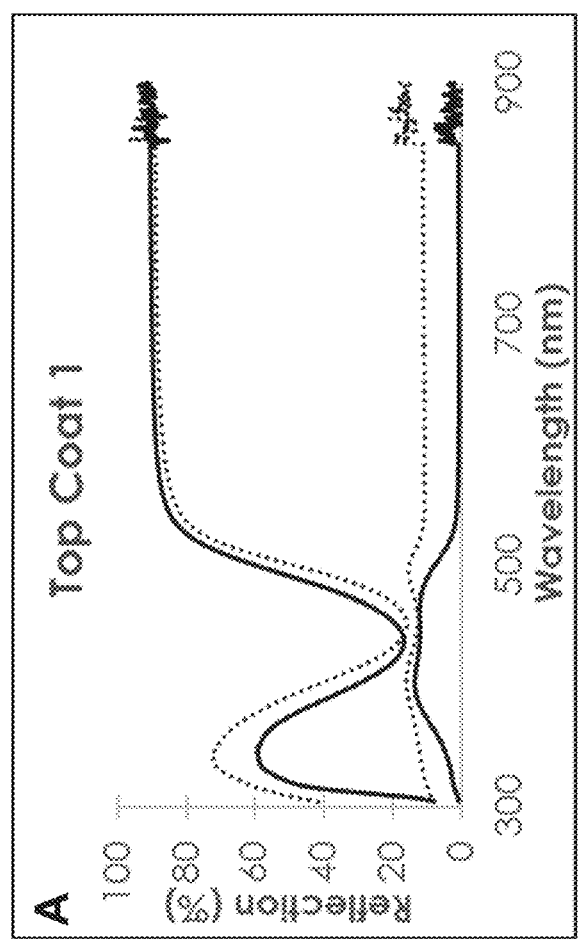
Figure 3:
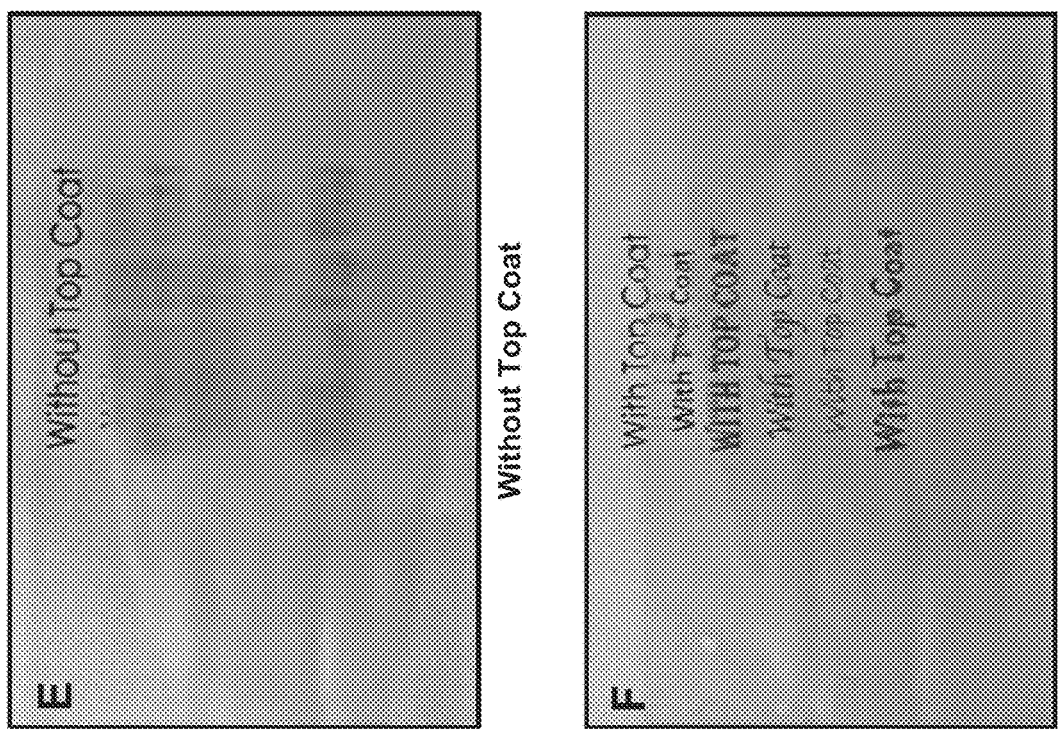
Figure 3:
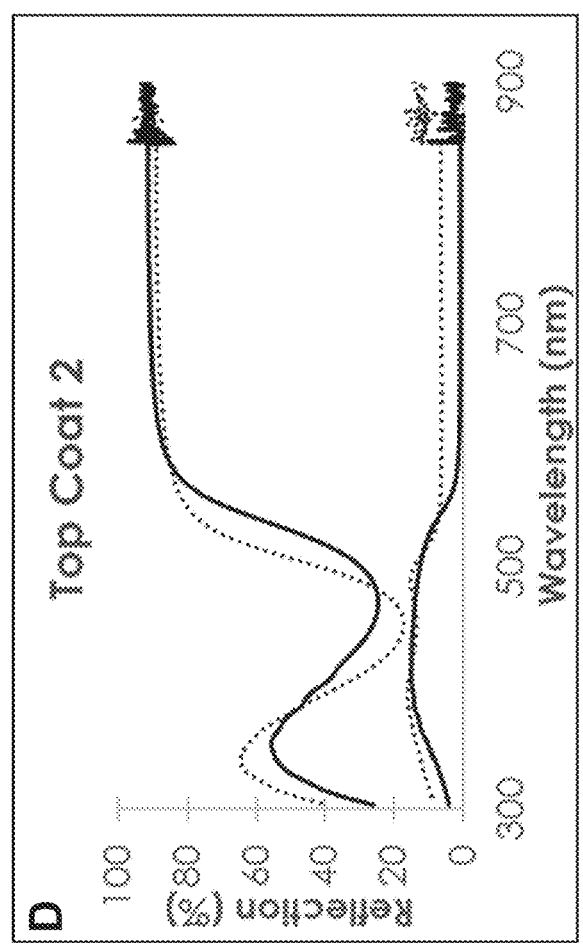
Figure 3:
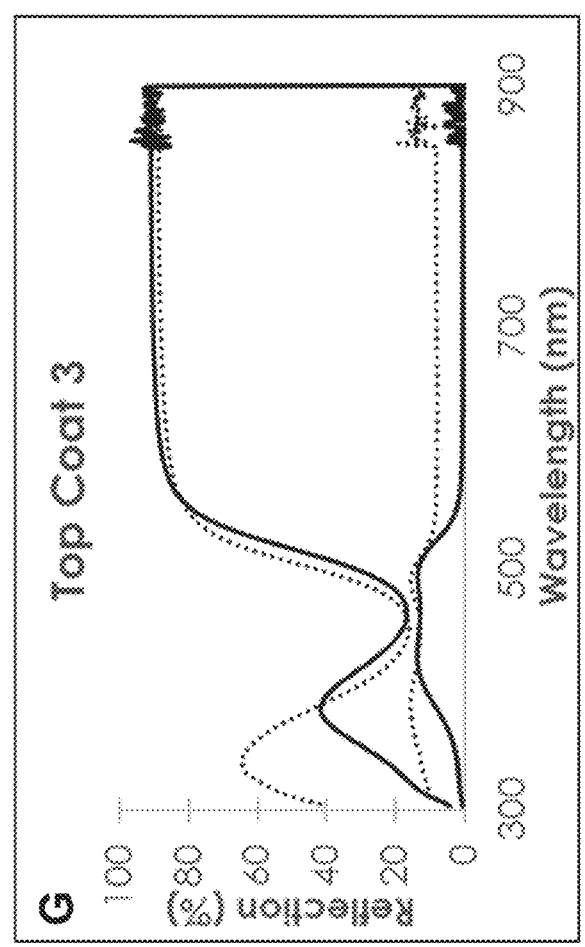
Figure 3:
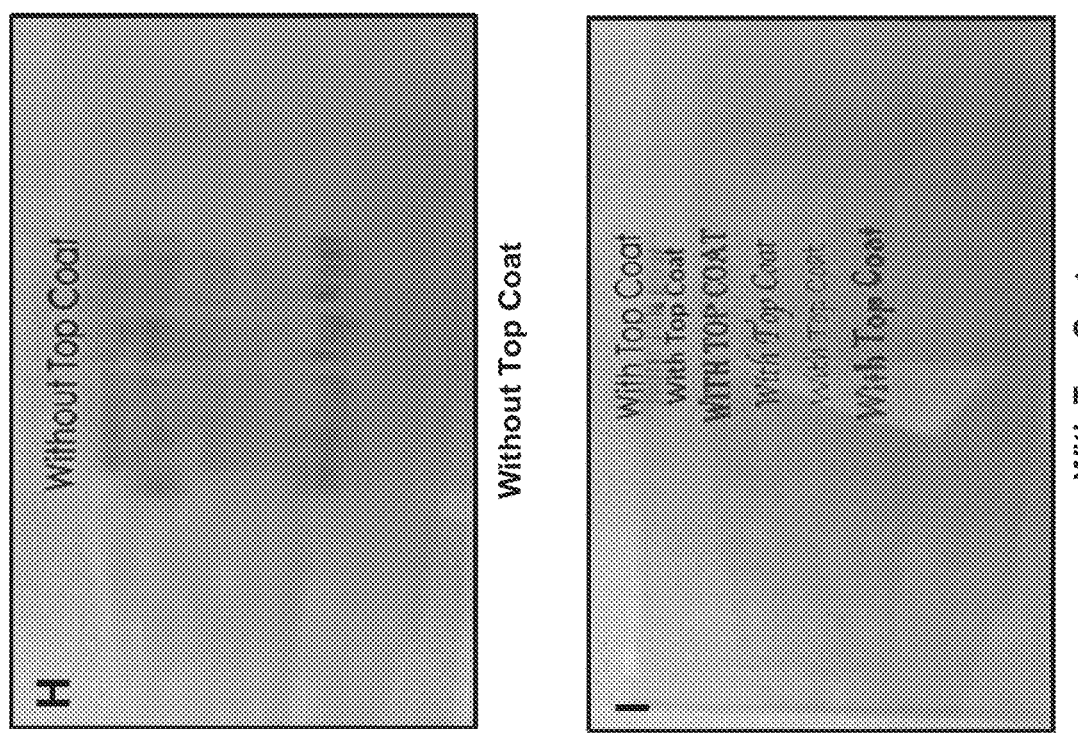
Figure 3:
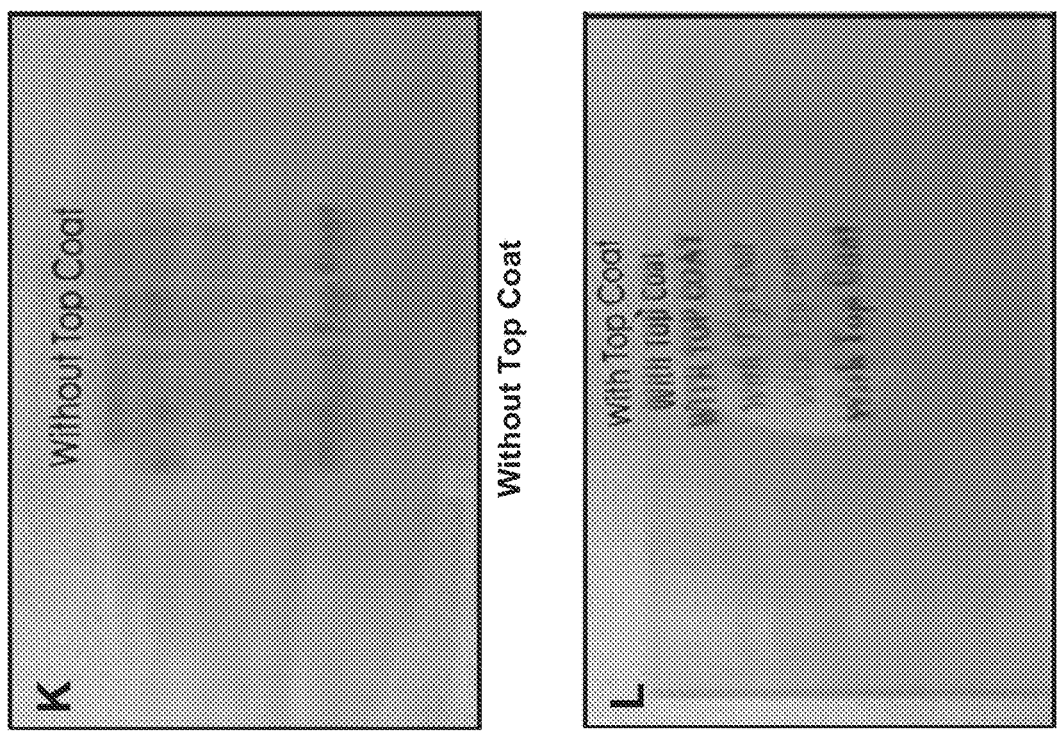
Figure 3:
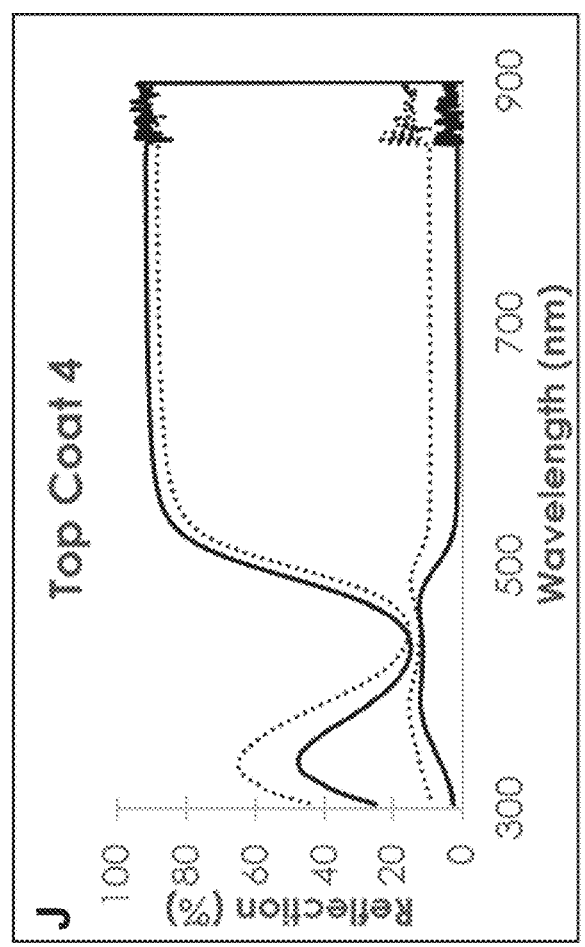
Figure 4:
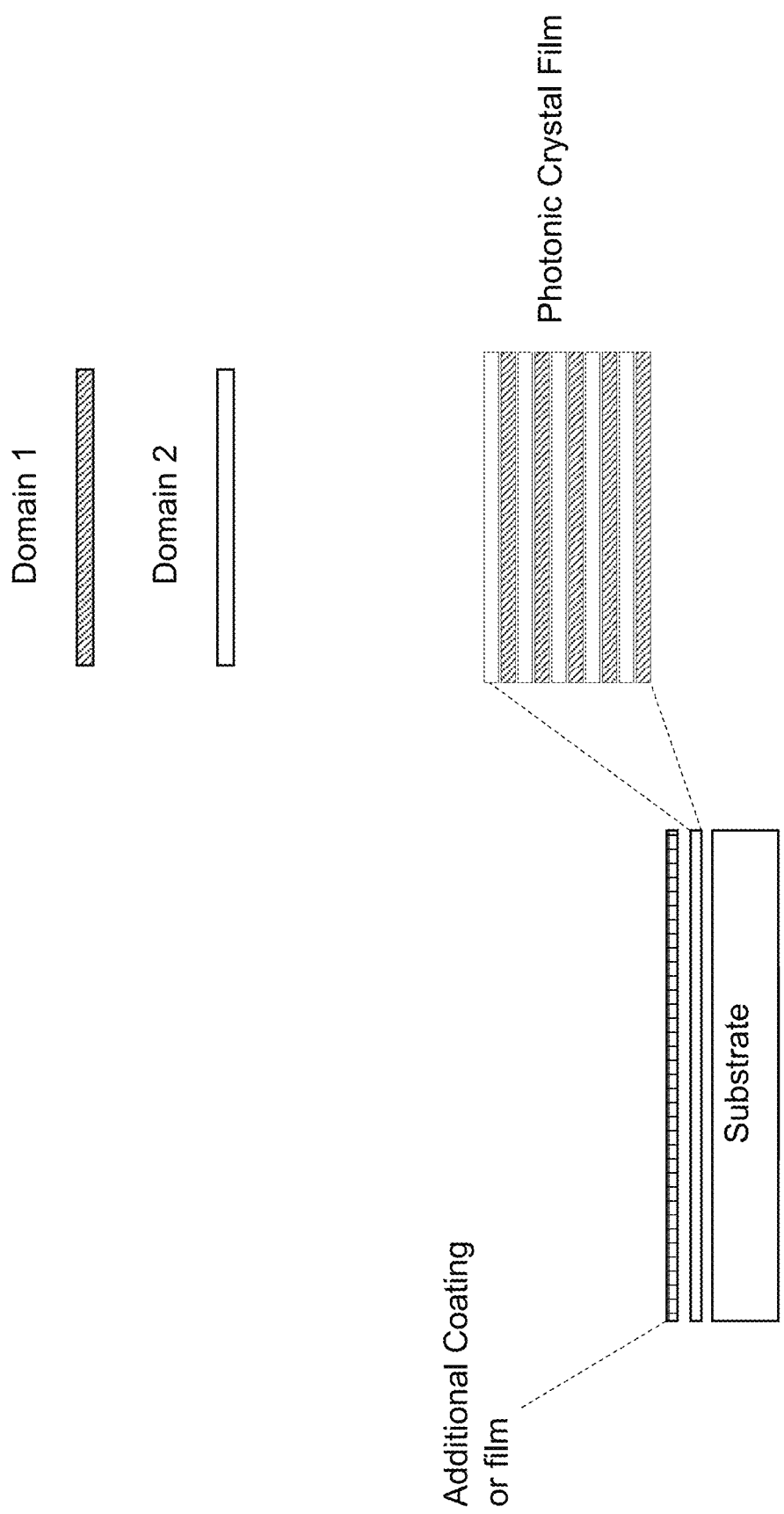
FIG. 4. Shows a multilayer coating on a substrate wherein domains 1 and 2 represent the different polymeric layers in the lamellar nanoscale morphology of the photonic crystal film (not drawn to scale).

This disclosure details the union of a resin or laminate topcoat with a polymer-based photonic crystal film to produce a product with enhanced material and optical properties. These enhanced properties include but are not limited to resistance to moisture, resistance to ultraviolet radiation, resistance to high or low temperatures, resistance to solvent, increased hardness, increased ductility or malleability, increased optical clarity. We have added topcoats to photonic crystal films of varying reflection ($\lambda_{max}$) using the same topcoat (FIG. 2) and using different topcoat resins (FIG. 3). The photonic crystal films are produced via the self-assembly of poly(lactic acid)-b-poly(styrene) brush block copolymers, blended with linear polymer additives: poly(lactic acid) and poly(styrene) (*J. Am. Chem. Soc.* 2014, 136, 17374). However, this application is not limited to the specific resin topcoats detailed, the range of $\lambda_{max}$ reflection of the photonic crystals displayed, the architecture of the polymeric materials (brush, comb, network, tadpole, etc), or the specific chemical composition of the materials themselves.

The graphs in FIGS. 2A to 2L and FIGS. 3A to 3L demonstrate that the topcoat reduces haze regardless of topcoat identity. Haze is calculated using ASTM D1003 standards through eq. 1.:

$$\% \text{ Haze} = \left(\frac{T_4}{T_2} - \frac{T_3}{T_1}\right) \times 100 \qquad \text{Equation 1}$$

Where $T_1$ is the transmittance baseline of a diffuse reflectance accessory (DRA) on a UV-Vis-NIR spectrophotometer, $T_2$ is the total sample transmittance using a DRA on a UV-Vis-NIR spectrophotometer, $T_3$ is the Total instrument scattering of a DRA on a UV-Vis-NIR spectrophotometer, and $T_4$ is the total sample scattering using a DRA on a UV-Vis-NIR spectrophotometer. In a more simplified version, one can use eq. 2:

$$\% \text{ Haze} = \left(\frac{\text{Diffuse Transmission}}{\text{Total Transmission}}\right) \times 100 \qquad \text{Equation 2}$$

In the instance of FIGS. 2A to 2C the visible haze (400 nm-700 nm) is reduced from 19.3% to 8.6% after addition of Sigma-Aldrich's UV curable resin topcoat. In the instance of FIGS. 2D to 2F the visible haze is reduced from 15.5% to 10.2% after addition of Sigma-Aldrich's UV curable resin topcoat. In the instance of FIGS. 2G to 2I the visible haze is reduced from 13.0% to 11.3% after addition of Sigma-Aldrich's UV curable resin topcoat. In the instance of FIGS. 2J to 2L the visible haze is reduced from 9.8% to 8.2% after addition of Sigma-Aldrich's UV curable resin topcoat.

In the instance of FIGS. 3D to 3F the visible haze is reduced from 17.3% to 13.4% after addition of Forms lab Clear resin (RS-F2-GPCL-04) topcoat. In the instance of FIGS. 3G to 3I the visible haze is reduced from 18.4% to 10.5% after addition of Norland Optical Adhesives 68TH topcoat. In the instance of FIGS. 3J to 3L the visible haze is reduced from 19.0% to 9.7% after addition of Norland Optical Adhesives 13825 topcoat.

Examples of compositions of the formulations described herein are shown in Table 1.

TABLE 1

Formulation Compositions.

| FIG. | BBCP (wt %) | Poly(styrene) Linear Polymer Additive (wt %) | Poly(lactic acid) Linear Polymer Additive (wt %) | Solvent* (wt %) |
|---|---|---|---|---|
| 2 A-C | 10.0 | 5.0 | 5.0 | 80.0 |
| 2 D-F | 10.0 | 5.0 | 5.0 | 80.0 |
| 2 G-I | 10.0 | 5.0 | 5.0 | 80.0 |
| 2 J-L | 10.0 | 5.0 | 5.0 | 80.0 |
| 3 A-C | 10.0 | 5.0 | 5.0 | 80.0 |
| 3 D-F | 10.0 | 5.0 | 5.0 | 80.0 |
| 3 G-I | 10.0 | 5.0 | 5.0 | 80.0 |
| 3 J-L | 10.0 | 5.0 | 5.0 | 80.0 |

*Solvent is 4-chlorobenzotrifluoride.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Example 1. Materials and Methods

The compositions of the polymer composite materials were prepared from a brush block copolymer and a linear poly(lactic acid), a linear poly(styrene), or a combination thereof. Polymer films were deposited on microscope glass slides, and reflectance and transmittance spectra were recorded on a Cary 5000 UV-Vis-NIR spectrophotometer with a diffuse reflectance accessory.

For examples of linear polymer additives that can be used in the compositions, see *J. Am. Chem. Soc.* 2014, 136, 17374. The disclosure of U.S. Publication No. 2018/0258230, which describes useful copolymers and relevant synthetic techniques, is incorporated herein by reference. Preparation of polymer composite material components can be carried out as follows.

Linear poly(lactic Acid):

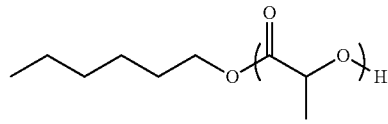

To a degassed, backfilled with nitrogen, and three times flame dried 200 mL Schlenk flask equipped with stir bar was added newly sublimed lactide (51.8 g), and tin(II) 2-ethylhexanoate, lastly anhydrous hexanol (1.948 mL) was syringed in. The reaction was heated to 135° C. As the reaction preceded lactide sublimed on the sidewalls of the flask which was melted with a heat gun back into solution to insure quantitative consumption of monomer. After 3.5 hours, the reaction was diluted with dichloromethane (DCM) and filtered through a celite plug and precipitated into methanol. Yield: 75%, $M_n$=3,050 Da, PDI=1.07.

Linear poly(styrene):

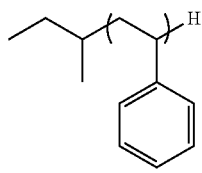

To a degassed, backfilled with nitrogen, and three times flame dried 1 L Schlenk flask equipped with stir bar was added dried and degassed Toluene (700 mL). The reaction flask was put in an ice bath and 1.4M sec-butyl lithium (25 mL, 2.24 g, 0.035 mol, 1 eq.) in cyclohexane was added to the stirring Toluene. After 20 minutes of the solution stirring, freshly dried over $CaH_2$ and distilled styrene (120 mL, 109 g, 1.05 mol, 29.9 eq.) was added by a 60 mL syringe in a fairly rapid fashion—no significant exotherm was observed, the solution immediately turned from clear to orange/red. After 2 hours ~50 mL of methanol was syringed in to quench the reaction.

Work up: The solution was concentrated in a rotary evaporator so that the remaining toluene, methanol, and cyclohexane were removed. The polymer was dissolved in THF and precipitated at room temperature in a stirring methanol solution. Yield: 98%, $M_n$=3,100 Da, PDI=1.05.

Example 2. Brush Block Copolymer (BBCP) Synthesis

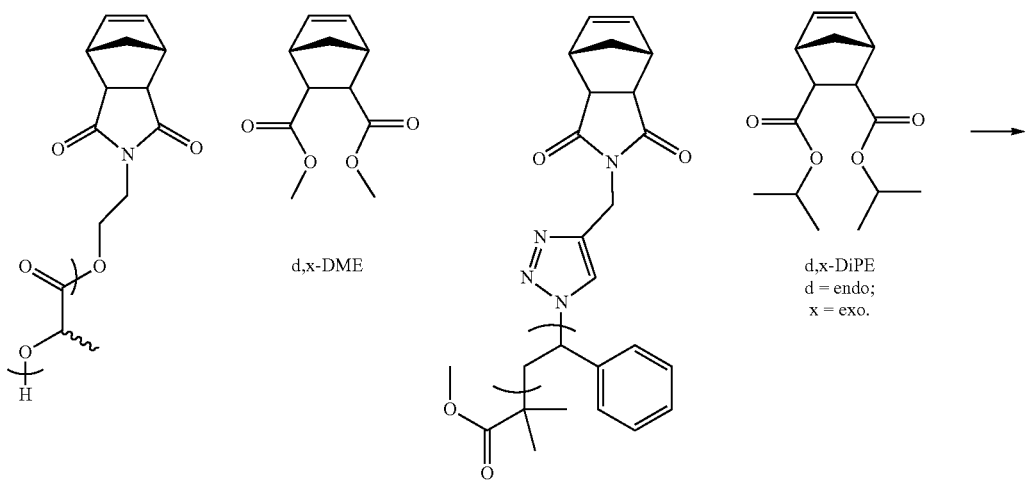

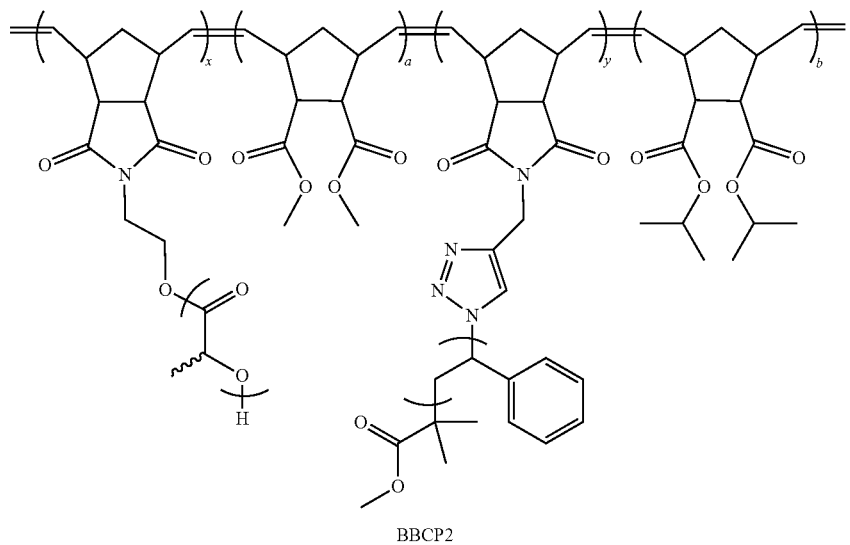

BBCP2

BBCP1 (see *J. Am. Chem. Soc.* 2017, 139, 17683): To a 30 mL brown vial containing PLA-MM (1173 mg, 0.325 mmol, $M_n$=3608 Da) and a stir bar was added a $CH_2C_{12}$ solution of d,x-DME (68.32 mg in 6.5 mL, 0.325 mmol, 0.05M). The copolymerization was initiated by addition of Grubbs' $3^{rd}$ generation catalyst (($H_2$IMes)-(pyr)$_2$(Cl)$_2$RuCHPh, 1.91 µmol) targeting PLA$_{170}$-r-DME$_{170}$. After stirring for 75 minutes at room temperature, an aliquot was extracted for analysis, and a $CH_2Cl_2$ solution of pyridine was added (3.8 mL, 1.0 mM). In a separate vial, the solution of the second block was prepared by dissolving PS-MM (1138 mg, 0.325 mmol, $M_n$=3500 Da) with a $CH_2Cl_2$ solution of d,x-DiPE (86.56 mg in 6.5 mL, 0.325 mmol, 0.05M). The second block was then introduced to the first block reaction mixture in one shot using a 12 mL plastic syringe. The resulting mixture was stirred at room temperature for an additional 12 h. The reaction was quenched by addition of 0.5 mL ethyl vinyl ether, and the block copolymer was isolated by precipitation into methanol at −78 C. $M_n$=1,020,000 Da, PDI=1.09. Yield: 92%.

Example 3. Topcoat Compositions

Topcoat A components (Sigma Aldrich's UV Curable Resin, product #: 900164):
  Mercapto polymerization reagent 50%-70%
    Specific Name: Pentaerythritol tetrakis(3-mercaptopropionate)
  Monomer crosslinker 10%-20%
    Specific Name: 2-Carboxyethyl acrylate
  Aromatic reducing agent 0.1%-1%
  Polymerization inhibitor 0.1%-1%
  Polymerization stabilizer 0.1%-1%
General Mechanism for application: thiol-ene chemistry.
  Topcoat B components (Form Labs clear Resin, product #RS-F2-GPCL-04):
  a mixture of methacrylic acid asters and photoinitiators; comprising:
    Methacrylated oligomers
    Methacrylated monomer
    Photoinitiators
General mechanism for application: photo-generated radical curing.
  Topcoat C components (Norland Optical Adhesives (NOA), product #68TH): ultraviolet and heat curing adhesive; urethane related resin-based formulation, and urethane related adhesives comprising:
    Mercapto ester 30%-55%
    Mercapto ester 35%-60%
    Tetrahydrofurfuryl methacrylate 5%-30%
General mechanism for application: thiol-ene chemistry.
  Topcoat D components (NOA product #13825):
ultraviolet and visible light curing adhesive, acrylate related adhesives, comprising:
    Aliphatic urethane acrylate 85%-99%
    Acrylic monomer 1%-15%
General mechanism for application: radical curing, urethane containing.

Example 4. Procedure for Assembling a Multi-Coat Photonic Crystal

The Following Procedure Describes the Assembly of a Multi-Coat Photonic Crystal Coating:
  a) Weigh out the desired mass of solid materials to be included in the formulation, including the brush block copolymer, polymeric additives, and any further additives, into the appropriate mixing vessel.
  b) Add the desired amount of solvent to the mixing vessel, and seal to prevent solvent evaporation. After the solids have fully dissolved in the solvent, remove the vessel from the mixing method (centrifugal mixer, high shear mixer, magnetic stirrer, mechanical stirrer, etc).
  c) Deposit the formulation onto a substrate of choice using a 1.5 mil to 6 mil wet thickness bird bar applicator, or other deposition method (spray coating, wire bar, etc).
  d) Optionally add the optical adhesive/UV curable resin to the coating directly after deposition on the substrate, or after waiting a period of time post-deposition. Cure the multi-coat system under UV irradiation for the appropriate amount of time.
  e) Measure the optical properties of the coating using a UV-Vis-NIR spectrophotometer outfitted with a diffuse reflectance accessory to quantify reflection, transmission, haze, and any other desired property relevant to the measurement technique.

Range of molecular weights for producing various colors: The reflected wavelength is dictated by the domain sizes and refractive indices of the photonic crystal layers. The domain size is dictated by the molecular weight and molecular weight distribution of the brush block copolymer. The following are ranges of typical number average molecular weights which provide wavelengths of maximum reflectivity (lambda max), at the molecular weight distributions common to the preparation of the brush block copolymer via Ruthenium mediated Ring Opening Metathesis Polymerization (1.01-1.50):

$M_n$=~500 kDa to ~1000 kDa—Violet or Blue reflection, lambda max=380 nm to 500 nm.

$M_n$=~1000 kDa to ~1500 kDa—Cyan, Green, Yellow, or Orange reflection, lambda max=500 nm to 625 nm.

$M_n$=~1500 kDa to ~4000 kDa—Red or Near-Infrared reflection, lambda max=625 nm to 1500 nm.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A multilayer coating comprising:
   a) a first layer of a photonic crystal film comprising an additive and brush block copolymer (BBCP) of Formula IA or Formula IB:

(IA)

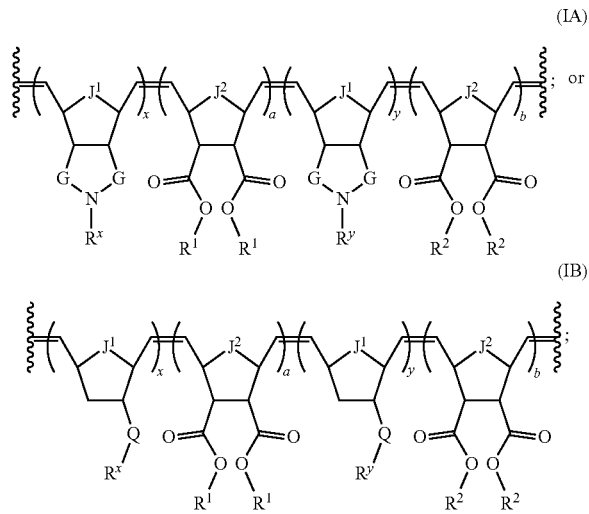

(IB)

wherein
- $R^x$ is —$(C_2$-$C_6)$alkyl-OC(=O)$G^1$ wherein $G^1$ comprises polyacrylate, polymethacrylate or polylactic acid; or —$(C_1$-$C_8)$alkyl-$G^2$-$G^3$ wherein $G^2$ is —C(=O)O— or a nitrogen heterocycle and $G^3$ comprises polystyrene, polyacrylate, polydimethylsiloxane, polyether, polymethacrylate, or polylactic acid;
- $R^y$ is —$(C_2$-$C_6)$alkyl-OC(=O) $G^1$ wherein $G^1$ comprises polyacrylate, polymethacrylate or polylactic acid; or —$(C_1$-$C_8)$ alkyl-$G^2$-$G^3$ wherein $G^2$ is —C(=O)O— or a nitrogen heterocycle and $G^3$ comprises polystyrene, polyacrylate, polydimethylsiloxane, polyether, polymethacrylate, or polylactic acid;
- $R^1$ is unbranched alkyl;
- $R^2$ is branched alkyl;
- each G is each independently $CH_2$ or C=O;
- each $J^1$ is independently $CH_2$, C=O, or O;
- each $J^2$ is independently $CH_2$, C=O, or O;
- each Q is independently alkyl, cycloalkyl, heterocycloalkyl, carbonyl, silyl, aryl, or heteroaryl;

a and b are each independently 0 to about 1000; and
x and y are each independently 1 to about 1000;
  wherein blocks a, b, x and y are in any order, the ratio of x:a is 1:0 to about 1:3, and the ratio of y:b is 1:0 to about 1:3; and
  b) a second layer comprising a topcoat wherein the topcoat is an optical adhesive or ultraviolet curable resin;
wherein the first layer and second layer form a multilayer film and the multilayer coating comprises one or more multilayer films.

2. The multilayer coating of claim 1 wherein the a and the b are each independently 1 to about 300.

3. The multilayer coating of claim 1 wherein the x and the y are each independently 1 to about 300.

4. The multilayer coating of claim 1 wherein the ratio of x:a is about 1:0.5 to about 1:1.

5. The multilayer coating of claim 1 wherein the ratio of y:b is about 1:0.5 to about 1:1.

6. The multilayer coating of claim 1 wherein the BBCP has a number average molecular weight of about 500 kDa to about 3000 kDa.

7. The multilayer coating of claim 1 wherein the weight percent of the BBCP is about 50% to about 99.9%.

8. The multilayer coating of claim 1 wherein the photonic crystal film further comprises a polymer additive.

9. The multilayer coating of claim 1 wherein Formula IA is:

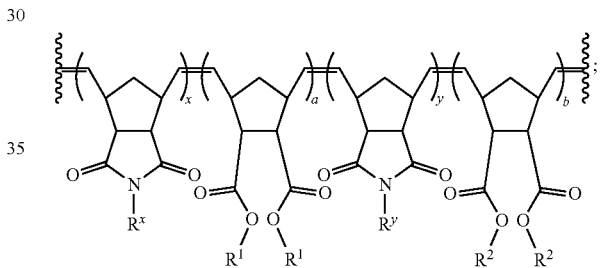

wherein Formula IB is:

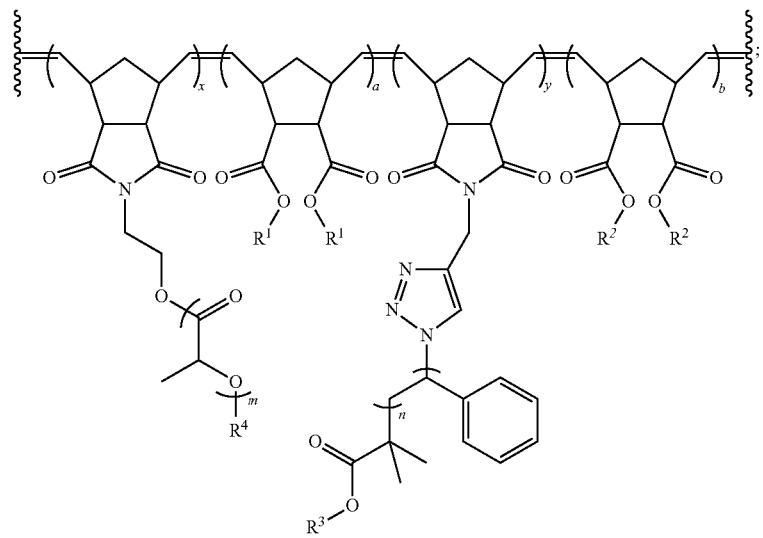

wherein
R$^3$ and R$^4$ are each independently H or unbranched or branched —(C$_1$-C$_6$)alkyl; and m and n are each independently 1 to about 100.

10. The multilayer coating of claim 9 wherein m and n are each independently 10 to about 50.

* * * * *